United States Patent
Kadansky et al.

(10) Patent No.: US 6,507,562 B1
(45) Date of Patent: Jan. 14, 2003

(54) DYNAMIC OPTIMIZATION FOR RECEIVERS USING DISTANCE BETWEEN A REPAIR HEAD AND A MEMBER STATION IN A REPAIR GROUP FOR RECEIVERS HAVING A CLOSELY KNIT TOPOLOGICAL ARRANGEMENT TO LOCATE REPAIR HEADS NEAR THE MEMBER STATIONS WHICH THEY SERVE IN TREE BASED REPAIR IN RELIABLE MULTICAST PROTOCOL

(75) Inventors: Miriam C. Kadansky, Westford, MA (US); Dah Ming Chiu, Acton, MA (US); Stephen R. Hanna, Bedford, MA (US); Stephen A. Hurst, Nashua, NH (US); Joseph S. Wesley, Quincy, MA (US); Philip M. Rosenzweig, Acton, MA (US); Radia J. Perlman, Acton, MA (US)

(73) Assignee: Sun Microsystems, Inc., Burlington, MA (US)

( * ) Notice: Subject to any disclaimer, the term of this patent is extended or adjusted under 35 U.S.C. 154(b) by 0 days.

(21) Appl. No.: 09/336,660

(22) Filed: Jun. 18, 1999

Related U.S. Application Data

(60) Provisional application No. 60/091,330, filed on Jun. 30, 1998.

(51) Int. Cl.$^7$ .......................... G06F 11/00; H04L 12/28

(52) U.S. Cl. ................. 370/216; 370/254; 370/390; 370/408; 709/238; 340/825.2

(58) Field of Search ................. 370/216, 242, 370/254, 226, 227, 312, 356, 389, 390, 392, 408, 432; 714/18, 748, 798; 340/825.2, 3.51, 825.08, 825.07; 725/34; 709/230, 238, 227, 239

(56) References Cited

U.S. PATENT DOCUMENTS

| | | | | |
|---|---|---|---|---|
| 5,036,518 A | * | 7/1991 | Tseung | 340/825.5 |
| 5,355,371 A | * | 10/1994 | Auerbach et al. | 370/255 |
| 5,675,741 A | * | 10/1997 | Aggarwal et al. | 709/227 |
| 5,748,736 A | * | 5/1998 | Mittra | 713/155 |
| 5,831,975 A | * | 11/1998 | Chen et al. | 370/390 |
| 5,905,871 A | * | 5/1999 | Buskens et al. | 709/238 |
| 6,104,695 A | | 8/2000 | Wesley et al. | |
| 6,151,633 A | | 11/2000 | Hurst et al. | |
| 6,185,698 B1 | | 2/2001 | Wesley et al. | |
| 6,192,404 B1 | | 2/2001 | Hurst et al. | |
| 6,269,085 B1 | | 7/2001 | Provino et al. | |
| 6,275,859 B1 | | 8/2001 | Wesley et al. | |
| 6,427,166 B1 | | 7/2002 | Hurst et al. | |

OTHER PUBLICATIONS

Bell et al., "Review if Point–to–point Network Routing Algorithm," IEEE, Jan. 24, pp. 1–5.*
U.S. patent application Ser. No. 09/336,699.

(List continued on next page.)

Primary Examiner—Hassan Kizou
Assistant Examiner—Afsar M. Qureshi
(74) Attorney, Agent, or Firm—Cesari and McKenna, LLP

(57) ABSTRACT

Receiver stations located close together in a computer network dynamically form a multicast repair tree by a plurality of receiver stations choosing a repair head station from among the closely located receiver stations. A receiver station calculates its distance from a repair head station by subtracting the decremented TTL value read from the IP header from the initial value of the TTL parameter carried in field TTL SCOPE of HELLO messages, transmitted by repair head stations. Using a criteria that a closer repair head station is a more optimum repair head station, receiver stations listen to each received HELLO message, calculate the distance to the repair head station, and reaffiliate with the closest repair head station.

9 Claims, 35 Drawing Sheets

OTHER PUBLICATIONS

U.S. patent application Ser. No. 09/336,659.
U.S. patent application Ser. No. 09/336,671.
U.S. patent application Ser. No. 09/336,670.
Internet Research Task Force Reliable Multicast Meeting, Sep. 1997, http://www.east.isi.edu/RMRG/notes–rev0.html, 1–25.

* cited by examiner

TREE FORMATION WITHOUT LAN OPTIMIZATION

TREE FORMATION WITH LAN OPTIMIZATION

POORLY-BUILT TREE FOR SPARSE DISTRIBUTION

WELL-BUILT TREE FOR SPARSE DISTRIBUTION

S ⇒ SENDER
{A, B, C, N} ⇒ PRIMARY RxGroup-members

MESSAGE TYPES

| NUMBER | MESSAGE TYPE | SUB-MESSAGE TYPE | DESCRIPTION |
| --- | --- | --- | --- |
| 1 | MCAST_MANAGEMENT | | TRAM MULTICAST CATEGORY MESSAGE |
| 1a | | BEACON | TRAM MESSAGE |
| 1b | | RESERVED | |
| 1c | | HELLO | HELLO MESSAGE |
| 1d | | HA | HEAD ADVERTISEMENT |
| 1e | | MS | MEMBER SOLICITATION |
| 2 | MCAST_DATA | | TRAM MULTICAST DATA MESSAGE |
| 2a | | DATA | TRAM DATA MESSAGE |
| 2b | | DATA_RETXM | TRAM DATA MESSAGE RETRANSMISSION |
| 3 | UCAST_MANAGEMENT | | TRAM UNICAST MANAGEMENT MESSAGE |
| 3a | | RESERVED | |
| 3b | | AM | ACCEPT MEMBERSHIP MESSAGE |
| 3c | | RM | REJECT MEMBERSHIP MESSAGE |
| 3d | | HELLO_Uni | HELLO MESSAGE WITH ACK REQUEST |
| 3e | | ACK | ACK MESSAGE |
| 3f | | CONGESTION | RATE BASED CONGESTION MESSAGE |
| 3g | | RESERVED | |
| 3h | | RESERVED | |
| 3i | | HB | TRAM HEAD BIND MESSAGE |

FIG. 18

TIMERS USED IN TRAM

| NUMBER | TIMER PARAMETER | DEFAULT VALUE | DESCRIPTION |
| --- | --- | --- | --- |
| 1 | T_BEACON | 1000 ms | INTER BEACON INTERVAL |
| 2 | T_BEACON_FILLER | 30 sec | INTER BEACON FILLER INTERVAL |
| 3 | T_ACK_INTERVAL | RUN TIME COMPUTATION | COMPUTED BASED ON THE CURRENT RATE OF DATA TRANSMISSION BY THE DATA SOURCE AND THE SIZE OF THE CONFIGURED ACKNOWLEDGEMENT WINDOW |
| 4 | T_HELLO | 1 PER ACK INTERVAL | INTER HELLO INTERVAL |
| 5 | T_MS | 500 ms | INTER MS INTERVAL |

FIG. 19

COUNTERS USED IN TRAM

| NUMBER | COUNTER PARAMETER | DEFAULT VALUE | DESCRIPTION |
|---|---|---|---|
| 1 | N_ACK_MISSES | 4 | THE NUMBER OF ACK MESSAGES THAT CAN BE MISSED BEFORE DECLARING THE MEMBERS AS NON RESPONSIVE |
| 2 | N_HELLO_MISSES | 5 | THE NUMBER OF HELLO MESSAGES THAT A MEMBER HAS MISSED TO DECLARE THE HEAD AS NON-RESPONSIVE |
| 3 | N_HB_RETXM | 3 | IN MTHA, THE NUMBER OF TIMES A HB CAN BE SENT BEFORE TRYING ANOTHER HEAD |
| 4 | N_MS_RETXM | 3 | THE NUMBER OF TIMES A MS NEEDS TO BE SENT BEFORE INCREASING ITS TTL |

FIG. 20

SENDER BEACON MESSAGE

| 0 | | | 31 |
|---|---|---|---|
| VER # | M TYPE | SUB-TYPE | FLAGS |
| LENGTH OF THE MESSAGE IN BYTES | | RESERVED | RESERVED |
| SOURCE ADDRESS | | | |
| SEQUENCE NUMBER | | | |
| HEAD ADVERTISEMENT INTERVAL | | RESERVED | RESERVED |

FIG. 21

DATA MESSAGE

| 0 | | | 31 |
|---|---|---|---|
| VER # | M TYPE | SUB-TYPE | FLAGS |
| LENGTH OF MESSAGE IN BYTES | | CHECKSUM | |
| MESSAGE SEQUENCE NUMBER | | | |
| HEAD ADVERTISEMENT INTERVAL | | RESERVED | RESERVED |
| APPLICATION DATA | | | |

FIG. 22

HA MESSAGE

| 0 | | | 31 |
|---|---|---|---|
| VER # | M TYPE | SUB-TYPE | FLAGS |
| LENGTH OF MESSAGE IN BYTES | | TTL DISTANCE | HState \| MRole |
| DATA SOURCE ADDRESS | | | |
| RxLevel | LAN IDENTIFICATION | UNICAST PORT IN USE | |
| DIRECT MEMBER COUNT | | IN-DIRECT MEMBER COUNT | |
| TIME STAMP | | | |

FIG. 23

MEMBER SOLICITATION
MS MESSAGE

| 0 | | | 31 |
|---|---|---|---|
| VER # | M TYPE | SUB-TYPE | FLAGS |
| LENGTH OF THE MESSAGE IN BYTES | | TTL | Mrole \| RESERVED |
| DATA SOURCE ADDRESS | | | |
| RxLevel | RESERVED | UNICAST PORT IN USE | |
| TIME STAMP | | | |
| DIRECT MEMBER COUNT | | INDIRECT MEMBER COUNT | |

FIG. 24

HELLO MESSAGE

| 0 | | | 31 |
|---|---|---|---|
| VER # | M TYPE | SUB-TYPE | FLAGS |
| LENGTH OF MESSAGE IN BYTES | | TTL SCOPE | Hstate \| CState |
| CHECKSUM | | NUMBER OF ACK MEMBERS | RESERVED |
| DATA SOURCE ADDRESS | | | |
| UNICAST PORT IN USE | | TOTAL MEMBER COUNT | RESERVED |
| TIME STAMP | | | |
| PACKET SEQUENCE NUMBER | | | |
| MEMBER ADDRESS THAT NEEDS TO ACK | | | |
| MEMBER ADDRESS THAT NEEDS TO ACK | | | |
| • | | | |
| • | | | |
| • | | | |
| MEMBER ADDRESS THAT NEEDS TO ACK | | | |

FIG. 25

ACK MESSAGE

| 0 | | | 31 |
|---|---|---|---|
| VER # | M TYPE | SUB-TYPE | FLAGS |
| MESSAGE LENGTH | | BITMASK LENGTH | |
| CHECKSUM | | MRole \| CState | RESERVED |
| MULTICAST ADDRESS | | | |
| DATA SOURCE ADDRESS | | | |
| START WINDOW SEQUENCE NUMBER | | | |
| TIME STAMP FROM HELLO MESSAGE | | | |
| DIRECT MEMBER COUNT | | INDIRECT MEMBER COUNT | |
| DIRECT ADVERTISING HEAD COUNT | | INDIRECT ADVERTISING HEAD COUNT | |
| RECEIVE BIT MASK | | | |
| • | | | |
| • | | | |
| • | | | |
| RECEIVE BIT MASK | | | |

FIG. 26

HELLO UNI MESSAGE

| 0 | | | 31 |
|---|---|---|---|
| VER. # | M TYPE | SUB-TYPE | FLAGS |
| MESSAGE LENGTH | | RxLevel | Hstate \| Cstate |
| MULTICAST ADDRESS ||||
| DATA SOURCE ADDRESS ||||
| DISTANCE FROM DATA SOURCE ||||

FIG. 27

HEAD BIND MESSAGE

| 0 | | | 31 |
|---|---|---|---|
| VER. # | M TYPE | SUB-TYPE | FLAGS |
| MESSAGE LENGTH | | TTL DISTANCE | Mrole | RESERVED |
| DATA SOURCE ADDRESS | | | |
| DIRECT MEMBER COUNT | | INDIRECT MEMBER COUNT | |

FIG. 28

ACCEPT MEMBERSHIP MESSAGE

| 0 | | | 31 |
|---|---|---|---|
| VER. # | M TYPE | SUB-TYPE | FLAGS |
| MESSAGE LENGTH | | RESERVED | RESERVED |
| MULTICAST ADDRESS | | | |
| DATA SOURCE ADDRESS | | | |

FIG. 29

REJECT MEMBERSHIP MESSAGE

| 0 | | | 31 |
|---|---|---|---|
| VER. # | M TYPE | SUB-TYPE | FLAGS |
| MESSAGE LENGTH | | REASON CODE | RESERVED |
| MULTICAST ADDRESS | | | |
| DATA SOURCE ADDRESS | | | |

FIG. 30

DYNAMIC OPTIMIZATION FOR RECEIVERS USING DISTANCE BETWEEN A REPAIR HEAD AND A MEMBER STATION IN A REPAIR GROUP FOR RECEIVERS HAVING A CLOSELY KNIT TOPOLOGICAL ARRANGEMENT TO LOCATE REPAIR HEADS NEAR THE MEMBER STATIONS WHICH THEY SERVE IN TREE BASED REPAIR IN RELIABLE MULTICAST PROTOCOL

RELATED PATENTS

This application claims the benefit of Provisional application Ser. No. 60/091,330, filed Jun. 30, 1998.

This Application is related to patent applications as follows:

Title, "Dynamic Optimization Using the Number of Member Receiver Stations in a Repair Group for Receiver Stations Having Dense of Sparse Topological Arrangements in Tree Based Repair in Reliable Multicast Protocol" by, Miriam C. Kadansky, Dah Ming Chiu, Stephen R. Hanna, Stephen A. Hurst, Joseph S. Wesley, Philip M. Rosenzweig, and Radia J. Perlman, filed on Jun. 18, 1999 (date) with Ser. No. 09/336,669, Title, "Multiple ACK Windows Providing Congestion Control in Reliable Multicast Protocol" by, Dah Ming Chiu, Miriam C. Kadansky, Stephen R. Hanna, Stephen A. Hurst, Joseph S. Wesley, Philip M. Rosenzweig, and Radia J. Perlman, filed on Jun. 18, 1999 (date) with Ser. No. 09/336,659;

Title, "Historically Highest Transmission Rate for Determining Incremental Transmission Rate to Provide Congestion Control in Reliable Multicast Protocol" by, Dah Ming Chiu, Miriam C. Kadansky, Stephen R. Hanna, Stephen A. Hurst, Joseph S. Wesley, Philip M. Rosenzweig, and Radia J. Perlman, filed on Jun. 18, 1999 (date) with Ser. No. 09/336,671;

Title, "Detecting Congestion by Comparing Successive Loss of Packets in Windows to Provide Congestion Control in Reliable Multicast Protocol" by, Dah Ming Chiu, Miriam C. Kadansky, Stephen R. Hanna, Stephen A. Hurst, Joseph S. Wesley, Philip M. Rosenzweig, and Radia J. Perlman, filed on Jun. 18, 1999 (date) with Ser. No. 09/336,670;

all disclosures of which are incorporated herein by reference.

FIELD OF THE INVENTION

This invention relates to multicast communication in computer networks, and more particularly to optimization of a repair tree in reliable multicast protocol.

BACKGROUND OF THE INVENTION

Communication between computers in a computer network can be established by one of several methods. These include unicast messaging (where a source station and a destination station exchange messages over a point to point path), broadcast communication (where a sender station transmits messages which may be received by all stations attached to the network), multicast communication (where a sender station transmits messages which may be received by a predetermined group of stations), and so forth.

Reliable point to point communication is established by use of sequence numbers in packets transmitted by a sending station, and by the receiving station transmitting an acknowledgement message (ACK message) or a negative acknowledgement message (NACK message) to the sending station. The sending station maintains a buffer containing messages which it has transmitted, and upon receipt of an ACK message indicating that a packet having a particular sequence number has been received, the sending station flushes that packet from its buffer. In the event that the sending station either receives a NACK message, or does not receive an ACK message during a certain timing period, then the sending station uses its buffer to retransmit the packet. Reliable unicast communication is established by requiring the sending station to retransmit packets until it has received an ACK message for each packet which it transmitted. An example of a reliable unicast protocol is the well known TCP/IP protocol.

A problem in reliable multicast transmission is that the sending station must respond to ACK or NACK messages transmitted by all of the receiving stations. If there are only a few receiving stations, such as for example ten (10) or so receiving stations, then receiving buffers in the transmitting station can handle the ACK or NACK traffic. However where there are hundreds of receiving stations, or thousands, or millions of receiving stations, the large number of ACK or NACK messages overwhelm the transmitting station.

It is standard engineering practice in the design of computer networks for a network manager (a person) to use a network management computer program to establish a repair tree for multicast communication. The manager assigns particular stations to be repair head stations for a particular group of receiving stations. The group of receiving stations along with the repair head station are referred to as a "repair group", with a repair head station and member stations. The repair head stations provide a solution to the problem of too many ACK or NACK messages flooding the sending station by the repair head stations receiving, and reacting to, the ACK or NACK messages transmitted by member stations of their repair group.

A problem with establishing a repair tree having a plurality of repair head stations in a reliable multicast protocol is that the locations of the member stations may not be optimum for the repair head stations established by the network manager. For example, if the repair head stations are established in the United States, and the member stations are in Europe, Japan, and South America, then retransmitting repair packets is very expensive. And the network manager may not have complete information when he establishes the repair groups, and so he does not realize that he is imposing a very expensive solution on the repair tree.

Further, a second problem with a network manager establishing a repair tree is that the topology of the repair tree cannot respond to changes in network configuration. That is, in the network links go down, new links are established, routers go down, new routers come on line, etc., and if any of these changes affects to established repair tree, then the repair tree may become inoperative.

There is needed a method and apparatus to help establish an optimum topological arrangement of a repair tree in reliable multicast transmission, especially when the receiving stations are widely separated, and to establish a simple method for the repair tree to respond to changes in the topology of the network.

SUMMARY OF THE INVENTION

Receiver stations located close together in a computer network dynamically form a multicast repair tree by a plurality of receiver stations choosing a repair head station from among the closely located receiver stations.

A receiver station calculates its distance from a repair head station by subtracting the decremented TTL value read from the IP header from the initial value of the TTL parameter carried in field TTL SCOPE of HELLO messages, transmitted by repair head stations.

Using a criteria that a closer repair head station is a more optimum repair head station, receiver stations listen to each received HELLO message, calculate the distance to the repair head station, and reaffiliate with the closest repair head station.

BRIEF DESCRIPTION OF THE DRAWINGS

Referring now to the drawings, in which like numerals represent like parts in the several views:

FIG. 18 is a chart showing various messages and sub-messages used in TRAM.

FIG. 19 is a table showing the timers used by TRAM.

FIG. 20 is a table showing counters used by TRAM.

FIG. 21 is a block diagram showing a multicast packet format for a sender Beacon Message.

FIG. 22 is a block diagram showing a packet format for a Data Message.

FIG. 23 is a block diagram showing a packet format for a HA Message.

FIG. 24 is a block diagram showing a packet format for a MS Message.

FIG. 25 is a block diagram showing a packet format for a Hello Message.

FIG. 26 is a block diagram of a packet format for a ACK Message.

FIG. 27 is a block diagram of a unicast packet format for a Hello Uni Message.

FIG. 28 is a block diagram of a packet format for a Head Bind Message.

FIG. 29 is a block diagram of a packet format for a Accept Membership Message.

FIG. 30 is a block diagram of a packet format for a Reject Membership Message.

DETAILED DESCRIPTION

Reliable Communication

Figure 1:
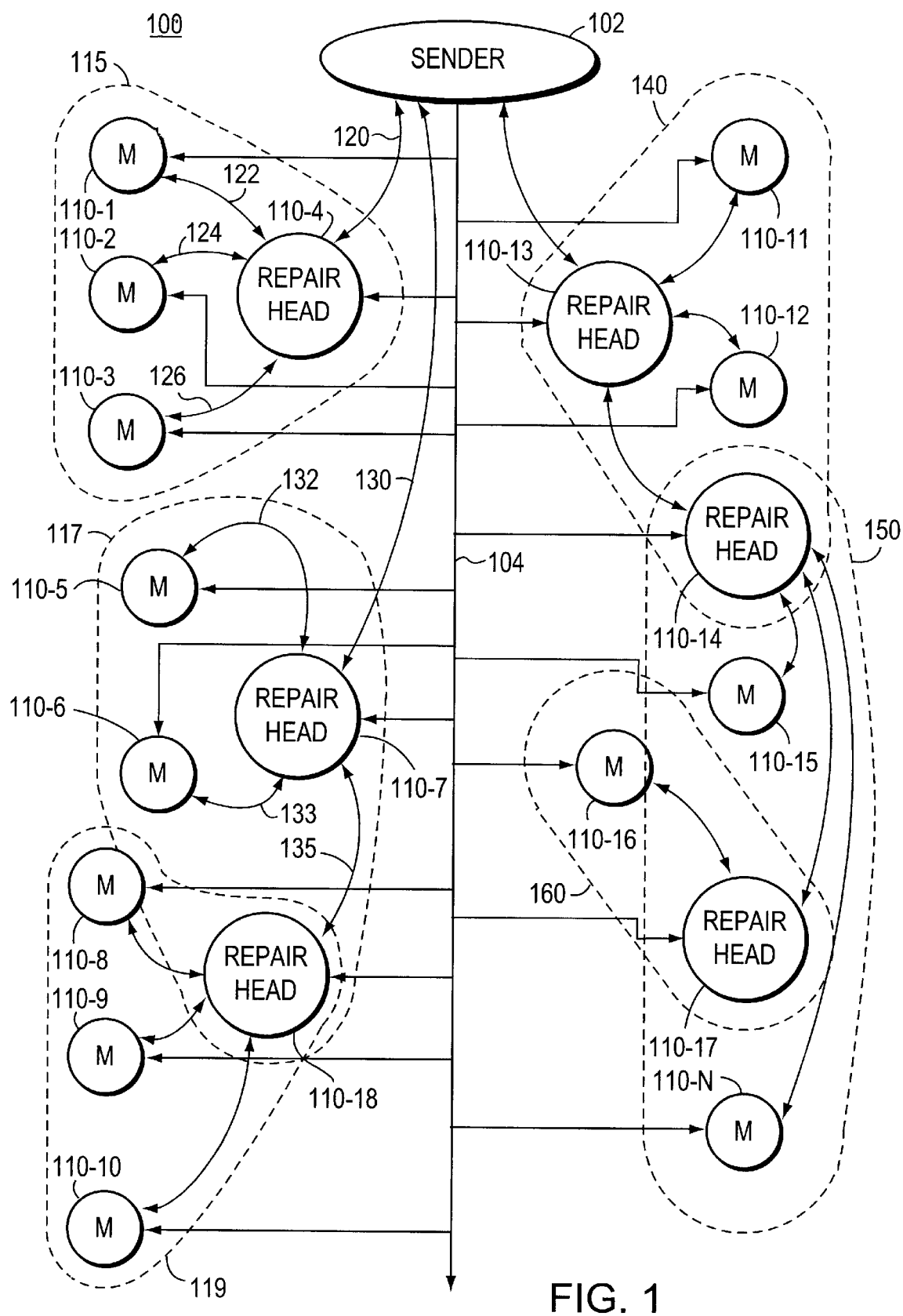
FIG. 1 is a block diagram of a multicast repair tree in accordance with the invention.

The reliability of communication, for example a file transfer comprising a plurality of messages is an important element in computer networking. Reliable unicast communication is established by implementations based upon the concept of a protocol stack. A protocol stack has several levels. At the lowest, or "physical", layer, a physical connection is established between two computers.

The physical connection permits hardware in the "physical" layer to exchange signals between two computers. At the next higher layer, the "data link" layer, frames are constructed in accordance with the requirements of the communication protocol used on the physical layer.

The data link layer provides a best effort, but unreliable, transfer of packets between a sending computer and a receiving computer. Each packet is numbered by a "sequence number" for use by that layer of the protocol for establishing reliable communication.

The next higher layer, for example in some protocols the "LLC2" layer, in other protocols the "network layer", and in still other protocols the "transport" layer, permits establishment of reliable communication. In the transmitter a cache of already transmitted packets is maintained, including the sequence number of each. The receiver checks the sequence number of the received packets and determines if any packets are missing. Packets may be missing because of congestion on the network, unreliability of the medium, static on the line, or any one of many possible reasons. In one design, the receiver transmits an acknowledgment (ACK) message to the transmitter indicating that a packet has been received, and also transmits a negative-acknowledge (NACK) message when it determines that a packet with a particular sequence number is missing. Upon receipt of an ACK, the transmitter flushes the packet from a cache (retransmit cache) used for re-transmission of lost packets. Upon receipt of a NACK, the transmitter then queues the packet from its retransmit cache and retransmits the packet. The transmitter continues to wait for receipt of an ACK before flushing the packet from its retransmit cache. Some protocols use a time-out period with a timer rather than using ACK and NACK messages to signal that a packet should be retransmitted. Some protocols establish reliable communication on every hop of a communication pathway, and some do not.

Protocols used for reliable unicast message transfer are more fully described by Douglas E. Comer in the book Internetworking with TCP/IP, Volume I, and also Volume II, published by Prentice Hall, Englewood Cliffs, N.J., in 1991, all disclosures of which are incorporated herein by reference. The IP portion (Internet Protocol) of the TCP/IP protocol is a layer 3 protocol, and is used to establish unreliable transfer of messages between end stations, for example across the Internet. Layer 3 handles addressing, routing, etc. The TCP portion of TCP/IP (The Connection Protocol) is a layer 4 protocol and establishes reliable communication between the end stations by causing retransmission of packets using the IP protocol.

In a commonly used terminology, the words "datagram" and "message" are often used interchangeably. In an alternative usage, a "message" may be broken into one or more "datagrams". However, in this document the words "datagram" and "message" and "packet" are used interchangeably. A "frame" is used as the messaging unit transferred by the physical layer on a hop between two computers.

Unreliable multicast communication is relatively simple to implement, as the source station simply transmits the datagrams with an address that the designated computers can recognize as a multicast address, and which routers forward. The destination stations then receive any datagrams which they detect. No attempt is made to either identify or retransmit lost datagrams.

Reliable multicast is more difficult to implement. For example, in the case of a few destination computers, the source station must maintain a record of the ACK messages received from each intended destination station so that a datagram missing from any one of the destination stations can be retransmitted. However in the case where there are tens of thousands, even millions, of intended destination stations, the large number of ACK messages will flood the source station and will flood the network. The detrimental effect of too many ACK and too many NACK messages is referred to as ACK implosion or NACK implosion. Administration problems also arise, where for example, a source station has a particular destination station on its list of intended destination stations, and for some reason that destination station is no longer operational. The source station may then continue indefinetly retransmitting messages while waiting for an ACK from the missing station.

One solution to the reliable multicast problem, where the multicast message is to is be received by a group of destination computers, has been to have an administrator (a person or a computer program operated by the person) set up a repair tree. In a repair tree, certain computers are designated as a "repair head". The rest of the computers of the group of destination computers are assigned to a designated repair head. Typically, a source station transmits a multicast datagram onto the network. The datagram should be received by all members of the destination group. Since the datagrams carry a sequence number, each destination station determine if it has missed a datagram. Each station sends an ACK to its repair head upon successful reception of a window of datagrams, and sends a NACK to its repair head upon determining that it has missed a datagram. Upon receipt of an ACK from every member of its repair group, the repair head flushes the datagram from its cache. The repair head retransmits any datagram for which it receives a NACK, until all members of its repair group respond with an ACK for each datagram.

In the event that a repair head is missing a datagram, it NACKs to the source station, and the source station retransmits the datagram. The source station maintains a cache of transmitted datagrams and flushes them after receipt of an ACK from each of the repair heads affiliated with the original source station.

Congestion on the network can result from large numbers of ACK and NACK messages. Particularly, a destination station which is slower than the transmitting source station will miss many multicast datagrams. The resulting NACK messages can cause a NACK implosion and contribute to network congestion. Upon receipt of a NACK message, a source station or repair head will begin retransmission of datagrams, thereby contributing to even more congestion. Congestion can particularly increase when a low bandwidth link is responsible for a number of destination stations being slower than the source station. Each destination station will miss numerous datagrams, and will flood the network with NACK messages, followed by more retransmission in a feedback cycle which increases congestion.

First Exemplary Embodiment

Turning now to FIG. 1, there is shown a multicast repair tree 100. Sender station 102 is transmitting a multicast message to the other stations shown in FIG. 1. Communication path 104 represents the fact that sender station 102 transmits a message having a multicast address, and this message is received by all of the addressed stations, 110-1, 110-2, . . . 110-N directly from sender station 102. Communication path 104 may include, physically, many hops through many physical networks. Communication path 104 simply represents that the destination stations receive the multicast message directly from sender station 102.

During operation, sender station 102 first transmits a beacon message with the multicast address of the intended destination stations for the multicast message. The beacon message alerts the destination stations that they should arrange themselves into a hierarchical multicast repair tree (repair tree hereinafter) in preparation to receiving the multicast message so that the message can be reliably received by all destination stations. FIG. 1 represents the situation after the repair tree has been formed. The method of formation of the repair tree will be fully disclosed hereinbelow.

During operation of the dynamically configured multicast tree protocol, sender station 102 transmits beacon messages in order to assist in establishing the repair tree 100. Beacon messages transmitted by sender station 102 are also used in management of congestion control in the repair tree.

Destination station 110-4 is selected to be a repair head by the tree forming process, either static or dynamic. Destination stations 110-1, 110-2, 110-3, and 110-4 form a repair group 115. Repair head 110-4 caches messages received from sender station 102, and repair head 110-4 transmits ACK messages to sender station 102 along path 120 as numbered messages are successfully received by repair head 110-4. Sender station 102 maintains a cache of messages which it has transmitted, and maintains a log of ACK messages received from various repair head stations so that it can clear a message from its cache after ACK messages have been received from all repair head stations, as will be more fully described hereinbelow.

Path 104 represents the multicast path where data, retransmission and beacon messages, flow. Paths 120, 122, 124 and 126, etc. represent unicast flows of ACK and congestion messages.

Repair head 110-4 receives ACK messages from the destination stations in its repair group 115, including destination station 110-1 along path 122, destination station 110-2 along path 124, and destination station 110-3 along path 126. Repair head 110-4 maintains a cache of messages transmitted by sender station 102, and upon receipt of ACK messages from all of the member stations of its repair group, deletes the message from its cache.

Repair group 115 is illustrated in FIG. 1 as having four (4) members, receiver members 110-1, and 110-2, and 110-3, designated by an "M", and also repair head 1104. A repair head may have many members in its repair group.

In this way, repair head 110-4 acts to receive the ACK messages from members of its repair group 115, and "repairs" missing messages transmitted by sender station 102 to destination stations 110-1, and 110-2, and 110-3 of its repair group 115. By "repairing", that is by retransmitting missing messages, repair head 110-4 provides reliable multicast communication from sender station 102 to members of repair group 115.

Repair group 117 has as members stations 110-5, and 110-6, and 110-7, and 110-18, with member station 110-7 being the repair head. Repair head 110-7 caches messages received from sender station 102 and transmits its ACK messages to sender station 102 along path 130. Sender station 102 then re-transmits a message for which it receives a NACK from repair head 110-7. Ordinary members of repair group 117 transmit their ACK messages to repair head 110-7: station 110-5 along path 132, station 110-6 along path 133, and station 110-18 along path 135. Repair head 110-7 maintains a cache of all messages transmitted by sender 102, and deletes the messages as soon as an ACK is received from each of the member stations of repair group 117.

Repair group 119 illustrates a second level in the repair tree hierarchy. Station 110-18 is a member of repair group 117. Station 110-18 is also a repair head for repair group 119. Repair group 119 has members 110-18, its repair head, and also station 110-8, station 110-9, and station 110-10. Repair head station 110-18 maintains a cache of messages transmitted by sender station 102. Any messages missed by repair head station 10-18 are repaired by use of path 135 for sending ACKs (NACKs) to its repair head 110-7. Repair head station 110-18 receives ACK messages from member stations: station 110-8, station 110-9, and station 110-10, and when an ACK has been received from all member stations of its repair group, repair head station 10-18 deletes the message from its cache.

Similarly, repair group 140 has repair head 110-13 with additional member stations 110-11, station 110-12, and station 110-14. Repair head station 110-13 transmits its ACK messages to sender station 102, and so is in the first level of the hierarchical multi-cast repair tree.

Station 110-14 is also a repair head station for repair group 150, and so is a second-level repair head station.

Member station 110-17 of repair group 150 is also a repair head station for repair group 160, and so is a third-level repair head station in the repair tree hierarchy.

With a repair head hierarchy, the ACK messages are distributed among a plurality of repair head stations. The number of members of each repair group are limited so that each repair head station can handle the ACK messages, and can also handle the retransmission of messages for which NACK information is received. No "ACK implosion" and no "NACK implosion" occur, both because the repair work is distributed over many computer stations, and congestion and flow control prevent excessive packet loss, and so reliable multicast communication is established.

Congestion and Flow Control

The invention avoids an ACK implosion by spreading out the ACK (and NACK) messages so that a flood of them do not reach the repair head simultaneously. The use by members of the ACK window for timing of transmission of the ACK messages helps to prevent too many ACK messages from reaching the transmitting station at the same time. The ACK messages contain both acknowledgment information for packets received by the member station, and contain NACK information for packets not received by the member station, as based on the sequence numbers of the packets. The term "ACK message" will be used throughout this patent to indicate a message returned by a receiving station to a transmitting station, where the message carries both ACK and NACK information.

The ACK window is defined for a multicast session by establishing the number packets which make a full sequence of ACK windows. Receipt of a full window of packets is an event which triggers transmission of an ACK message by a member station. In a preferred embodiment of the invention, the ACK window size is configurable, and the default number of packets which make a full sequence of ACK windows is thirty two (32) packets.

To prevent many member stations from sending ACK messages at the same time, ACK messages are distributed over the next ACK window. Each member is assigned a window (for example between 1 and 32) for sending its ACK messages. For example, one member may send ACKs after receiving messages 32, 64, 96; etc., while another sends ACKs at messages 10, 42, 74, etc. The ACK messages may be sent as the next window of packets are being received, because at the levels of the protocol stack at which the invention operates, communication is full duplex.

In an exemplary embodiment of the invention, acknowledgments are also sent if an ACK timer counts up to, for example, greater than 1.5 times an estimated ACK interval. The estimated ACK interval is computed at each receiver when an ACK is sent. The estimated ACK interval estimates the amount of time it takes to receive an ACK window's worth of messages. The formula is:

$$ACK\ interval = ACK\ window * (\text{Time since last } ACK/\text{Packets since last } ACK)$$

If this timer expires, it indicates that the sender has paused and allows members to report and recover any lost packets without having to wait for the sender to start sending new data.

The ACK message format which both reports NACK information (that is, packet loss information) and acknowledgment information (ACK information) uses a bit map length field. Each ACK message contains the bit map length field and a start sequence number. If no packets were missing, the bit map length is "0" and the sequence number indicates that all packets prior to and including this packet were successfully received. The repair head saves this information and uses it to flush packets from its cache.

If there are one or more missing packets, the start sequence number indicates the first missing packet. A bit map must follow. Each bit in the map represents a packet sequence number starting with the start sequence number. If the bit is set, for example, that packet is missing and must be retransmitted.

When the repair head receives an ACK message with a missing packets bit map, the sequence number specified minus 1 is saved for this member. This indicates that all packets prior to and including this sequence number have been received successfully. The repair head then scans the bit map looking for missing packets. It immediately places these packets onto the transmit queue unless they have recently been retransmitted or are already on the queue from another request. Missing packet retransmission receives first priority in the transmission queue, so that packets may be flushed from the transmitter cache.

Also, in accordance with the invention, the cache buffers in the source station, and in the repair head stations, hold packets which have been transmitted but for which an ACK has not yet been received. It is necessary to prevent overflow of this buffer, and accordingly, the "fill level" of this buffer is monitored. A threshold is assigned for the fill level. When the threshold for the fill level is exceeded, the sender station stops sending packets and waits for ACK messages so that it can flush acknowledged packets from its buffer. This wait is a pause in the transmission of packets, and causes the ACK timer in members to expire, and the members then to transmit an ACK message.

Also, in accordance with the invention, the transmission rate of packets by the source station, and by the repair head stations, is dynamically adjusted. Adjustment of the transmission rate of packets is accomplished by causing the sender station to pause between transmission of packets, so that the average transmission rate of packets will have a desired value. The transmission rate should be high so as to fully use the band-width of the network, and should be sufficiently low that packets are not lost due to congestion, or to the inability of a receiver station to keep up with the transmitter. Since the bandwidth of the network is unknown, the sender station starts transmitting at an assigned minimum rate, and then starts increasing the rate by adding an increment to its transmission rate at the occurrence of selected events (additive increase). In a preferred embodiment of the invention, the selected event is the transmission of a full set of windows of packets.

Upon receipt of an ACK message indicating that packets have been lost, the transmitting station reduces its transmission rate by multiplying its current rate by a fraction, for example 0.25 (multiplicative decrease). By using an additive increase along with a multiplicative decrease, the transmission rates of each of the transmitting stations adjusts itself to an optimum rate for its network, and its receiving stations.

Accordingly, a transmitting station has a "slow start". That is, the transmitting station begins transmission at a "slow" or minimum rate of packet transmission and slowly increases its rate by "additive increase" until it receives notice that packets are being lost, at which time the transmitting station reduces its transmission rate. After the reduction, the station again begins increasing its transmission rate. The transmission rate therefore oscillates, and attempts to fully utilize the bandwidth of the network.

A key point about the slow start phase of the multicast transmission session is that the historical high rate is established as the maximum rate for which packets were not lost.

A further feature of the invention in retransmission operation is to avoid duplicate retransmission. Whenever an ACK message indicates that a packet must be retransmitted, first a check is done in order to determine if that packet is already in the transmit queue. If the packet is already in the transmit queue, the new ACK request is ignored.

Stable system operation is achieved by the invention. In accordance with the invention, synchronization between feedback, from reading ACK messages, and control in increasing or decreasing the transmission rate, is maintained in order to achieve stable system operation. Synchronization is maintained by requiring the transmitting station to immediately decrease the rate after receiving feedback which indicates congestion. The station is then required to wait for a number of windows before implementing either another decrease or an increase in rate. This wait permits the effect of the change to be felt throughout the network, and for the most recent feedback to be in response to that change.

Pruning of receiving stations from the multicast network is done when a station gives evidence that it cannot keep up with the transmitting station when it is operating at its minimum transmit rate. Evidence that a station cannot keep up appears at the transmitting station as an excessive number of retransmission requests. When the number of retransmission requests becomes excessive, the offending station is dropped (that is, pruned) from the multicast tree.

A still further feature in accordance with the invention is that an "end of packet" beacon frame is transmitted by the source station after all packets of the multicast transmission sequence have been transmitted. This "end of packet" beacon frame informs the various stations of the sequence number of the last packet, so that retransmission requests can be appropriately formulated.

Second Exemplary Embodiment
Communications

Figure 2:
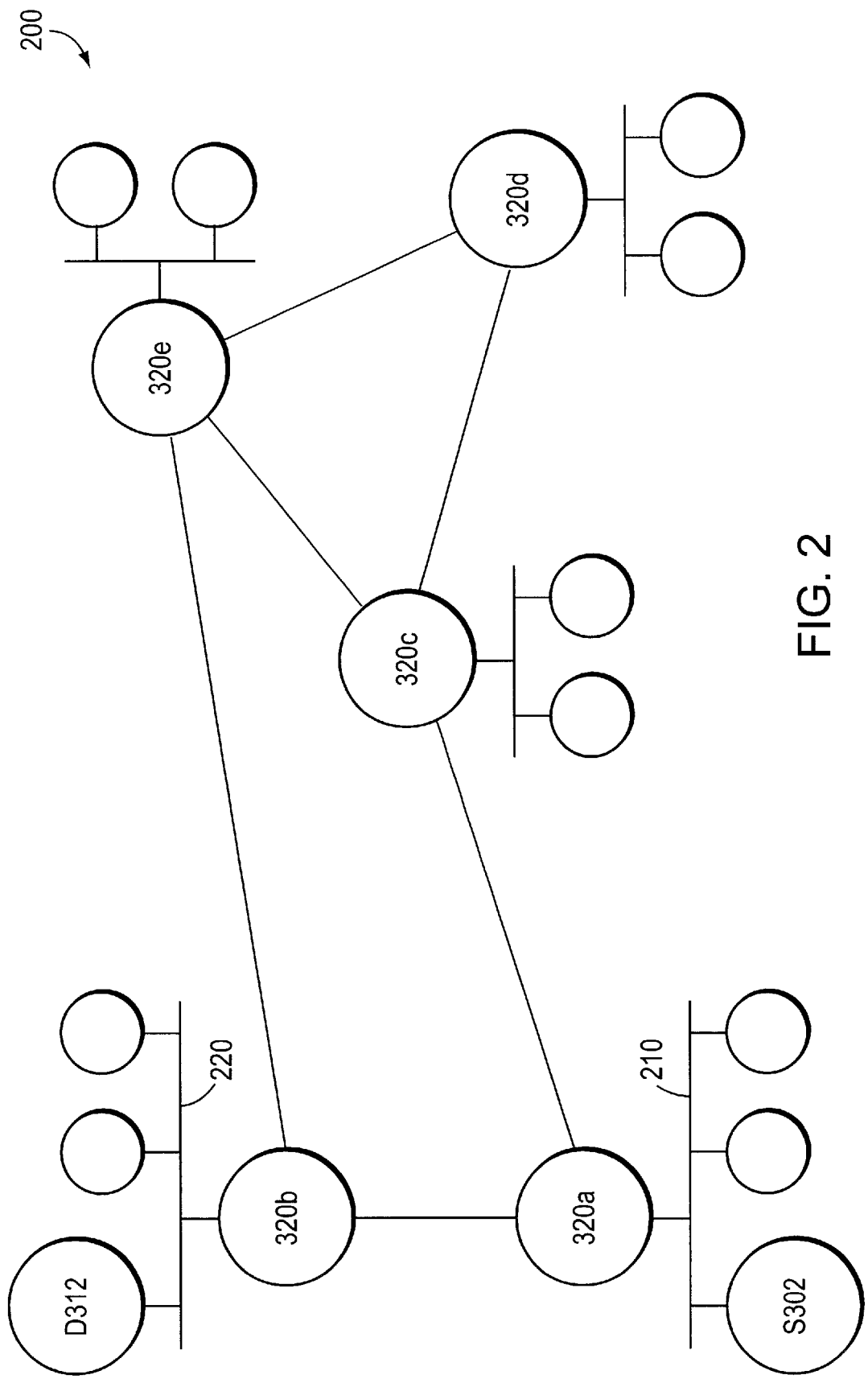
FIG. 2 is a schematic block diagram of a computer internetwork comprising a collection of interconnected communication media attached to a plurality of stations, including end stations.

FIG. 2 is a schematic block diagram of a computer internetwork 200 comprising a collection of interconnected communication media attached to a plurality of stations. The communication media may be configured as local area networks (LANs) 210 and 220, although other media configurations such as point-to-point network links may be advantageously employed. The stations are typically computers comprising source and destination end stations 302, 312, such as personal computers or workstations, and intermediate stations 320a–e such as routers, bridges, switches and/or firewalls. Communication among the stations is typically effected by exchanging discrete data frames or packets between the communicating nodes according to a predefined protocol, such as the Internet protocol (IP), Internet Packet Exchange protocol, AppleTalk protocol or DECNet protocol.

Figure 3:
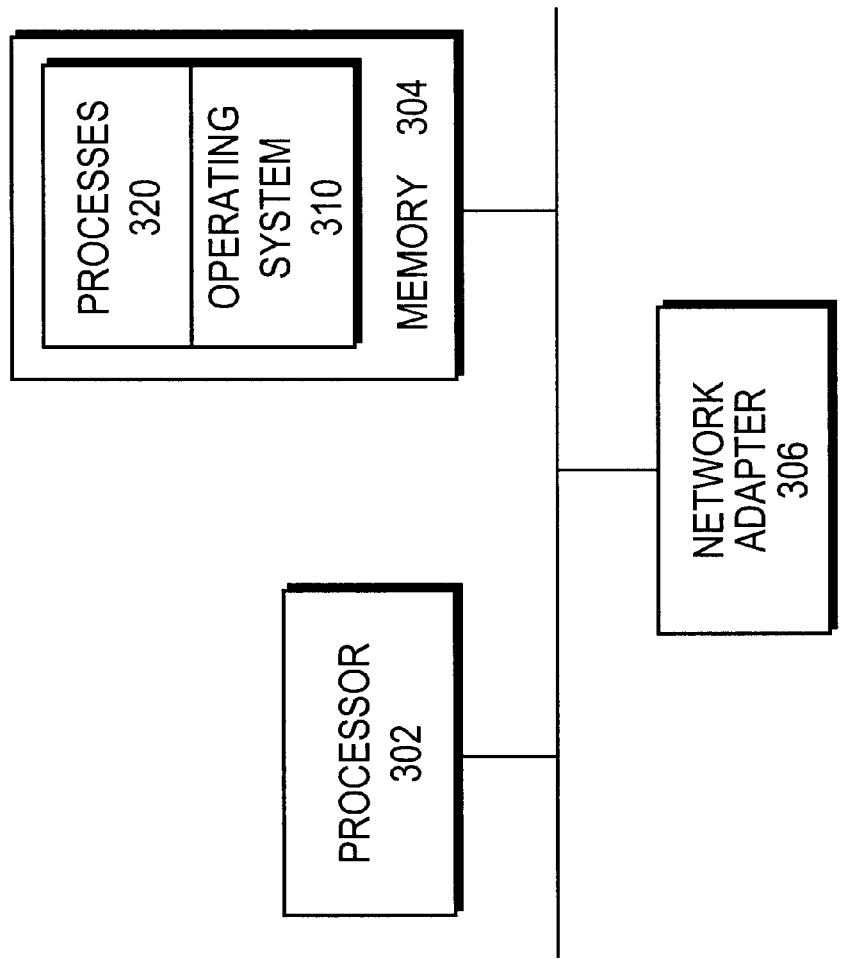
FIG. 3 is a schematic block diagram of a station, such as an end station, configured to operate in accordance with a reliable multicast transport protocol of the present invention.

FIG. 3 is a schematic block diagram of a station, generally designated 300, configured to operate in accordance with the invention. The station may comprise any type of station, such as an end station, that is capable of advantageously sending and/or receiving data frame/packet messages in accordance with the protocol of the present invention. The station generally comprises a plurality of interconnected elements, such as a processor 302, a memory 304 and a network adapter 306. An operating system 310, portions of which are typically resident in memory and executed by the CPU, functionally organizes the station by, inter alia, invoking network operations in support of software processes 320 executing on the station.

The memory may comprise storage locations addressable by the processor and by the adapter for storing software programs and data structures associated with the inventive multicast transport protocol. The processor is typically a central processing unit (CPU), although it may generally comprise processing elements or logic configured to execute the software programs and manipulate the data structures. It will be apparent to those skilled in the art that other processor and memory means, including various computer readable media, may be used for storing and executing program instructions pertaining to the techniques described herein.

An exemplary embodiment of the invention is referred to as the Tree based Reliable Multicast protocol, or TRAM model as a shorthand.

Broadly stated, the inventive multicast transport protocol (TRAM) utilizes a hierarchical tree-based multicasting system for transferring identical data from a single sender to multiple receivers (clients). The sender and receiving clients in a multicast session interact with each other to dynamically form repair groups. The repair groups are linked together in the hierarchical tree with the sender at the root of the tree. Each repair group has a receiver that functions as a group head for other receiving clients in the tree. Except for the sender, each repair group head in the system is a member of another repair group.

Group members report lost and successfully received messages to their associated group head using a selective acknowledgment mechanism. The repair heads store ("cache") every message received from the sender, and provide repair services (i.e., re-transmission) of messages that are reported lost by the members. Features are also provided to permit the tree structure to adapt depending upon the changes that may occur in the network during the multicast session, so as to permit optimal multicasting during the session.

To dynamically construct the tree, the system utilizes a "top-down" approach wherein the tree begins formation from the sender. That is, the sender starts accepting client members for its own repair group, and each receiving client, upon becoming a member of a repair group, may start to form its own respective repair group. Every receiving client has to be a part of the tree in order to form a repair group of its own. Advantageously, this top-down approach guarantees caching of data somewhere in the tree hierarchy, because repair heads accept members in their respective repair groups only after attaching to the tree.

In order to attach to the tree, a receiving client discovers a repair head that can accept the receiving client as a member of the repair head's repair group. This may be accomplished most efficiently from the standpoint of network resource usage by periodically multicasting from receiving clients an advertisement message that the receiving client issuing the multicast message is seeking a repair head with which to become associated. Alternatively, current repair heads in the system may periodically multicast an advertisement message to solicit new members.

The tree system may be constructed in networks supporting only unidirectional multicast, bi-directional multicast, combinations of uni-directional and bi-directional multicasting, and local area network (LAN) environments. Tree construction is initiated by the sender multicasting either a periodic beacon message or data to the multicast group using the multicast session time-to-live (TTL) scope. Advertisement messages from the repair group heads seeking client members, and/or receiving clients seeking repair head advertisement are multicast using an expanding ring search (ERS) mechanism. Receiving clients affiliate themselves with the closest repair head.

Each repair head monitors the operation of the members of its respective repair group to ensure that the members are functioning properly. Likewise, each of the members of a given repair group monitor the operation of the repair head associated with that group to ensure proper functioning of the head. If a repair head determines that a member of its group is no longer functioning (e.g., as a result of failure of the member to acknowledge receipt of special monitoring messages after a predetermined number of messages have been transmitted and/or a predetermined time period for response has elapsed), the repair head may prune that member from its group.

Similarly, if a member of a repair group determines that the current repair head that it is associated with is no longer functioning properly (e.g., if the member does not receive special monitoring messages from the head), the member may seek to re-affiliate itself with a different repair head that it has learned of as a result of receipt of monitoring messages from that different head. The members of the group may also re-affiliate themselves with a different repair head if the current repair head with which they are associated resigns from being the repair head for that group. Such resignation may occur if the repair head determines that it is redundant in the region of the system in which it resides.

Optimization of Reliable Multicast Repair Trees

As noted, it is often useful to use IP multicast to disseminate data to a large group of receivers on a data network. However, any number of data messages may be lost in transit due to errors or overloading of networking equipment. Ensuring that each member of such a group has received all of the data is difficult for a single sender to determine once the group is of any size, since messages from each member to the sender can over-load the sender. Organizing the members of such a group into a tree structure for aggregation of this information is a scaleable way to avoid this problem.

In accordance with an aspect of the invention, optimization features are provided for organizing the members into a tree. Broadly stated, selected members of the receiver group are designated to be heads. Each head is responsible for ensuring that the set of members assigned to it receives all of the data. Heads also propagate information about the tree back to the sender, such as congestion information, reception information, and number of members.

Repair trees for reliable multicast are generally constructed once, at the beginning of or in advance of a multicast transmission. While these trees may be optimal at the time of construction, they may become suboptimal as time goes on and conditions change. No matter which criteria are used to construct a tree, changes in the composition of the group as well as the underlying network infrastructure may make a change in the tree structure desirable to keep it optimal.

For example, if all receiving clients are densely located in one network region (e.g., an intranet with relatively few hops in-between the sender and receivers), it may become difficult to form repair groups that have a low degree of membership overlap. In this situation, an optimal construction of the tree has as few repair heads as possible. In order to carry this out, an existing head may assume the duties of another head to thereby reduce the number of active heads. This can be initiated either by members of the retiring head or by the retiring head itself.

In some cases, it may be desirable to form a sparse tree wherein the number of members in each repair group is minimized. In order to carry this optimization out, members of a given group whose membership exceeds a predetermined maximum threshold may be directed to affiliate themselves with another repair head. Once again, this optimization may be initiated either by the members themselves or by the current head with which they are affiliated. Alternatively, if it is determined that another head with which a member is currently not affiliated is closer to that member than the current head with which the member is affiliated, the member may become affiliated with the closer head.

This aspect of the invention describes the following ways of optimizing existing repair trees:

A dense tree may be desired in which the number of internal nodes (heads) is to be kept to a minimum.

A closely-knit tree may be desired in which a node chooses a head that is as close to it as possible.

A sparse tree may be desired in which the number of members for each head is kept to a minimum.

In the case of the dense tree, an existing head may be able to take over the duties of another, optimizing the tree by reducing the number of active heads by one. This optimization can be instigated by either members of the extraneous head, or by the extraneous head itself. In a first case, a member of Head1 may notice another head, Head2, which has more members than Head1. The member learns of Head2 by overhearing its multicast messages. The member subsequently changes its affiliation to Head2. In a second case, a head, Head1, may notice a more optimal head, Head2, and direct Head1's members to use Head2 instead. Once Head1 no longer has any members, it can discontinue its head duties. Both of these methods guarantee a convergence of the tree to the to fewest number of heads possible. For instance, if members of a group are concentrated on local area networks, it is efficient to have a minimal number of heads per LAN, assuming that all of the receivers on each LAN will share the same loss experience.

In the case of a sparse tree, members may be directed to new heads in order to off-load existing ones. This optimization can be instigated by either members of the overloaded head, or by the overloaded head itself. In the first case, a member of Head1 may notice another head, Head2, which has fewer members than Head1. The member learns of Head2 by overhearing its multicast messages. The member subsequently changes its affiliation to Head2. In the second case, a head, Head1, may notice a less loaded head, Head2 and direct some of Head1's members to use Head2 instead. Both of these methods guarantee a convergence of the tree to one in which the number of members for each head is kept to a minimum. This type of tree is useful if most of the members have little capacity to act as heads.

In both the dense tree and the sparse tree cases, reaffiliation of a receiver station is based on the number of receiver stations served by the repair head station. In the dense tree situation a receiver station reaffiliates with a repair head station having a greater number of member stations in its repair group in order to reduce the number of repair head stations. In contrast, in the sparse tree situation a receiver station reaffiliates with a repair head station having a smaller number of member stations in its repair group in order to balance the repair work among the repair head stations. In both the dense tree and the sparse tree cases the number of member stations served by a repair head station is determined by the TOTAL MEMBER COUNT field of the Hello Message of FIG. 25, or the DIRECT MEMBER COUNT field of the HA Message of FIG. 23. Either a receiver station can read the Hello Messages and HA messages which it receives from all repair head stations, or a repair head station can read these fields in the messages it receives from other repair head stations.

In the case of the closely-knit tree, changing network conditions or a new group member may result in a new head that is closer to a particular member. This optimization can only be instigated by members of the now suboptimal head as follows: a member of Head1 may notice another head, Head2, which is closer than Head1. The member learns of Head2 by overhearing its multicast messages. The member subsequently changes its affiliation to Head2. This method guarantees a tree in which members are as close to their heads as possible. This type of tree best suits a group in which most members are not generally co-located.

The distance between a receiver station and a repair head station is calculated in terms of the number of routers which have forwarded the message as the message travels from the repair head station to the receiver station. The distance is calculated by a receiver station in response to an initial TTL value carried in field TTL SCOPE of Hello Messages or in field TTL DISTANCE of HA Messages of FIG. 23, and a decremented value of TTL read from the IP header of the message. Subtracting the decremented value read from the IP header from the initial value carried in the field of the Hello Message or the HA Message gives the number of routers which have forwarded the message, and therefore the distance between the repair head station and the receiver station.

Congestion Detection and Feedback

The flow and congestion control mechanism is generally rate-based and adjustable, based upon network congestion. That is, the transmission rate of multicast data packets is dynamically adjusted based upon the rate at which the receiving clients can accept and process the data packets. A pruning mechanism is also provided whereby receiving clients that are unable to receive and process the data packets at a minimum threshold rate are removed from the tree system.

For example, each multicast data packet transmitted from the sender includes a unique sequence number. Receiving clients utilize these numbers to detect out-of-order and missing packets, and to request transmission of same from the repair head with which it is associated. Each of the repair heads maintains a cache of multicast packets received from the sender and flushes the packets out of the cache after receipt of the cached packets by all of the members of its repair group has been acknowledged. In order to avoid multiple members sending such acknowledgment messages at the same time, and to expedite repair, each member of a repair group selects a random packet between one and a predetermined acknowledgment window size to begin transmission of acknowledgment messages. Using a single acknowledgment message for each respective acknowledgment window, the members acknowledge those packets of that window that have been received and not received. Each repair head computes the average data rate of all packets it receives, and sends retransmissions to the members of its group at this rate.

Congestion is detected at the receiving clients and repair heads, and is used to dynamically adjust transmission rate of packets in the system. More specifically, the receiving clients transmit congestion messages to their repair heads based upon changes in the number of data packets that the receiving clients failed to receive between the preceding two acknowledgment windows. When the repair head receives these congestion messages, it generates a congestion message for each acknowledgment window and forwards that message to its own repair head. Each repair head also generates congestion messages when its data cache (i.e., for retransmission purposes) equals or exceeds a predetermined maximum fill level. The repair head may also adjust upwardly its maximum cache fill level, if possible. The sender adjusts its data transmission rate based upon the congestion it receives as well as its own cache fill level for its immediate group members, while staying within predetermined minimum and maximum data transmission rates.

More specifically, in an exemplary embodiment of the invention, the sender increases transmission rate every second acknowledgment window in the absence of congestion reports. When a congestion report is received, the sender immediately reduces transmission rate and records the window for which the congestion report was generated, and thereafter, the sender does not further adjust transmission rate until a predetermined number N of acknowledgment windows have transpired, wherein N is proportional to the current data transmission rate divided by the historically highest achieved transmission rate.

After each rate decrease, the next increase in transmission rate is equal to the historically highest achieved rate minus the current data transmission rate, divided by a number, for example 4. After receipt of a congestion report, the sender reduces its data transmission rate by a predetermined percentage (e.g., 50% or 25%) of current data transmission rate. The sender's data transmission rate never exceeds, and never falls below, respective predetermined maximum and minimum thresholds.

The sender notifies all members of the session when it has completed data transmission by transmitting a beacon packet that includes the sequence number of the last data packet transmitted. The sender retransmits this packet periodically until all of the members of its immediate repair group have acknowledged receipt of all packets sent.

When a member receives the beacon packet, it immediately sends an acknowledgment to its repair head indicating whether it has received all of the packets transmitted, or requires packet retransmission. If the beacon from the sender is received, but a member has not acknowledged receipt of all data packets, a monitoring message is transmitted from the repair head associated with that member. If the member does not acknowledge receipt of such message to the repair head sending the monitoring message, the repair head may retransmit the monitoring message. If, after a predetermined number of retransmissions of the monitoring message, the member has still failed to acknowledge receipt, the repair head prunes the member from the tree. When all members have either acknowledged receipt of all data packets to the repair head or have been pruned from the tree, the repair head terminates its session.

Third Exemplary Embodiment

General Discussion of the Hierarchical Repair Tree

The TRAM model is tree-based. The tree formation process is dynamic. The TRAM tree formation algorithm works in both bidirectional multicast environments and unidirectional multicast environments (such as satellite links) with unicast-only back-channels. Repair nodes are elected based on a wide spectrum of criteria, and the tree is continuously optimized based on the receiver population and network topology. The ACK reporting mechanism is window-based, including optimizations to reduce burstiness and processing overhead. The flow control mechanism is rate-based and adapts to network congestion. The sender senses and adjusts to the rate at which the receivers can accept the data. Receivers that cannot keep up with a minimum data rate can be dropped from the repair tree.

Some of the major features of TRAM are:

Reliability

TRAM guarantees delivery of data to any receiver that joins the tree and is able to keep up with the minimum transmission speed specified by the sender. While this level of guarantee cannot ensure applications against delivery failure, features can be used to closely keep track of individual members' status.

Avoiding Acknowledgment Implosion

Point-to-point transports achieve reliability by acknowledging receipt of data directly to the sender. Unfortunately this does not scale over multicast. A sender trying to field acknowledgments from many receivers will quickly become overloaded. TRAM avoids this implosion by dynamically designating a receiver to be a repair head for a group of members. The repair head fields acknowledgments from each of its group members and supplies them with repair packets. To avoid overload, each repair head is responsible for only a limited number of members.

Local Repair

TRAM builds the tree so that repair heads are close to their members. A frame or message usually carries a "time-to-live" indication in its header which was written by the source station which transmitted the message onto the network. Upon expiration of the time-to-live value the message will no longer be forwarded by routers or other hardware of the network. The "time-to-live" is measured, in this document, by hop count. For example, if the time-to-live has the value of "2", the message will be forwarded for only two (2) hops. Alternatively, if the time-to-live has a value of "4", the message will be forwarded over four (4) hops in the network. Use of a time-to-live designation in message headers enables repair heads to perform repairs using small time-to-live (TTL) values, which not only minimizes network bandwidth consumption but also avoids unnecessary processing at receivers not requiring repair.

Automatic Configuration

Different applications, networks, or user groups may perform better using different types of trees. TRAM provides for building different types of trees optimized for these different circumstances without adding complexity to the network infrastructure itself. As a receiver group changes, TRAM also provides for ongoing optimization of an existing tree. For instance, a member is enabled to find a better repair head. A particular tree's formation method may also be changed at any time during the transmission at the discretion of the sender. TRAM's tree management works in networks providing only unidirectional multicast, as well as those supporting bidirectional multicast.

Rate-based Flow Control and Congestion Avoidance

TRAM schedules packet transmission according to a data rate. This data rate is dynamically adjusted based on congestion feedback from the receivers. Congestion feedback is aggregated by repair heads through the tree. The algorithm used to adjust the rate works in different network topologies. The rate is bounded by maximum and minimum rates configured at the sender station.

Feedback to the Sender

Each member of the tree periodically reports statistics to its repair head. This includes statistics that assist in building the tree in dynamic tree embodiments of the invention (for instance, the number of available repair heads on the tree) as well as reports on congestion conditions. Reports on congestion conditions from repair heads allow the sender to adapt its data rate to network conditions. This information is aggregated at each level of the tree in order to reduce control traffic to the sender.

Controlling Memory Use

Each repair head is responsible for ensuring that the data is received by all of its members. This means that a repair head must cache data until it is sure that all of its members have received it. TRAM requires positive acknowledgments from members when data is received. This enables repair heads to reclaim cache buffers containing data that has been received by all members.

Repair Group Management

Both members and repair heads monitor each other to detect unreachability. Non-responsive members can be dropped from the repair group and corresponding cache buffers can be reclaimed. Non-responsive repair heads can be abandoned by their members in favor of an active repair head. Repair heads are also responsible for detecting receivers which cannot keep up with the minimum transmission rate specified by the sender. While such members cannot be dropped from the multicast group, they can be denied repair head support and receive no repairs.

Scalability

TRAM has been designed to be scalable in many situations, such as large numbers of receivers and sparsely or densely populated receiver groups. TRAM also accommodates wide ranges of receiver capabilities. Control message traffic is designed to be limited in all of these cases.

Tree Formation and Management

FIG. 4 shows a typical hierarchical repair tree of TRAM with repair heads caching the multicast data sent by the sender and performing localized repairs to their group members.

A hierarchical repair tree can be constructed using either a top-down or a bottom-up approach. In the top-down approach, the tree begins to form from the sender. That is, the sender will first start accepting members for its repair group and each receiver upon becoming a member of some group can start to form its own repair group. A receiver has to be part of the tree to form a repair group of its own.

In the bottom up approach, the receivers can independently start forming their own repair groups even before attaching to the tree.

The top-down approach guarantees caching of data somewhere in the tree hierarchy because the repair heads accept members only after attaching to the tree. The same level of guarantee cannot be achieved with the bottom-up approach, as a repair head that is still unattached may receive repair requests for data for which the repair head itself needs to seek repair. The data guarantee as stated here assumes the use of an acknowledgment-based mechanism to manage the data cache. Repair groups may be formed more quickly using the bottom-up approach due to parallelism. TRAM primarily uses the top-down approach, but incorporates the advantages of the bottom-up approach in its optimization for LANs.

Tree Construction Techniques Supported In TRAM

To dynamically construct the repair tree, a protocol has to have mechanisms to enable receivers to attach and detach from the tree. Since TRAM uses the top-down approach, a receiver has to first attach to the tree before it can form its own repair group. In order to attach to the tree, a receiver has to discover a repair head that can accept it as its member. The discovery process can be done in one of two ways:

(1) the current repair heads in the system periodically multicast an advertisement message to solicit new members, or (2) the receivers that are seeking a repair head multicast a periodic advertisement message.

From an efficiency and network resource usage standpoint, the second option is more attractive because the advertisements occur only when there are receivers that are seeking a repair head and will stop when all the receivers in the system are attached to the tree. The major disadvantage of the first option is that head advertisements have to persist for the entire multicast session as repair heads have no way of discovering that all receivers have attached to the tree. The only disadvantage of the second option is that it requires the underlying network to support bidirectional multicast service.

It is possible to have a configuration in which there is no guarantee of multicast support from every receiver back to the sender. But there is enough support for any member to find a head using the second option.

To be flexible and independent of network-related constraints, TRAM supports the following tree construction techniques:

Repair tree construction when the network supports only unidirectional multicast.

Repair tree construction when the network supports bi-directional multicast.

Combination of unidirectional and bi-directional multicast tree construction techniques.

Repair tree construction when, multiple receivers are on a LAN (LAN-based Tree Formation). This method can be used locally on a LAN, with any of the above methods used to connect the LAN tree to the rest of the group.

Some of the generic policies governing the tree construction process in TRAM are:

1. The repair tree construction process is initiated by the sender by multicasting either a periodic control message (called the beacon message) or data to the multicast group using the session TTL scope.

2. The advertisement messages (the head seeking member advertisement and the receiver seeking head advertisement) are multicast using the Expanding Ring Search (ERS) mechanism. The ERS mechanism is used to control the scope of these messages. TRAM allows the maximum value of this scope to be limited in order to control advertisement traffic.

3. Receivers affiliate with the closest repair head. Closeness is determined by the shortest TTL distance from the repair head to the receiver. This policy promotes localized repairs.

Other prioritizations of parameters, such as round-trip time, or tree level, result in the formation of different kinds of trees. For instance. a repair head may be chosen based on its proximity to the sender.

4. Each repair head maintains a repair TTL that is large enough to reach all its members.

5. The repair heads in TRAM have to cache the received multicast data messages, perform repairs, and also process acknowledgments from the group members. Not every receiver in the system may be suitable to perform this role. A receiver may be unsuitable for reasons relating to hardware, software, resource limitations, or administrative restrictions. TRAM allows receivers to be configured with the following preferences:

EagerHead.

ReluctantHead.

MemberOnly.

An EagerHead will attempt to form its own repair group upon attaching itself to the tree. A ReluctantHead will also attempt to form its own repair group; however, the rules of repair head selection will prevent it from attracting members unless no eager repair heads are available. Note that the default value for receiver preference is ReluctantHead; this allows a tree to be formed without specifically configuring a receiver preference for each member. A MemberOnly receiver will never attempt to perform the role of a repair head.

6. The sender of the multicast session is an EagerHead and is always considered to be part of the tree.

7. To reduce the processing load on repair heads, TRAM supports mechanisms to restrict the number of members that an individual repair head can accept.

Repair Tree Construction Under Unidirectional Multicast

There are many existing networks that support multicast with some restrictions. These restrictions can be either technological (hardware or software limitations) or administrative in nature. A typical administrative restriction can be a network that is configured to forward incoming multicast messages and discard all outgoing multicast mess ages originating within the network. Constructing a dynamic repair tree with multicast restrictions can be tricky and complex. The following tree construction technique is adopted by TRAM when the underlying network has only unidirectional multicast.

All receivers tuned to the multicast group are inactive until the sender initiates the tree formation process. The sender triggers the process by multicasting either the beacon or data. Data as-well as beacon messages contain the HeadAdvertisementInterval information. The HeadadvertisementInterval specifies the rate at which Headadvertisement messages are to be sent out by the affiliated repair heads in the system. The sender alters the HeadAdvertisementInterval as the number of advertising repair heads in the system changes. This restricts the HeadAdvertisement traffic to a constant bandwidth. The number of advertising repair heads in the system is propagated up in the tree hierarchy and is made available to the sender. The sender computes the HeadAdvertisementInterval using the following formula HeadAdvertisementInterval=max(½ second, AdvertisingHeadCount*HASize/MaxHABW, AdvertisingHeadCount/MaxPacketRate)

Where
HASize the size of the HeadAdvertisement message in bits. This is typically 416 bits (including the UDP & IP headers).
MaxHABW=The maximum allowed HeadAdvertisement bandwidth in bits per second. The application controls this value which can be different before the data starts and after the data starts. Typically, only a small portion of the data bandwidth is reserved for HeadAdvertisement messages after data starts.
MaxPacketRate=Typically 30 packets/second.

Affiliated receivers whose receiver preference is either EagerHead or ReluctantHead send out periodic HeadAdvertisement messages. The sender, like any receiver that is a potential repair head and is already part of the tree, sends out periodic HeadAdvertisement messages. HeadAdvertisements are sent with increasing TTL scope at the interval specified by the sender (HeadAdvertisementInterval). For example, a TTL of "2" is first used, and if no potential head is found, the TTL will be increased to a value of "4", etc.

Repair heads, including the sender, stop sending HeadAdvertisement messages when they can no longer accommodate new members.

Reception of a beacon or data will cause any unaffiliated receivers to wait for one HAListenInterval to receive a HeadAdvertisement message. The HAListenInterval is given by the following minimization factor:

HAListenInterval=Min((3*HeadAdvertisementInterval), 60 secs)

At the end of one HAListenInterval, if no HeadAdvertisement message is received, the receiver continues to listen for another HAListenInterval. The listening process continues until one or more HeadAdvertisement messages are received. When multiple HeadAdvertisement messages are received, the receiver will have to perform a selection process to choose the best-suited repair head. The repair head selection criteria is based on the following parameters and are listed in the order of preference:

Smallest TTL distance from the repair head to the member.
EagerHead over ReluctantHead.
Highest reported group member count.

Upon selecting a repair head, the receiver sends a unicast HeadBind message to the repair head. The HeadBind message is sent to the repair head's unicast port number that is specified in the HeadAdverlisement message.

A repair head, upon receiving a HeadBind message, verifies that the receiver can be accommodated as a member and responds with a unicast AcceptMember or with a unicast RejectMember. Typically a RejectMember message is sent when the repair head can no longer accept members or when the repair head is attempting to relinquish its head duties. If a RejectMember message is sent, an appropriate reason code is included in the message. The unicast port to which the repair head sends the response is obtained from the member's HeadBind message. The member then tries the next best repair head, or goes back to listening for HeadAdvertisements if none are available.

After sending a HeadBind, the receiver waits for a predetermined interval of time to receive a response. Failing to receive a response causes the receiver to retransmit the HeadBind message. After a number of successive failed attempts, the member tries the next best repair head, or goes back to listening for HeadAdvertisements if none are available.

If an AcceptMember message is received, the receiver considers itself affiliated with the repair head and starts to send periodic HeadAdvertisement messages if its receiver preference requires.

In a typical scenario, with values for AdvertisingHeadCount of 500 and Max-HABW of 200 kbps in the first equation, the HeadAdvertisementInterval yields a value of 16 seconds. Using this value in the second equation yields a value of 48 seconds for HAListeninterval. This is the minimum time that it will take a member to join the tree. The minimization factor of equation 2 limits the maximum time that a member waits to choose a repair head to 60 seconds.

The main advantage of this technique is that it does not require the network to support bi-directional multicast, since the tree construction mechanism only relies on multicast service from the repair head to the receiver.

Some of the disadvantages of this technique are:
The bandwidth consumed by HeadAdvertisement messages can be significant, especially when there are many receivers with receiver preference set to either EagerHead or ReluctantHead and the incremental increases of TTL scope ultimately cause the HeadAdvertisement messages to go beyond where they are needed.
The HeadAdvertisement messages may have to continue for the entire multicast session if the repair heads have no way of knowing when all the receivers have joined the tree in order to stop sending the HeadAdvertisement messages.
The excess HeadAdvertisement traffic can contribute to network congestion and reduce the scalability of the protocol. In some exemplary embodiments of the invention of TRAM, HeadAdvertisement traffic is not subject to congestion control.

Repair Tree Construction Under Bidirectional Multicast

Constructing a repair tree when the underlying network has no directional restrictions can be efficient and straightforward. Except for the difference in the HeadAdvertisement triggering mechanism, this tree construction technique is very similar to the preceding one. The receivers seeking repair heads use a MemberSolicilation message to trigger the repair heads to generate HeadAdvertisement messages. The following describes the tree construction process.

Receivers listen for beacon or data messages from the sender before trying to join the tree. Once a receiver hears from the sender, it multicasts a MemberSolicitation message to the multicast group using the Expanding Ring Search, ERS, mechanism. After sending the MemberSolicitation message, the receiver waits to receive one or more HeadAdvertisements from the potential repair heads in the neighborhood. This wait period is referred as ResponseInterval.

Any repair head that is already part of the tree and can accommodate new members will respond to the MemberSolicitation message by multicasting a HeadAdvertisement message. Any repair head that cannot accommodate the member or a member with receiver preference configured to MemberOnly will ignore the MemberSolicitation message.

If the receiver's ResponseLnterval expires and it has not received any HeadAdvertisement messages, the MemberSolicitation message is resent to a larger TTL. This process continues until one or more HeadAdvertisement messages are received from the repair heads that received the MemberSolicitation message. If multiple HeadAdvertisement messages are received, the receiver will have to perform a selection process to choose the best-suited repair head. The repair head selection criteria are the same as in the previous technique. Upon selecting a repair head, the receiver sends a HeadBind message to the repair head.

The processing of a HeadBind message at the repair head and dispatching of an AcceptMember or RejectMember message is the same as in the previous technique.

After sending the HeadBind message, the receiver expects to receive a response within a fixed interval of time. Failing to receive a response causes the receiver to retransmit the HeadBind message. After a number of successive failed attempts, the member tries the next best repair head, or sends another MemberSolicitation if no other repair heads are available.

If an Accept member message is received, the receiver considers itself affiliated with the repair head.

The main advantages of this approach are:
  MemberSolicitation avoids continuous advertisement by repair heads because it is used only when there are receivers attempting to join the tree. This tends to reduce over-all bandwidth consumption by tree formation activities.
  The ERS mechanism used by the MemberSolicitation message provides isolation when receivers are seeking repair heads in different parts of the network.
  The main disadvantage is that this technique does not work with unidirectional multicast. Also, the bandwidth consumed by the MemberSolicitation messages can be significant when many receivers from a region attempt to attain membership at the same time, especially in a LAN environment. The LAN optimizations described below helps to alleviate this problem.

Combined Tree Formation Technique

This technique is a hybrid of the earlier two techniques. Before the multicast data starts to flow, TRAM builds its repair tree using the unidirectional multicast tree construction technique. Once the multicast data starts to flow, TRAM switches to using the bi-directional multicast tree construction technique.

The reasoning behind this strategy is that in the absence of the data, the HeadAdvertisement messages can utilize the bandwidth expected to be used by data. Typically, the bandwidth expected to be used by the data is specified by the maximum data rate at the sender. The sender takes into account the number of advertising repair heads in the system when computing the HeadAdvertisementInterval. This allows the sender to control the advertising overhead, limiting it to no more than the MaxHABW.

However, once the data starts to flow, the sender may not want to have HeadAdvertisement traffic in addition to data and local repairs. At this point, it changes the tree construction technique to bi-directional multicast by setting, the HeadAdvertisementInterval to zero "0".

This technique has its limitations and can fail to construct a repair tree if data starts before all members are affiliated. Some members may not be able to affiliate with the tree if their multicast MemberSolicitation messages cannot reach any available repair heads.

LAN-Based Tree Formation

When a large number of receivers are located on one LAN, the tree construction techniques described above are not optimal for the following reasons:
  Most of the LAN members will affiliate with repair heads that are not on the LAN, resulting in increased link traffic.
  All LAN members that are potential repair heads will start advertising for members, causing increased traffic on the LAN.
  TRAM eliminates these problems by adopting the following optimization technique.

The LAN-based tree formation optimization adopts the bottom-up approach for building a subtree on the LAN before affiliating it with the rest of the tree. The result is a subtree in which only one repair head on the LAN affiliates off of the LAN. Also, only certain repair heads on the LAN will multicast HeadAdvertisement messages.

The LAN-based tree construction technique requires the receivers on a LAN to elect a LAN head. The elected LAN head, known as the root LAN head, is then responsible for attaching to the repair tree using whatever tree-formation method is in use and performing repairs of lost packets on the LAN. While the root LAN head attaches itself to the rest of the repair tree, the rest of the receivers on the LAN become members of the root LAN head. If the number of receivers on the LAN exceeds the root LAN head's membership limit, its members collaborate to elect additional LAN heads.

LAN-based tree formation uses the bidirectional method described above. One additional field is added to the HeadAdvertisement message: a LAN state field indicating the advertising node's LAN state. Nodes willing to be a LAN head use this field to volunteer. After one HeadAdvertisementInterval, the best repair head, based on receiver preference and member limit, is elected the root LAN head.

Once the root LAN head is elected it solicits members as if it were already affiliated with the tree. Other LAN members will naturally choose the root LAN head since it is the closest one. Meanwhile, the root LAN head affiliates itself to an off-LAN repair head.

If the root LAN head reaches its member limit, additional LAN heads are elected from those already affiliated under the root LAN head.

Figure 5:
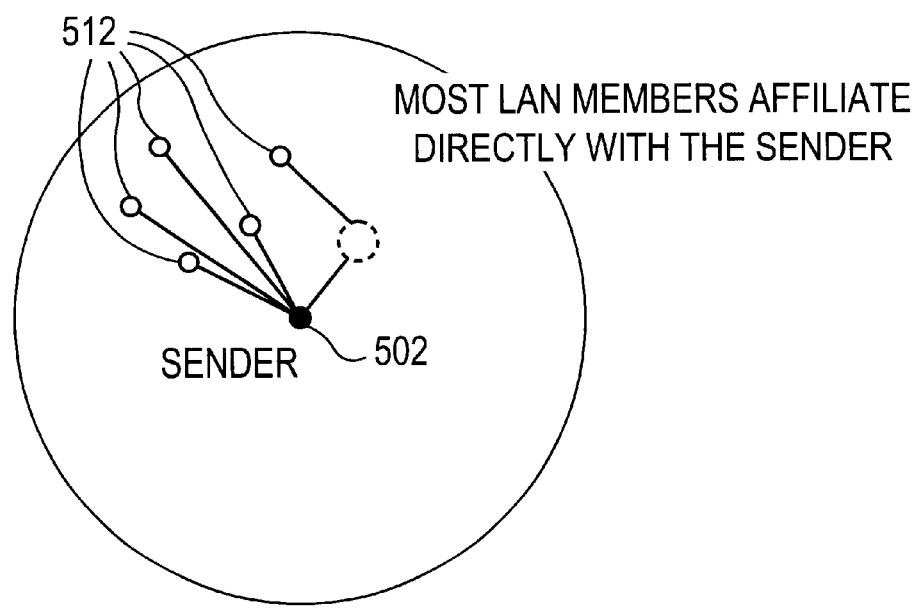
FIG. 5 is a schematic diagram of a repair group formed dynamically.
Figure 6:
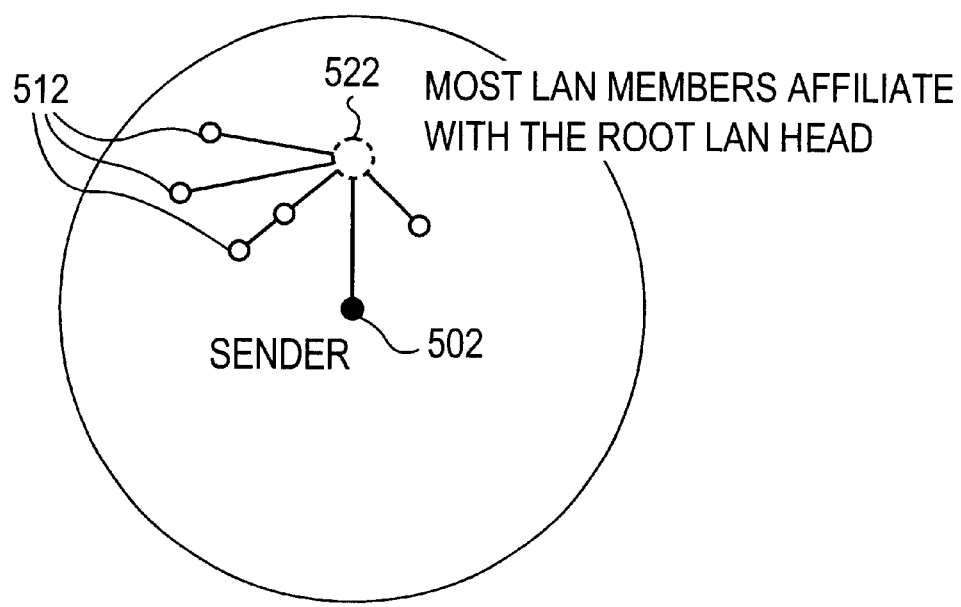
FIG. 6 is a schematic diagram of a repair group formed dynamically in accordance with the invention.

FIG. 5 and FIG. 6 are diagrams showing the advantage of using LAN-based tree formation. Both FIG. 5 and FIG. 6 show a sender 502 which is not connected directly with the LAN, and the rest of the nodes 512 are repair heads or reluctant repair heads on the LAN.

FIG. 5 shows tree formation without LAN optimization. Most of the LAN members 512 affiliate directly with the sender 502 which is not on the LAN.

FIG. 6 shows tree formation with LAN-based tree formation. Members 512 on the LAN affiliate with the root LAN head 522, which affiliates with the sender 502.

Tree Management

The constructed repair tree has to be maintained to ensure reliable data delivery and proper protocol operation. TRAM supports a robust and rich tree management framework. Some of the functions supported by tree management are:
  (1) group member and repair head monitoring.
  (2) repair group TTL computation and management.

(3) member re-affiliations and repair head resignations.

(4) pruning of unsuitable members.

(5) aggregation and propagation of protocol related information up the tree hierarchy to the sender.

The different tree management messages used in TRAM are:

Hello: a multicast message sent to the group address with a TTL scope limited to the repair group scope. Repair heads that have one or more group members multicast this message.

Hello-Unicast: a unicast hello message from a repair head to a specific group member.

ACK: a unicast control message sent by a member to its repair head. This message includes a bitmap indicating received and lost packets, indications of inadequate or excess Hello TTL values, and congestion indications.

Beacon: a multicast message sent by the sender to the session scope to trigger tree-building and as a keep-alive in the absence of data.

The details of how these messages are used in the tree management operation are described in the following sections.

Group Member And Repair Head Monitoring

In TRAM, the sender distributes the burden of reliable delivery among a subset of receivers that perform the role of repair heads. To ensure reliable delivery it is required that every repair head cache the received multicast data until every member in the group acknowledges it. Since a repair head caches data until all the members acknowledge, it is very important that the repair head monitor its group members. The monitoring mechanism enables the repair heads to detect and react to conditions such as a member exiting the multicast session or becoming unresponsive. Absence of such a monitoring mechanism may lead to indefinite caching of messages at the repair heads.

From the member's perspective, it is important to ensure that lost messages are safely cached at the repair head, or further up in the tree. Repair can only be ensured when the members find the affiliated repair head to be reachable and responsive. If a repair head becomes unresponsive, the availability of lost messages cannot be guaranteed unless the member detects this condition and quickly re-affiliates with a different repair head. The monitoring mechanism enables members to detect the repair head loss condition.

The details of how the monitoring operation is carried out in TRAM are discussed below.

Monitoring of Repair Head by the Group Members

Each repair head periodically multicasts a Hello message (when necessary) to the group address with a session scope large enough to reach all of its members. The Hello period is determined by the following:

Hello Period=Max(1 Second, 1 AckInterval)

The AckInterval is computed at run time and represents the time that a member has to wait to receive a window of packets at the rate of data transfer that is currently in use. The details of computing the AckInterval are discussed later.

The reception of the repair head's Hello message ensures that the repair head is operational. If the member does not receive a Hello message for more than one Hello period, the member sets a flag indicating that Hellos are not being received in its next ACK message to the repair head. If two such ACK messages go unanswered, the member gives up on the repair head and attempts to re-affiliates with a different repair head.

In response to a member's ACK message indicating that Hellos are not being received, the repair head sends out a Hello-Unicast message. The Hello- Unicast message serves to fill in for the lost Hello message.

Repairs performed by a repair head can also indicate to its members that it is operational. But, this cannot replace the Hello mechanism as the repairs are not guaranteed to be regular, and some repair heads may not perform any repairs for many Hello periods. However, TRAM can exploit repairs to optimize the repair head monitoring mechanism. The following are some of the optimizations adopted:

Since the sender is always sending data or beacons, it does not need to send out periodic Hello messages. The sender sends out Hello messages only when it is essential, such as for TTL computation, or to demand acknowledgments.

Repair heads do not send Hello messages when they have performed repairs within the latter half of the preceding Hello period.

Members reset their Hello monitoring timers whenever a repair packet from the repair head is received.

Monitoring of Group Members by the Repair Head

Repair heads use the following mechanism to monitor members.

Each member of a repair group is expected to send at least one ACK message to its repair head for every acknowledgment interval. The details of computing the acknowledgment interval are discussed below. If a repair head does not receive an ACK message from a member for a period longer than one acknowledgment interval, the repair head adds the member to a list. The next time the repair head builds the Hello message, the entries in the list are included in the message. A special flag in the Hello message is set to demand ACK messages from the listed members. If more than three such Hello messages go unanswered by a member, the repair head disowns the member and reclaims all the cache buffers containing data unacknowledged by the member.

A member finding itself listed in a Hello message responds immediately by sending an ACK message to the repair head.

Repair Group TTL Computation

To conserve network bandwidth, it is important for repair heads to perform localized repairs, that is, with a TTL scope that is just large enough to reach ail of their members. As mentioned above TTL is the time-to-live of a message, and TTL is stated in terms of hop count. For the localized repair strategy to function properly, it is critical that the repair heads performing the repair compute the appropriate TTL to use to perform repairs. If the computed computer repair TTL is too small, the repair may not reach all of the repair requestors. On the other hand, if the TTL is larger than required, the repair will unnecessarily burden other receivers affiliated with other repair heads.

Initially, in the HeadBind message, each member recommends a TTL, based on the received HeadAdvertisement message. The repair head uses the largest recommended TTL as its repair TTL. Should the path from the repair head to the member change, the computed repair TTL might become inappropriate. The following mechanisms help the repair heads track and adjust the repair TTL:

When the repair TTL becomes insufficient, some group members fail to receive the Hello messages. These members report the condition to the repair head via ACK messages.

The repair head responds to such ACK messages by first sending a Hello-Unicast message. The Hello-Unicast message assures the member that the repair head is functioning. The repair head then increases the repair TTL by a default step value. The next Hello message sent by the repair head goes to the new repair TTL scope. Note that the repair TTL is never expected to be greater than the session TTL.

The above two steps continue until the member stops reporting that Hellos are not being received.

Each member reports in the ACK message the excess TTL from the repair head's Hello messages. If the repair head determines that it is using a larger TTL than required to reach all of its members, it reduces the repair TTL.

Member Re-affiliations and Repair Head Resignations

Re-affiliation in TRAM is triggered when a member decides that it wants to affiliate with a different repair head. This may occur because its old repair head is resigning, or is not responding, or because the member has decided that another repair head would be better (see the section below on tree optimization).

The following describes the steps involved in the re-affiliation process.

The member attempting to re-affiliates can either directly send a HeadBind message to the preferred repair head (learned from Hello and possibly HeadAdvertisement messages), or perform repair head selection based on received HeadAdvertisement messages, or seek a repair head by multicasting MemberSolicitation messages using the scheme described earlier, When the re-affiliating member is a repair head, the member has to avoid selecting a repair head that is at or below its level/depth in the tree hierarchy in order to avoid loops and disconnection from the rest of the tree.

The member uses the normal TRAM affiliation mechanisms to affiliate with the new repair head (sending a HeadBind and receiving an AcceptMember or RejectMember message). If this affiliation fails, it may start over with another repair head.

Once the member has affiliated to the new repair head, it maintains its affiliation with its old repair head until it has successfully received repairs for any packets for which repairs are not guaranteed by the new repair head. During this interval (the TransitionInterval), the member sends ACKs to both the old and the new repair heads, unless the old repair head is not responding. If the new repair head becomes unresponsive during this interval, the member may start over with another repair head.

Once the TransitionInterval has been completed, the member sends an ACK with the Terminate Membership flag set to its old repair head. At this point, re-affiliation is complete and the member and the old repair head forget about each other. If the member is itself a repair head, it continues to function as a repair head during re-affiliation.

A repair head that is re-affiliating may not accept new members until its re-affiliation process is complete. Repair heads support all other normal repair head operations during re-affiliation.

A repair head typically resigns when the application exits or when it has determined itself to be redundant in the region. The reception of Hello messages from neighboring repair heads enables a member or repair head to determine that there are multiple repair heads in the region. Reducing the number of repair heads in a region leads to a reduction in management traffic.

Aggregation and Propagation of Session Information

The monitoring mechanism supported in TRAM establishes a management session between every repair head and its members. This session can be used as a means to aggregate and propagate various protocol related events land information up the tree hierarchy. This is an efficient mechanism as it avoids problems related to implosion. The following are some of the events and information aggregated and propagated in the tree:

Congestion Events from the Receivers in the System (1) Informatory details such as the number of receivers that are currently being served by the tree. The total number of receivers being serviced is computed as follows: every repair head in the system reports its direct member count and also the number of members that its members are serving.- This information gets aggregated at each level and is reported to the next level in the tree hierarchy and eventually to the sender. Other information aggregated in this way includes the number of advertising repair heads in the tree (used to calculate the HeadAdvertisementInterval).

(2) Information related to the tree depth at which a member is operating. The repair heads utilize this information to avoid tree loop at the time of re-affiliation.

Tree Optimization Techniques

The optimality of the repair tree can drastically affect the scaling benefits of using a repair tree in the first place. A randomly built tree with many overlapping repair groups can cause repair heads to perform repairs with large TTL scope, which causes spillover of repair traffic to regions that do not require the repairs. The spillover is undesirable as it affects scalability, exhibits poor use of network resources and may also contribute to network congestion. The characteristics of an optimal multicast repair tree and the details of achieving the same are discussed below.

The characteristics of an optimal repair tree in TRAM may vary depending on the distribution of the receiver base. We consider two types of receiver populations. In sparse distributions, receivers are widely scattered with few concentrations (in terms of TTL) of members. In dense distributions, receivers are closely located to each other in terms of TTL.

Tree Optimization for Sparse Distributions

When the receivers are sparsely distributed, the typical characteristics of an optimal tree are:

multiple repair groups that have few overlapping repair regions, and every member in a group is affiliated to the closest repair head (in terms of the TTL distance from the repair head to the member).

The following examples illustrate poorly built and well built trees using the above criteria of optimality. In the first example, all members have affiliated with the sender, forming one large repair group. Any repair will reach all of the members. In the second example, localized groups are formed, limiting the scope of repairs.

Figure 7:
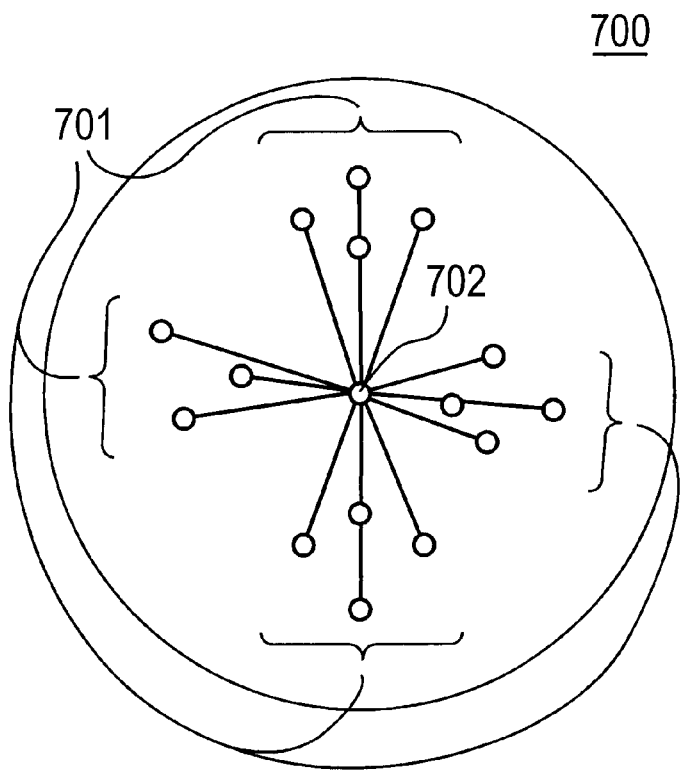
FIG. 7 is a schematic diagram of a repair group formed dynamically.

FIG. 7 illustrates a poorly-built tree 700 for sparse distribution, showing all members 701 affiliating with sender 702.

Figure 8:
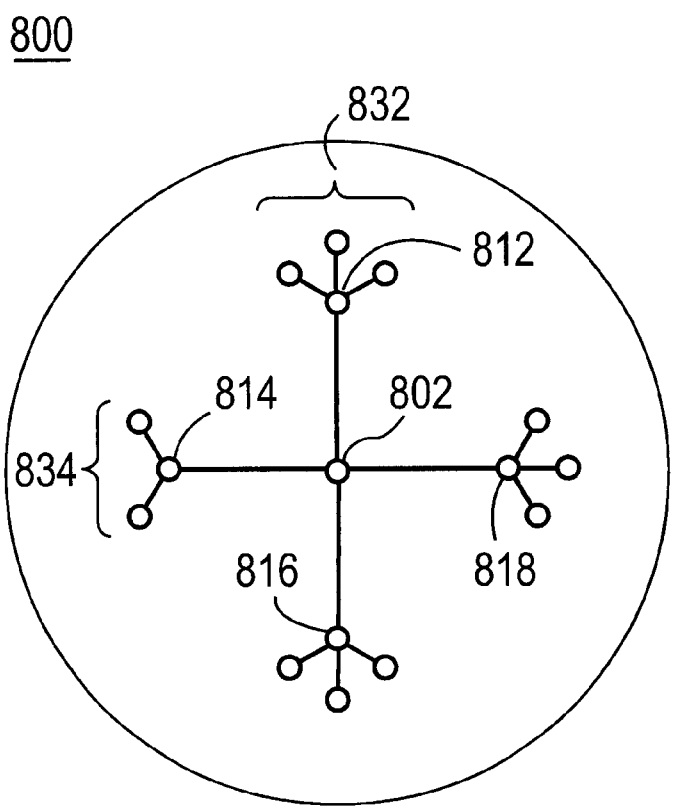
FIG. 8 is a schematic diagram of a repair group formed dynamically in accordance with the invention.

FIG. 8 illustrates a well-built tree 800 for sparse distribution with sender 802 affiliating with repair heads 812, 814, 816, 818. Repair head 812 then affiliates with members 832. Repair head 814 affiliates with members 834, and so forth. Repair function in well-built tree 800 is shared by the repair heads 812, 814, 816, 818.

Due to the unpredictable times at which receivers join the group, it is likely that the initial tree constructed in TRAM is sub-optimal. To achieve tree optimality, every member and every repair head in the system should continuously pursue tree optimization. Tree optimization consists of determining where optimization is possible and acting upon this opportunity.

The following are some of the tree optimization techniques:

When a member hears a Hello from a different repair head in the region that is closer than its current repair head, the member attempts to re-affiliate to the closer repair head. Note that a repair head has to perform loop avoidance checks before choosing to re-affiliate with the closer repair head. Without loop avoidance checks, improper tree formation (or tree disintegration) may result when a repair head chooses to affiliate with a repair head that is at or below its level/depth in the tree hierarchy.

When two repair heads are found to be close to each other, one of the repair heads can volunteer to resign in favor of the other repair head. Typically the repair head that is better suited can continue to be a repair head while the other repair head can resign. In situations where both the repair heads are found to be suitable, tie breaker techniques such as the repair head that has fewer members, or the repair head that has the lowest unicast address and port number combination, can be used to resolve the condition.

To ensure quick and smooth re-affiliations of its members, a resigning repair head can include the details of any backup repair head (network address, unicast port number, worst case TTL distance from the backup repair head to the members) in the Hello message. The backup repair head details are informatory in nature and members with better alternatives can choose to ignore this information and re-affiliate with a different repair head. The details of the backup repair head help the members that do not hear Hellos from any other repair head other than the currently affiliated repair head.

The repair head can adopt a strategy wherein the members that are considered to be farthest are repaired using unicast and those that are considered closer are repaired using multicast. When this strategy is in use, the repair heads can be limited to accept only a few unicast members.

Tree Optimization for Dense Distributions

When all receivers are densely located in one region (say an intranet with few TTL hops between the sender and all the receivers), it may be difficult to form repair groups that have a low degree of overlap. In this situation, if the number of repair heads in the system is not controlled, much of the bandwidth can be consumed by the management traffic. Hence in the dense case, the characteristic of an optimal tree is to have as few repair heads in the system as possible.

The tree optimization technique in the dense case focuses on reducing the number of repair heads rather than finding a closer repair head. A member tries to affiliate to a repair head that is already performing the role of repair head. A new repair head is accepted only when all the current repair heads are no longer accepting members. Monitoring Hellos and HeadAdvertisements is not necessary.

The dense mode optimization algorithm is simple, straightforward and quick. The sparse mode optimization algorithm is complex and has to be pursued throughout the multicast session to form localized repair groups that have fewer overlapping regions. It is to be noted that the sparse mode optimization is unsuitable for multicast sessions that span a short duration, since some time is required to optimize the tree.

Flow Control

TRAM is designed to transfer bulk data from one sender to many receivers. The data is transmitted at a rate that adjusts automatically between a specified minimum and maximum. Sequence numbers in the data packets allow receivers to identify missing packets. Each member is bound to a repair head that retransmits lost packets when requested. Acknowledgments sent by receivers contain a bitmap indicating received and missing packets. Missing packets are repaired by the repair head. Packets acknowledged by all members are removed from the repair head's cache. The following sections describe in detail the mechanisms for transmitting data, requesting retransmission of lost packets, detecting congestion, adjusting the transmit rate, late join requests, and handling end of transmission.

Data Transmission

The sender in a TRAM application transmits data packets to every receiver in the multicast group. TRAM sends the packets at a specified rate. Each packet is given a unique sequence number starting with one (1). Receivers use these numbers to detect out of order and missing packets.

Acknowledgments

Members acknowledge one window of packets at a time to their repair head. This window is known as the ACK window. The ACK window size is configurable; the default is 32. For example, in the default case, members send ACKs every 32 packets.

To avoid multiple members sending ACK messages at the same time, and to possibly expedite repairs, ACK messages are distributed over the window. Each member selects a random packet between 1 and the ACK window size to start sending ACK messages. For example, one member may send ACKs at packets 32, 64, 96; etc., while another sends ACKs at packets 10, 42, 74, etc.

Acknowledgments are also sent if a timer equal to 1.5 times the estimated ACK interval expires. The estimated ACK interval is computed at each receiver when an ACK is sent. It estimates the amount of time it takes to receive an ACK window's worth of packets. The formula is:

$$ACK \text{ interval} = ACK \text{ window} * (\text{Time since last } ACK/\text{Packets since last } ACK)$$

This timer is canceled if an ACK is sent using the triggering mechanism described above. If this timer expires, it indicates that the sender has paused and allows members to report and recover any lost packets without having to wait for the sender to start sending new data.

Each ACK message contains a start sequence number and a bit map length. If no packets were missing, the bit map length is "0" and the sequence number indicates that all packets prior to and including this packet were successfully received. The repair head saves this information and uses it to remove packets from its cache.

If there are one or more missing packets, the start sequence number indicates the first missing packet. A bit map must follow. Each bit in the map represents a packet sequence number starting with the start sequence number. If the bit is set, that packet is missing and must be retransmitted. A bit map length indicates how many valid bits are present.

When the repair head receives an ACK message with a "missing packets" bit map, the sequence number specified minus 1 is saved for this member. This indicates that all packets prior to and including this sequence number have been received successfully. The repair head then scans the bit map looking for missing packets. It immediately places these packets onto the transmit queue unless they have recently been retransmitted or are already on the queue from another request.

Data Retransmissions

When a repair head receives a request to retransmit a packet, it retransmits it as soon as possible. Retransmissions take priority over new data packets. Retransmitted packets are sent at the current rate used for new data packets from the sender. Each repair head computes the average data rate of all packets it receives and sends retransmissions at this rate.

Duplicate Retransmission Avoidance

When several members request retransmission of the same packet, TRAM sends the packet immediately for the first request. Subsequent requests are ignored if they are received within 1 second of the first request.

Occasionally packets are waiting for retransmission due to rate limitations. If a new request for a packet is received and that packet is awaiting retransmission, the request is ignored.

Every repair head in TRAM keeps track of the lowest packet sequence number that all members have received. Before a repair head retransmits a packet that has been waiting to be retransmitted, it again checks the sequence number of the packet to be retransmitted against this lowest packet number. If the retransmission packet sequence number is lower, the repair head skips this retransmission because all of its members have already acknowledged the receipt of the packet. This can happen when multiple repair heads retransmit the same packets and their transmission range overlaps.

Rate-based Flow Control

Even with unicast transports, flow and congestion control is a delicate problem. The flow control in TRAM is rate-based and is similar to a rate-based unicast protocol.

TRAM's packet scheduler computes the amount of time to delay each packet in order to achieve the desired data rate. The delay is computed with the formula:

packet size/desired rate

The overhead in processing the packet is subtracted from this delay. TRAM then sleeps for the calculated period, sends the packet, and the cycle continues. This is similar to the widely known token bucket algorithm.

TRAM's flow control uses various algorithms such as slow start and congestion control to dynamically adapt to network conditions. A maximum and a minimum rate can be specified to limit the operation of these algorithms. The minimum rate effectively defines the receiver population. Any receiver that cannot keep up with the minimum rate will be pruned (no longer guaranteed repairs).

If packets are lost or ACKs are not reaching a repair head, its cache will start to fill up. If the sender's cache fills up above a threshold value, it stops sending new data until it can free some buffers from its cache. This bounds how much the sender and receivers are allowed to get out of synch.

TRAM sessions go through two phases of flow control: slow start; and congestion control. The slow start phase is the initial phase during which TRAM carefully tests the network to find an appropriate operating point. This is analogous to TCP's slow start. After the slow start phase, TRAM will have established some boundaries for its operation and enters the congestion control phase.

Slow Start

During the slow start phase, the initial data rate starts at 10% of the maximum, or the minimum rate if that is greater. Every two ACK windows this rate is increased another 10% of the maximum data rate. This process continues until the maximum rate is reached or congestion causes the rate to decrease.

Congestion Reporting

Congestion is detected at the receivers and repair heads. Receivers detect and report congestion based on missing packets. Repair heads detect and report congestion based on their cache usage.

At Receivers

Receivers detect and report congestion based on an increase in the number of missing packets between two ACK windows. For example, if a receiver detects 5 missing packets during an ACK window, and has 10 packets missing in the next window, a congestion message is sent to its repair head. The congestion message contains the highest sequence number received. When the repair head receives the congestion message, it determines whether this is a new congestion report and if so, forwards it immediately up to its repair head. Each repair head will forward one congestion packet from its members for each ACK window. The repair head computes the ACK window from the sequence number specified in the congestion message with the formula: sequence number/ACK window size.

Once a congestion message for an ACK window has been forwarded up the tree, congestion reports for its ACK window and previous ACK windows will be ignored. The sender does not react to multiple congestion reports for the same window.

At Repair Heads

Repair heads also generate congestion messages when their data caches begin to fill up. Each repair head maintains a low and high water mark on its cache. When the number of packets in the cache reaches the high water mark, an attempt is made to purge the cache. If it can't purge the cache below the high water mark because a member has not acknowledged these packets, a congestion message is forwarded up the repair tree. In this situation the repair head temporarily increases its high water mark to the current value plus the number of packets in an ACK window. The repair head performs the same test when this new temporary high water mark is reached. If the cache is exhausted, new packets are dropped without acknowledging them.

The sequence number in a repair-cache-generated congestion message is the highest sequence number the repair head has received.

At The Sender

The sender also maintains a cache for its immediate group members. If its cache fills up to the high water mark and can't be reduced, it reacts as if it received a congestion message for that window. It also temporarily increases its high water mark to the current value plus the size of an ACK window. If the cache fills to this new level and can't be reduced, it reacts again.

This process continues until the cache is full. At this point the sender blocks any new data from the application and attempts to solicit an ACK from the members that are causing the cache to fill up. If these members do not respond quickly, they may be pruned.

When some cache buffers are freed, the application can start sending data again.

In experiments, we observe that the repair head's cache-generated congestion messages almost always follow the receivers' loss-generated congestion messages. This is logical as the build-up in the repair head's cache is invariably caused by the lost packets at the receivers.

Congestion Control

The sender reacts to congestion feedback as follows: react to selected congestion reports; decrease the rate in the face of congestion; and, increase the rate in the absence of congestion.

The only significant experience with real network congestion control is based on TCP traffic and the algorithms implemented in the TCP protocol. One of the key ingredients of TCP's algorithm is to follow the additive increase/multiplicative decrease rule.

The Increase Amount

Since TRAM transmission is rate based, an immediate problem is determining the right rate increase in the absence of congestion. TCP is a window based protocol in which increases are done by incrementing the congestion window by one, a dimensionless parameter. In the spirit of TCP, the correct amount to increase TRAM's rate would be a small fraction of the bottleneck bandwidth. Plus, this amount would need to be adopted by all the flows sharing the same bottleneck. This increase is not easily determined.

A constant increase amount will always be wrong for some topologies. Although we used 10% of the maximum rate for slow start, it does not seem suitable since the maximum rate may be far from the current bottleneck rate. Instead, TRAM derives the increase amount dynamically as follows. TRAM keeps track of the historically highest achieved rate (HHR). After each rate decrease, a new increase amount is calculated as:

Increase=($HHR$-current_rate)/$S$

The rationale is to use HHR as a local estimate of the bottleneck bandwidth. Within a small number of steps "S" (for example, in a preferred embodiment S is set to equal 4), TRAM tries to return to that level if there is no congestion. The constant S may be changed from its initial value of 4 in response to further experimentation; a larger number might be adopted for potentially more equitable bandwidth sharing by many flows in exchange for slower convergence to the optimal rate.

An immediate reaction to this formula would be to replace HHR with something that adapts to the current network condition, for instance, using the most recently achieved high (MRH), or a moving average of MRH, or the session average data rate. Each of these cases resulted in diminishing increases for some common topologies, eventually leading to a rate close to zero.

Decrease

The receipt of a congestion report causes the data rate to drop by a percentage (for example 50%, and we are also experimenting with 25%). This is the same as TCP. Adjusting the rate by a percentage is very appealing since the adjusted amount is dimensionless, hence there are no calibration problems.

Synchronizing Feedback And Control

The next important aspect of a congestion control scheme is how to keep the feedback and control in synchrony with each other. Ideally, each control action is based on the feedback from the network that reflects the consequence of the previous control. From systems theory, we know that there is a chance of building a control that leads to optimal and stable behavior.

If our feedback does not capture the consequence of the previous control, then we are likely to end up with a control that reacts to the same conditions repeatedly and leaves the system in wide oscillation. This oscillation is indeed what we observed in our simulation experiments if we increase the rate for each window when there is no congestion, and decrease for each window when there is congestion.

In order to make sure that each congestion feedback includes the previous control actions, the congestion control algorithm must wait for several windows before acting on the feedback. This tends to make the system less responsive to topologies with a small number of receivers.

As a compromise, TRAM increases the rate every other ACK window in the absence of congestion reports. When a congestion report is received, TRAM decreases the rate right away and records the window in which the congestion happened. Another increase or decrease in rate is not allowed until after N windows, where N is:

$N=4*$(rate/$HHR$)

Where 4 is simply 2 times the normal schedule of reacting to every 2 windows.

The reasons for using a variable schedule are: at lower rates, the risk of congestion is less hence it is fairly safe to increase the rate sooner; at lower rates, the time penalty for waiting an additional window is longer.

Accounting for Retransmission

To further improve the congestion control algorithm, TRAM includes mechanisms to take into account the effect of retransmission when determining the rate during periods of congestion.

In the congestion message, the receivers report an estimate of how long it will take to do local repairs. This information is aggregated back to the sender. In reaction to a congestion message, the sender not only reduces its rate, but also pauses briefly to let the local repairs complete.

This mechanism has further smoothed out the oscillations in our simulation experiments.

Congestion Control Simulation and Results

To support the design of TRAM, we built a simulation model using the NS simulation tool. The NS simulation tool used was version 2 of the Network Simulator, http://www.mash.cs.berkeley.edu/ns. The TRAM protocol is modeled using the simulation tool NS. The object-oriented simulation environment, the scripting language support, plus the companion animation tool, NAM, enable effective experiments.

Many different network topologies were simulated.

Figure 9A:
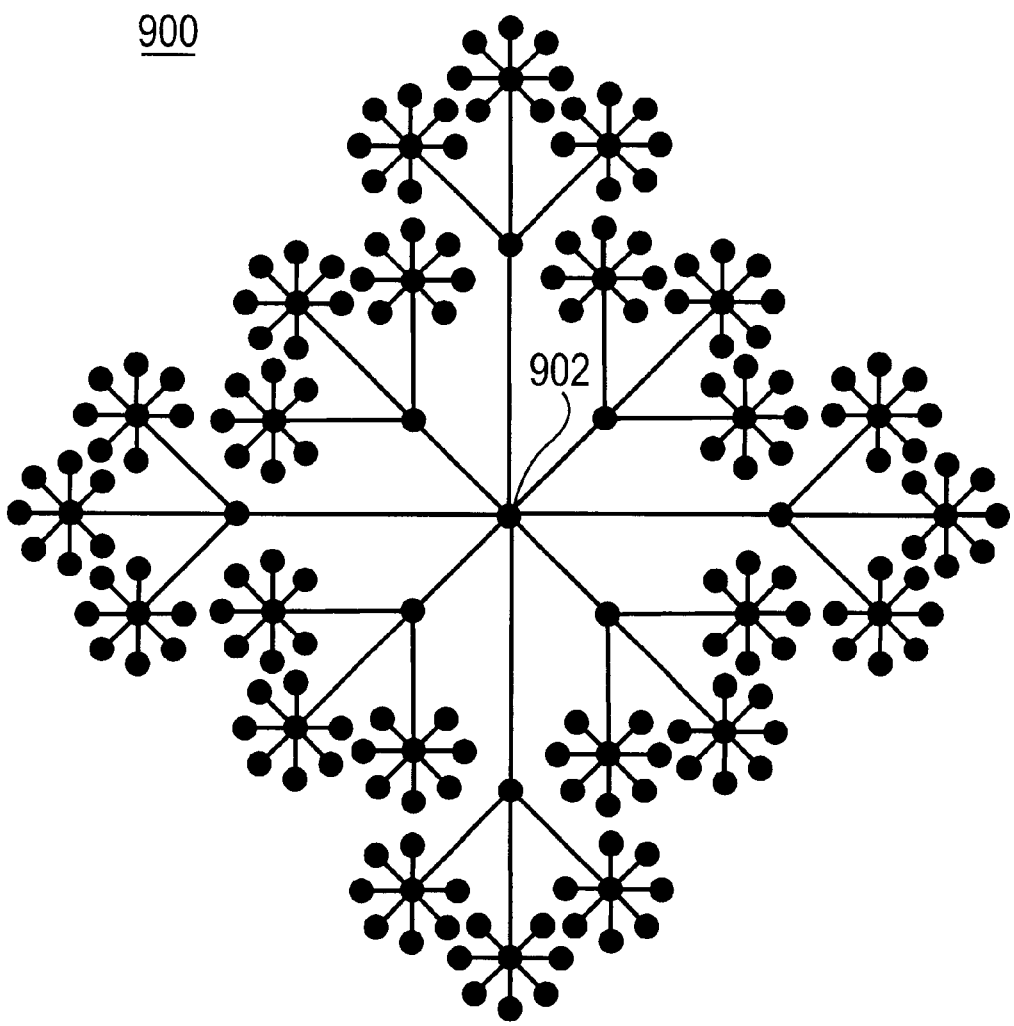
FIGS. 9A–9B are schematic diagrams of a network with many stations formed into repair groups, and the diagrams represent a model used for simulation.
Figure 9B:
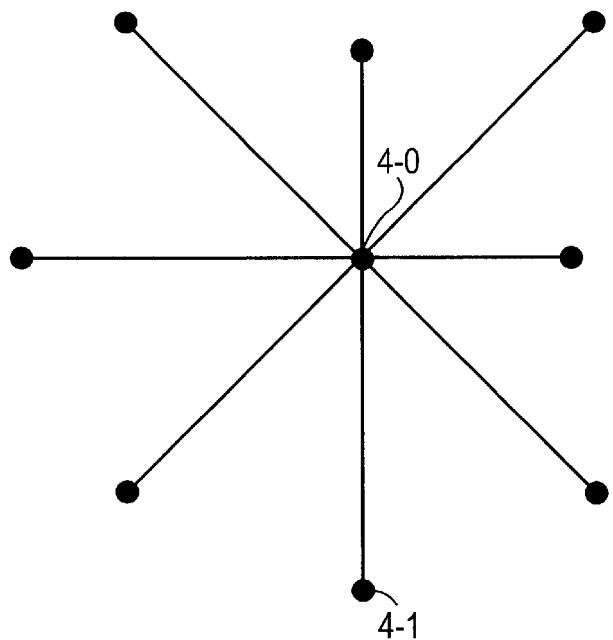
Figure 9C:
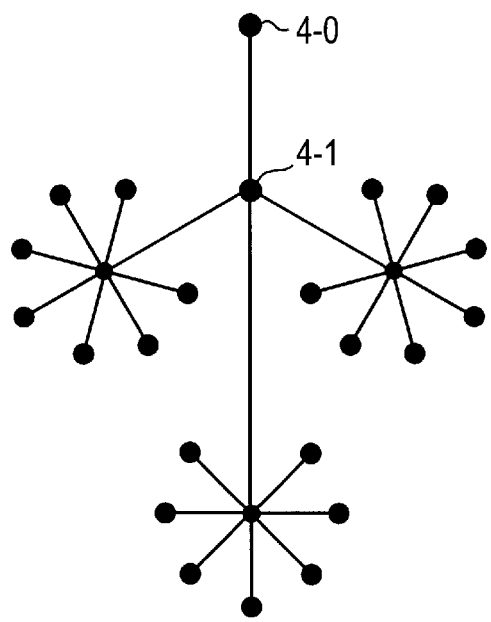

Turning now to FIG. 9, a network topology 900 used in simulation is shown. The results from two variants of the topology shown in FIG. 9 are disclosed. The basic network consists of two hundred one (201) nodes. The sender agent 902 runs on one node, repairer agents run on 24 of the nodes, and pure receiver agents run on 168 of the nodes. The other 8 nodes are router-only nodes. The whole network is symmetric. Each repairer is 2 hops away from the sender, and each receiver is 1 hop away from its parent (repair head). The links from the sender to the first tier routers are 1.5 Mb/s links with 50 msec delay. The rest of the links are 1.5 Mb/s links with 10 msec delay, except 3 of these links are 0.5 Mb/s links with 10 msec delay. These 3 slow links are the bottleneck of the multicast session.

In the variation of this topology, the 3 slow links are further programmed to deterministically go up and down. Every 3 seconds, they go down for 0.05 seconds. On average the down time is less than 2%.

The experiment is to send 1000 packets, 1400 bytes each. The sending starts at 1.5 seconds from the beginning of the simulation. Since the limiting bandwidth is 0.5 Mb/s, assuming ideal scheduling the whole transmission should take 22.4 and 23 seconds respectively.

Figure 10:
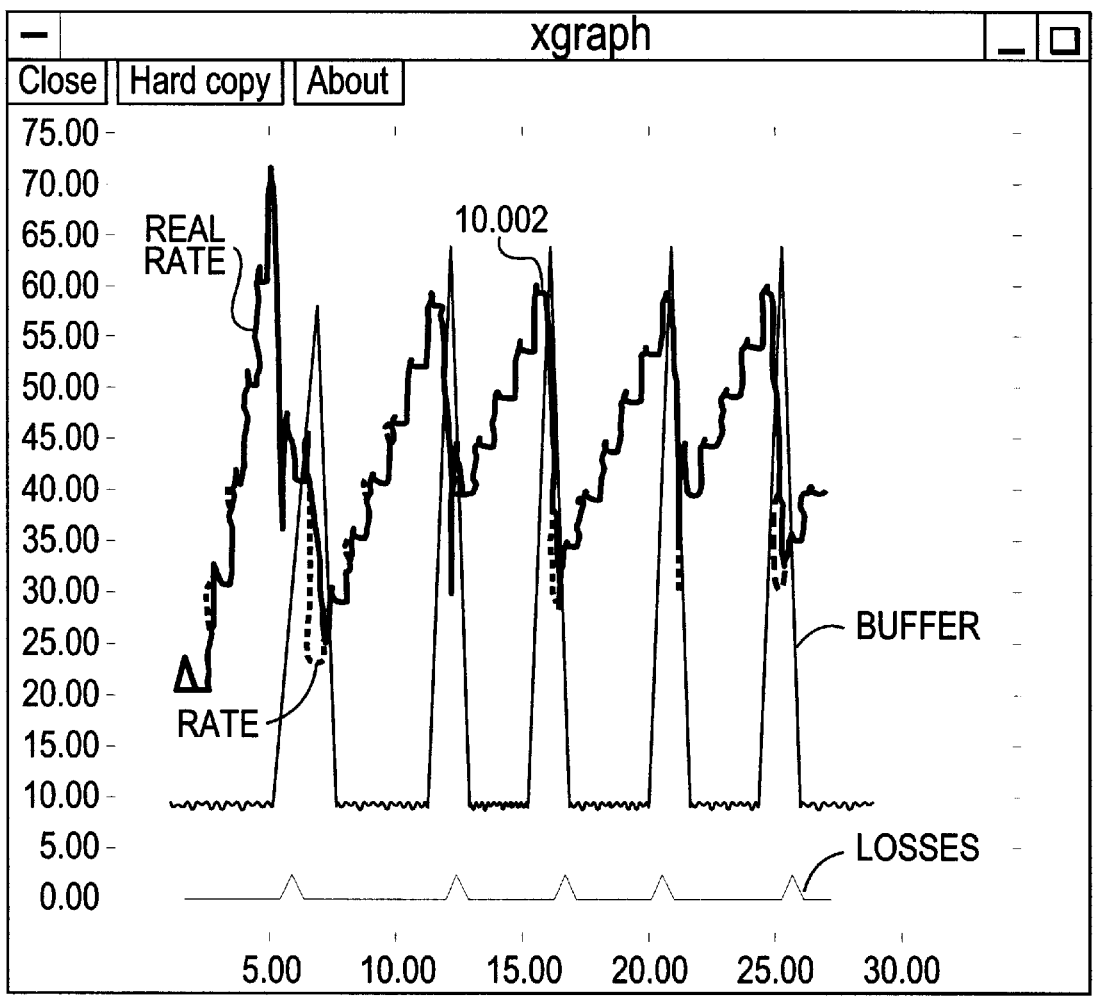
FIG. 10 is a graph of the response of a simulated network.
Figure 11:
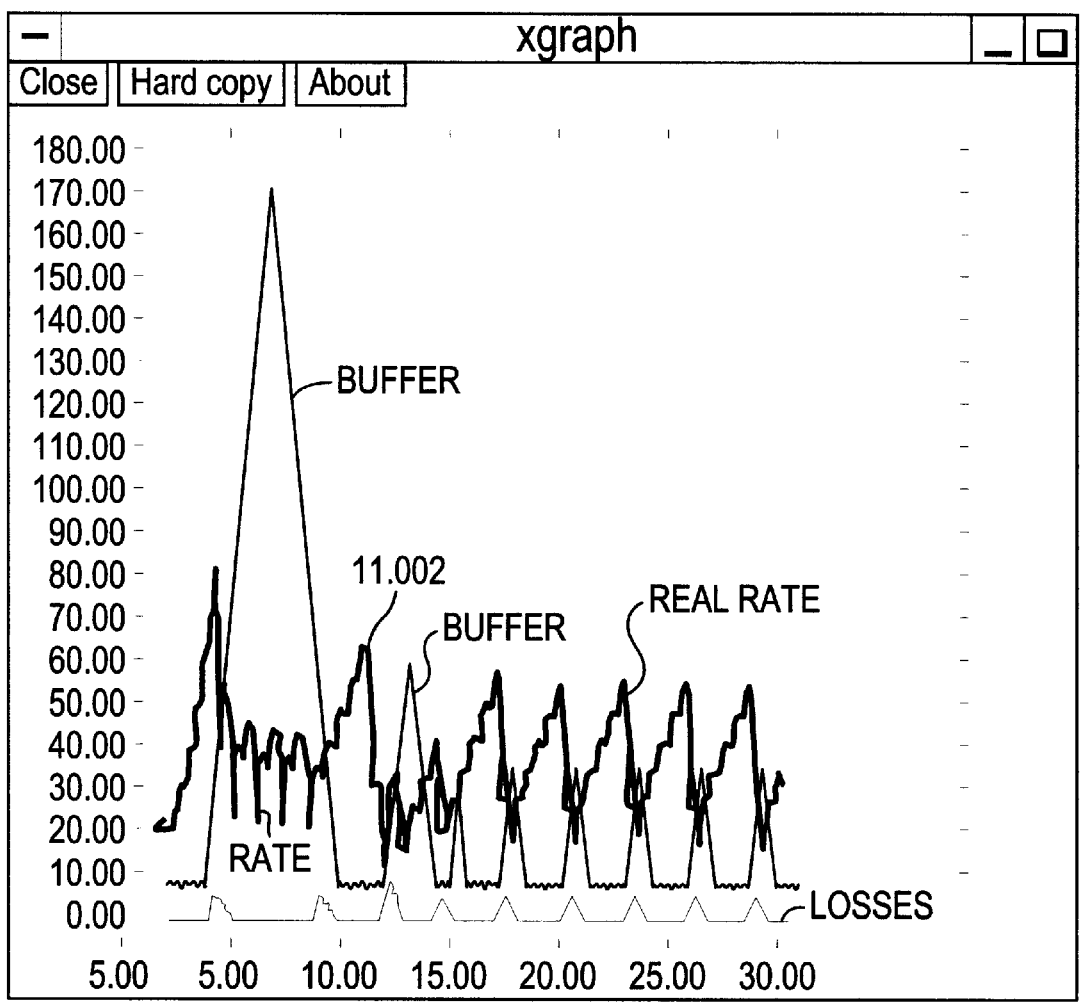
FIG. 11 is a graph of the response of a simulated network.

FIG. 10 and FIG. 11 show how TRAM did for each of the two cases. The X axis is time in units of seconds. The Y axis scale is used for a number of things:

Rate: in 10 Kb/s (i.e. 50=0.5 Mb/s)

Loss: number of packets lost at ACK time

Cache occupancy: number of packets

FIG. 10 is a graph 10,002 showing results for a network without up/down dynamics.

FIG. 11 is a graph 11,002 showing results for a network with up/down dynamics.

FIG. 10 for a static 201 node network is next discussed. The top curves represent the monitored rate and the send rate. The next curve is the cache occupancy observed at a repair head that is responsible for a receiver that is behind the slow link. Losses are shown along the bottom. As can be seen, the buffer occupancy shoots up soon after the losses start to occur.

For the static network in FIG. 10, the maximum possible transmission rate, as limited by the bottleneck bandwidth, is 50 (Kb/s). TRAM manages to keep the rate oscillating between 30 and 60. The initial spike is bigger, the result of slow start when there is no hint what the possible maximum rate is. The subsequent improved performance is what we expected.

The fact that the cache occupancy oscillates at around 7 in the steady state is normal. In these tests, the ACK window is set to 8. With ACK staggering, the cache usage is expected to stay around 8, instead of going from zero (0) to eight (8) and back to zero (0) in a saw-tooth form.

FIG. 11 shows results for the simulation network of FIG. 9 and including adding up/down dynamics to some links. In FIG. 11, the link up/down dynamics clearly induce very periodic losses at the times the links turn off (every 3 seconds). TRAM adapts quite well, except right after the first link down, when the losses induced a high cache occupancy. This is because a retransmission failed to get to the receiver behind the faulty link for quite a long time. After it overcame the initial difficulty, the rate oscillated between 30 and 60 as in the static network case. The time of completing the test is only marginally longer than the static network case.

Late Joins

Receivers joining the multicast group after data transmission has startedhave two options for recovering data previously sent:

Recover as much data previously sent as possible. This option allows the receiver to request retransmission of all the previously sent data that its repair head has cached. A repair head typically has at least the last 50 packets sent, in its cache.

Don't recover anything sent before the receiver joined. This option doesn't attempt to recover any previously sent packets. The first data packet received after the new member joins the repair tree is handed up to the application. All previously sent packets are ignored.

End of Transmission

Receivers must be able to determine when the session has completed to ensure they have received all of the data before exiting.

When the sender application completes, end of transmission is signaled throughout the multicast group. The sender notifies all members of session completion with a beacon packet that has the TXDONE flag set. This packet also includes the sequence number of the last data packet sent. The sender transmits this packet periodically until all of its immediate members acknowledge the receipt of all packets sent. The sender can then exit.

When a member receives the beacon packet with the TXDONE flag set, it immediately sends an ACK message to its repair head indicating whether it has received all the packets transmitted or requires more retransmissions. TRAM notifies the application when it receives all of the packets.

When a repair head receives the beacon packet with the TXDONE flag set, it communicates with its repair head just as a receiver does. The repair head must wait for all of its members' to acknowledge all packets before it can close the session. If a member requires retransmission, the repair head must retransmit all the packets required of its members prior to closing itself. If the beacon from the sender with the TXDONE flag set is received but one or more members have not acknowledged all packets, a Hello message is sent to these members with the same information contained in the beacon packet. Members receiving this Hello message must respond in the same way that they would if they received the beacon. If the repair head still doesn't hear from its members after sending the Hello, it retries several times. After a period of time it gives up on the member and removes it from the member list.

When all members have either acknowledged all packets to the repair head or have been removed from the member list because they were not responsive, the repair head can close its session.

Pruning

In a multicast data distribution setup, the source of a multicast stream can operate in a mode that is sensitive or insensitive to the data reception feedback from the receivers. The drawbacks of being insensitive are a lack of response to network congestion and an inability to deliver the data to as many receivers as possible. Being sensitive makes the multicast distribution mechanism overcome the above drawbacks but also introduces a new drawback that may make the sender operate at a rate that is slower than what is desired by the application. To overcome this drawback, it is necessary that the multicast delivery system support some sort of a pruning mechanism which enables receivers that do not meet the reception criteria to be isolated and removed from the repair mechanism.

In TRAM, the reception characteristics of all the receivers is distributed knowledge. The sender knows of the reception characteristics of its immediate members while some other repair heads in the system know the reception characteristics of some other set of receivers. Due to the distributed nature of reception characteristics, TRAM adopts a collaborative pruning technique that involves the sender and all the repair heads in the system.

The technique requires the sender to orchestrate the pruning operation by providing a MinimumDataRate signal. The signal is included in the header of multicast data and beacons sent by the sender. The signal is set to OFF when no congestion is being reported from the sender.

As a result of receiving congestion feedback information from one or more receivers, the sender attempts to reduce the rate of transmission to accommodate the slow receivers.

The sender sets the MinimumDataRate signal ON when the sender is operating at the minimum rate specified by the application. The MinimumDataRate signal informs repair heads in the distribution tree to prune any poorly performing receivers. The repair heads may respond to receiving the MinimumDataRate signal by pruning members.

Pruned members can be members that are slow, members that are requesting excessive repairs or members that have become unresponsive as a result of a network partition or for some other reason. The members that are pruned are notified of membership termination via the Hello-Unicast message. The repair head may stop honoring repair requests from members that are pruned.

Repair heads can independently perform the pruning operation (i.e., without a sender signal). This may result in premature pruning of the members, as the repair heads may not know whether or not the sender is operating at the configured minimum rate.

Fourth Exemplary Embodiment
General Description of Computer Communication Protocols Communication in a computer internetwork involves the exchange of data between two or more entities interconnected by communication media. The entities are typically software programs executing on hardware computer platforms, such as end stations and intermediate stations. In particular, communication software executing on the end stations correlate and manage data communication with other end stations. The stations typically communicate by exchanging discrete packets or frames of data according to predefined protocols. A protocol, in this context, consists of a set of rules defining how the stations interact with each other.

The hardware and software components of these stations generally comprise a communications network and their interconnections are defined by an underlying architecture. Modem communications network architectures are typically organized as a series of hardware and software levels or "layers" within each station. These layers interact to format data for transfer between, e.g., a source station and a destination station communicating over the internetwork. Predetermined services are performed on the data as it passes through each layer and the layers communicate with each other by means of the predefined protocols. Examples of communications architectures include the Internet Packet Exchange (IPX) communications architecture and, as described below, the Internet communications architecture.

The Internet architecture is represented by four layers which are termed, in ascending interfacing order, the network interface, internetwork, transport and application layers. These layers are arranged to form a protocol stack in each communicating station of the network.

Figure 12:
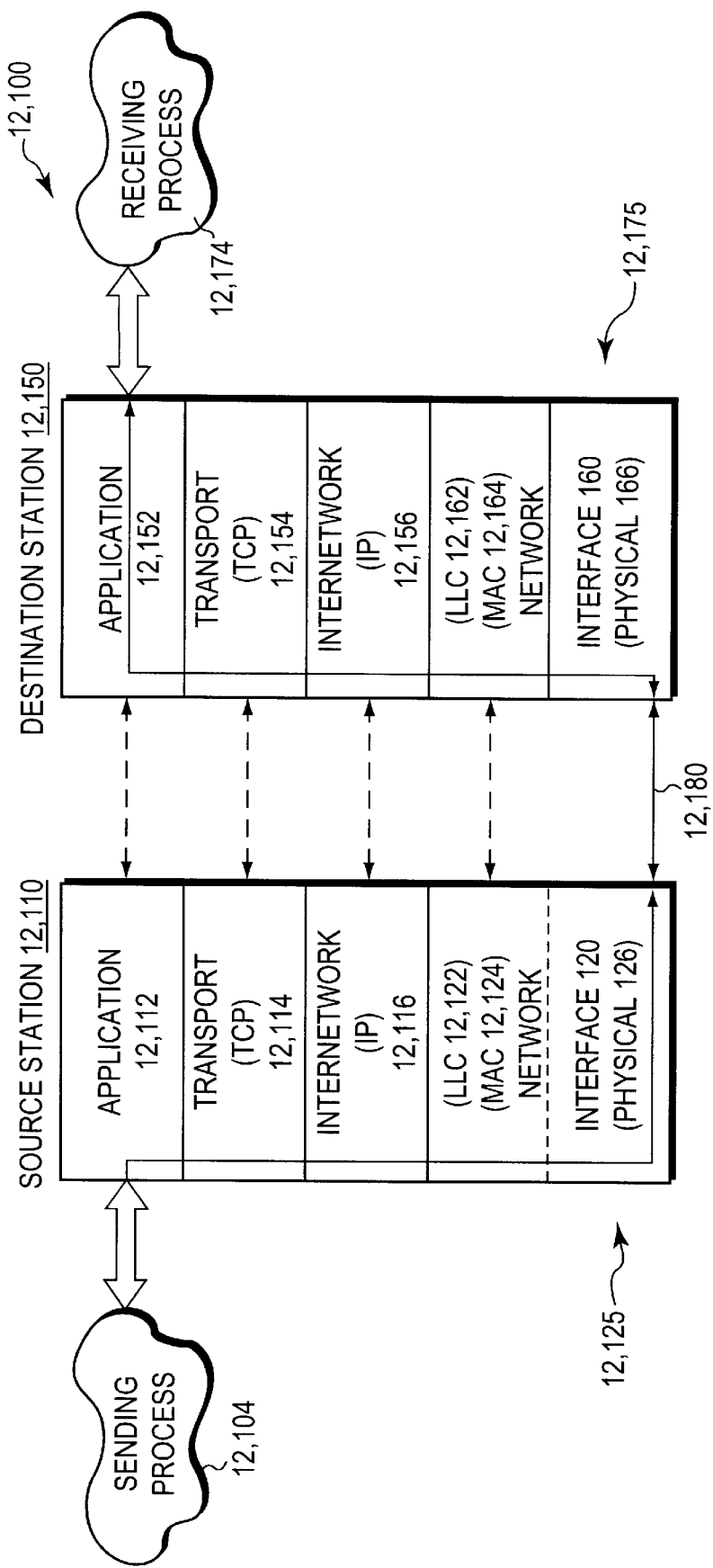
FIG. 12 is a block diagram of protocol stacks for communication between computers.

Turning now to FIG. 12, there is illustrated a schematic block diagram of prior art Internet protocol stacks 12,125 and 12,175 used to transmit data between a source station 12,110 and a destination station 12,150, respectively, of an internetwork 12,100. As can be seen, the stacks 12,125 and 12,175 are physically connected through a communications medium 12,180 at the network interface layers 12,120 and 12,160. For ease of description, the protocol stack 12,125 will be described.

In general, the lower layers of the communications stack provide Internetworking services and the upper layers, which are the users of these services, collectively provide common network application services. The application layer 12,112 provides services suitable for the different types of applications using the internetwork, while the lower network interface layer 12,120 accepts industry standards defining a flexible network architecture oriented to the implementation of local area networks (LANs).

Specifically, the network interface layer 12,120 comprises physical and data link sublayers. The physical layer 12,126 is concerned with the actual transmission of signals across the communication medium and defines the types of cabling, plugs and connectors Is used in connection with the medium. The data link layer is responsible for transmission of data from one station to another and may be further divided into two sublayers: Logical Link Control (LLC 12,122) and Media Access Control (MAC 12,124).

The MAC sublayer 12,124 is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link address called a MAC address. This MAC address is unique for each station interfacing to a LAN. The LLC sublayer 12,122 manages communications between devices over a single link of the internetwork.

The primary network layer protocol of the Internet architecture is the Internet protocol (IP) contained within the internetwork layer 12,116. IP is a network protocol that provides internetwork routing and relies on transport protocols for end-to-end reliability. An example of such a transport protocol is the Transmission Control Protocol (TCP) contained within the transport layer 12,114. The term TCP/IP is commonly used to refer to the Internet architecture. Protocol stacks and the TCP/IP reference model are well-known and are, for example, described in *Computer Networks* by Andrew S. Tanenbaum, printed by Prentice Hall PTR, Upper Saddle River, N.J., 1996.

Data transmission over the internetwork 12,100 therefore consists of generating data in, e.g., sending process 12,104 executing on the source station 12,110, passing that data to the application layer 12,112 and down through the layers of the protocol stack 12,125, where the data are sequentially formatted as a frame for delivery onto the medium 12,180 as bits. Those frame bits are then transmitted over an established connection of medium 12,180 to the protocol stack 12,175 of the destination station 12,150 where they are passed up that stack to a receiving process 12,174. Data flow is schematically illustrated by solid arrows.

Although actual data transmission occurs vertically through the stacks, each layer is programmed as though such transmission were horizontal. That is, each layer in the source station 12,110 is programmed to transmit data to its corresponding layer in the destination station 12,150, as schematically shown by dotted arrows. To achieve this effect, each layer of the protocol stack 12,125 in the source station 12,110 typically adds information (in the form of a header) to the data generated by the sending process as the data descends the stack.

For example, the internetwork layer encapsulates data presented to it by the transport layer within a packet having a network layer header. The network layer header contains, among other information, source and destination network addresses needed to complete the data transfer. The data link layer, in turn, encapsulates the packet in a frame, such as a conventional Ethernet frame, that includes a data link layer header containing information, such as MAC addresses, required to complete the data link functions. At the destination station 12,150, these encapsulated headers are stripped off one-by-one as the frame propagates up the layers of the stack 12,175 until it arrives at the receiving process.

In many cases, the destination of a data frame ("message") issued by a source ("sender") May be more than one, but less than all of the entities ("receivers") on a network; this type of multicast data transfer is typically employed to segregate communication between groups of receivers on the network. IP multicasting, in particular, may be used to disseminate data to a large group of receivers on the network. However, any number of data messages may be lost in transit due to errors or overloading of networking equipment. Ensuring that each receiver/member of a multicast group has received all of the data messages is difficult for a single sender to determine once the group is of any size, since messages from each member to the sender can overload the sender.

One approach to providing scalable reliable multicasting is to organize the receivers into a tree structure so that each internal "node" of the tree is responsible for helping its subordinates recover any lost packets and communicating status back to the sender. Many conventional algorithms exist for constructing such a tree. For example, reliable multicast protocols such as TMTP and RMTP build trees that are used for an entire data transfer session without optimization. Lorax describes methods for generally enforcing member limits. After such a tree is constructed, it may be further optimized as network conditions change. The present invention is directed, in one aspect, to defining characteristics of optimal trees and mechanisms for obtaining such trees.

To effect IP multicasting, a sending process generally specifies a destination IP address that is a multicast address for the message. Receiving processes typically notify their internetwork layers that they want to receive messages destined for the multicast address; this is called "joining a multicast group". These receiving members then "listen" on the multicast address and, when a multicast message is received at a receiver, it delivers a copy of the message to each process that belongs to the group. The result is that the message traverses each link between the sender and receivers only once. When the sender issues a sequence of messages, a multicast flow occurs.

Flow and congestion control for multicast transport is a relatively new research topic. For minutes of an Internet Research Task Force meeting on this topic in September 1997, see http://www.east.isi.edu/RMRG/notes-revO. html. In general, flow and congestion control algorithms adaptively find an optimal (transmission) rate for a multicast flow, based on available bandwidth of all links involved in the transmission and the speed 1 of all the receivers involved.

When a multicast flow competes with other flows (multicast or unicast) for network resources, the flow and congestion control algorithm should exhibit some level of fairness in using the congested resources.

Adaptive control of transmission rate is based on feedback from the network, as is done in unicast flows. A multicast flow tends to traverse more links and depend on the speed of more receivers than a unicast flow. This dependence on more resources makes to the multicast flow control problem substantially more complicated than the case for a unicast flow. The present invention is further directed, in another aspect, to an efficient flow and congestion control technique.

The present invention generally relates to a scalable, reliable multicast transport protocol (TRAM) that supports bulk data transfer with a single sender and multiple receivers of a computer internetwork, such as an intranet or Internet. In one aspect of the invention, TRAM uses reliable multicast repair trees that are optimized to implement local error recovery and to scale to a large number of receivers without substantially impacting the sender.

Fifth Exemplary Embodiment of the Invention

Further features of TRAM are disclosed in this fifth exemplary embodiment of the invention.

TRAM is a tree based reliable multicast protocol. TRAM enables applications requiring reliable multicast to be essentially free of transport related issues like:

Transmission of data between the sender and the receivers reliably.

Direct interaction between the sender and receiver applications.

Congestion control, ACK: implosion and other scalability issues.

Further, TRAM requires no prior knowledge of the receiver community. Also, scalability is non-trivial in former reliable multicast technology, and TRAM achieves this by dynamically grouping the tuned receiver community into hierarchical groups. Grouping enables TRAM to avoid the ACK/NACK implosion problem and to perform local repair operations.

The invention provides many features, for example the features of the invention include: reliable multicast; single source to many receivers; scalable—ability to support a large receiver community; support local repair; support adaptive congestion control mechanisms to prevent network flooding; ordered data delivery; support unidirectional and multidirectional multicast environments during the initial building of the tree and for late joins, and reaffiliation during data transfer; control bandwidth used by multicast control messages during tree formation anti data transfer; scalable up to a million receivers; late joins without data recovery; support for real-time data and resilient category of applications; and, unordered data delivery.

Introduction To Reliable Multicast

Multicasting provides an efficient way of disseminating data from a sender to a group of receivers. There are wide range of applications that can gain by adopting this technology for their data delivery. While some of the applications can function well in an unreliable setup, some of the applications do require reliability for their proper functioning. The degree of reliability required for applications requiring reliable multicast support varies from application to application. The RM group forming within the IRTF has broadly classified the applications requiring multicast into the following categories:

Bulk Data.

Live Data

Resilient Streams.

Shared Data.

Hybrid.

Major challenges posed by reliable multicast in supporting a large scale multicast application are:

ACK/NACK Implosion

For multicast messages to be delivered reliably to every receiver, the sender can either wait for the receivers to acknowledge (ACK) the receipt of the messages; or alternatively adopt a model wherein the receivers report only those messages that were not (NACK) received. For a large receiver base, an ACK implosion is said to occur when a message (or a window of messages) are successfully received by the receivers. A NACK implosion occurs whenever a message loss is detected by a large number of receivers.

Retransmission Based Error Control

This involves the process of delivering the lost data to the individual receivers and the mechanisms (sender based or local repair etc.,) used in performing the repair operations.

Congestion Control

Process of sensing congestion and recovering from it rather than aggravating it. The congestion control mechanism is rate based and is adaptive which enables the sender to sense and adjust to the rate at which the receivers can accept the data.

TRAM Reliable Multicast Protocol

The TRAM model includes the following features:

Scope: one source to multiple receivers.

Tree based with dynamic grouping of receiver community. Regrouping of receivers supported to achieve better distribution of receivers.

Robust tree management and quicker re-grouping under node failure conditions.

Distributed ACK and NACK reporting.

Receiver initiated localized repair operations.

Adaptive congestion control with the ability to adjust the rate of data transmission either to the rare suitable to the slowest receiver nodes or to the specifications provided by the application (involves pruning of slow receivers).

Scales to very large number of receivers.

Count of the number of receivers tuned to a multicast session.

Figure 14:
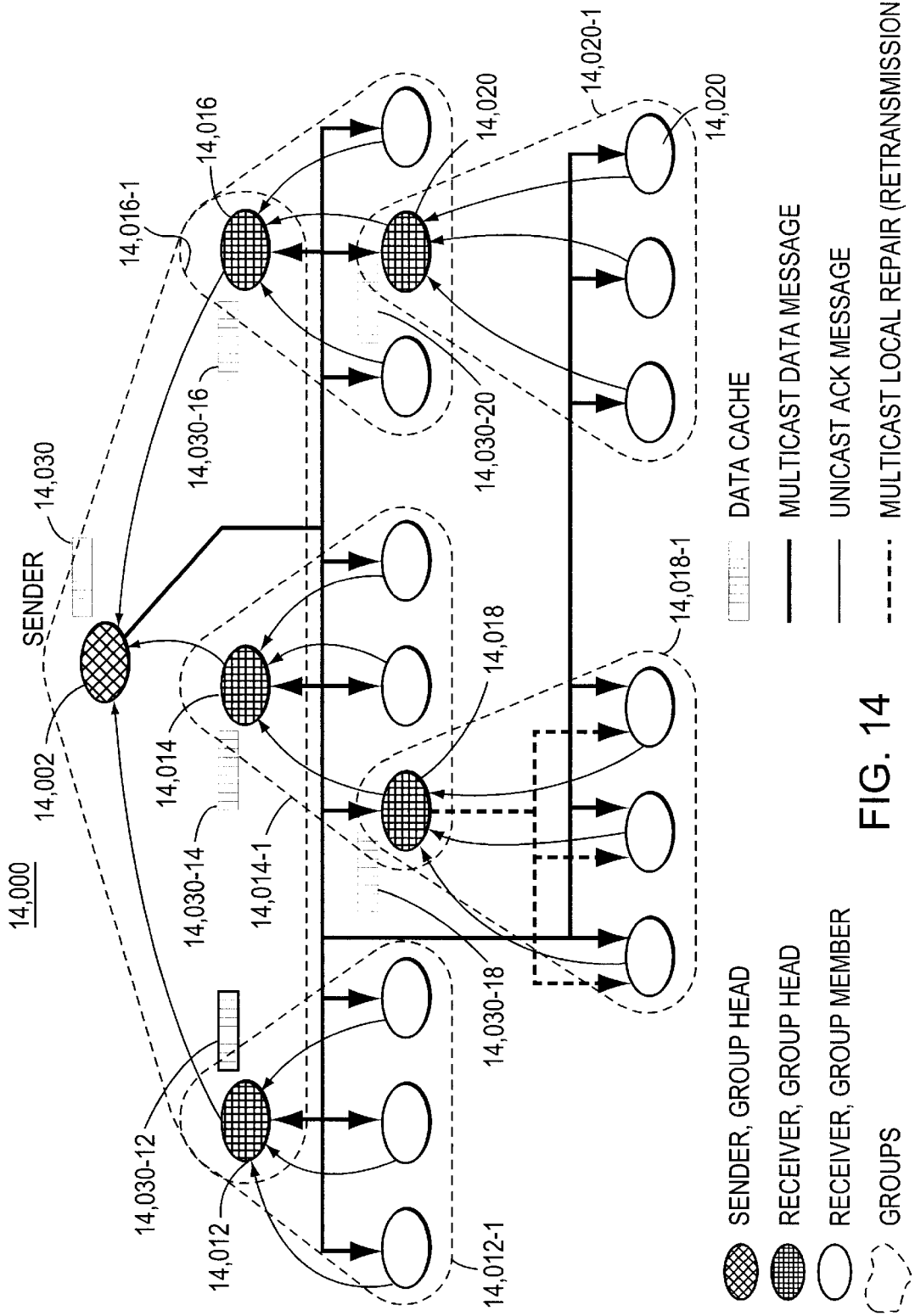
FIG. 14 is a block diagram showing a multicast repair tree.

Turning now to FIG. 14, a brief description of the TRAM model follows. The receivers in TRAM are dynamically grouped into hierarchical groups to form a tree 14,000. The sender 14,002 is at the head of the tree. The parent 14,012; 14,014; 14,016; 14,018; 14,020 of each respective group 14,012-1; 14014-1; 14,016-1; 14,018-1; 14-020-1 is said to be a head. Data is multicast by the sender and all the receivers receive it. The heads in the tree cache the received data messages. The members of a group need not cache the data. Caches 14,030-X are shown for each respective head. The members send acknowledgments of receiving the data to the associated/affiliated head. The heads can free the cached data messages upon receiving acknowledgments from all the members. When members detect loss of a message, they send retransmission requests to the affiliated heads. The group heads retransmit the requested message with a local TTL scope that is large enough to reach all its members.

In addition, the model supports mechanisms: to detect loss of a member/head; detect and control congestion; and to regroup members in a group to achieve tree optimizations.

The model is discussed by first presenting the model fundamentals. The model fundamentals are then threaded together to describe the detailed operation in the Transport Operation subsection.

Scalability

TRAM has the potential of scaling to large number of receivers. This is primarily achieved as a result of adopting:
(1) Hierarchical tree based grouping of the receiver community.
(2) Distributed ACK reporting mechanism.
(3) Local repair operations; and
(4) Adaptive congestion control mechanisms.

Ideally speaking, a four (4) level balanced tree with the sender at the head and every node in the tree supporting 32 different nodes can easily scale to a million receivers. In reality, the factors that limit the scalability of TRAM are:

The required maximum and minimum rate of data transmission of the sender.

The ability of the receiver nodes to cache the multicast data and perform local repair operations.

The computing power of the receiver nodes performing the local repair operations.

Efficient tree/group formation.

Rate of local repair operations and the degree/extent of overlap of the TTL based local repair boundary between groups.

Multicast bandwidth consumed by the TRAM control and tree/group management messages.

In an exemplary embodiment of the invention, TRAM scales to a four level tree with 32 members per node, for a scaling to 32*32*32*32=1,048,576 members. Further levels of scaling to even more members is expected to perform smoothly.

TRAM Repair Tree

Modes

The TRAM modes of operation are:
SEND-ONLY
RECEIVE-ONLY
SEND-RECEIVE.

SEND-ONLY mode is typically used by an application intending to be the source of a multicast data stream. The application is addressed as the sender in the document.

RECEIVE ONLY mode is typically used by application(s) intending to receive a multicast data stream. The application is addressed as the receiver in the document.

SEND-RECEIVE mode is suitable for applications intending to source as well to receive from a multicast stream.

The TRAM requires the applications to specify the mode of operation at the time of starting a TRAM session. The mode causes the TRAM to initiate appropriate management operations required to support the application.

RxGroup, RxGroup-head, RxGroup-member and RxNode

Figure 15:
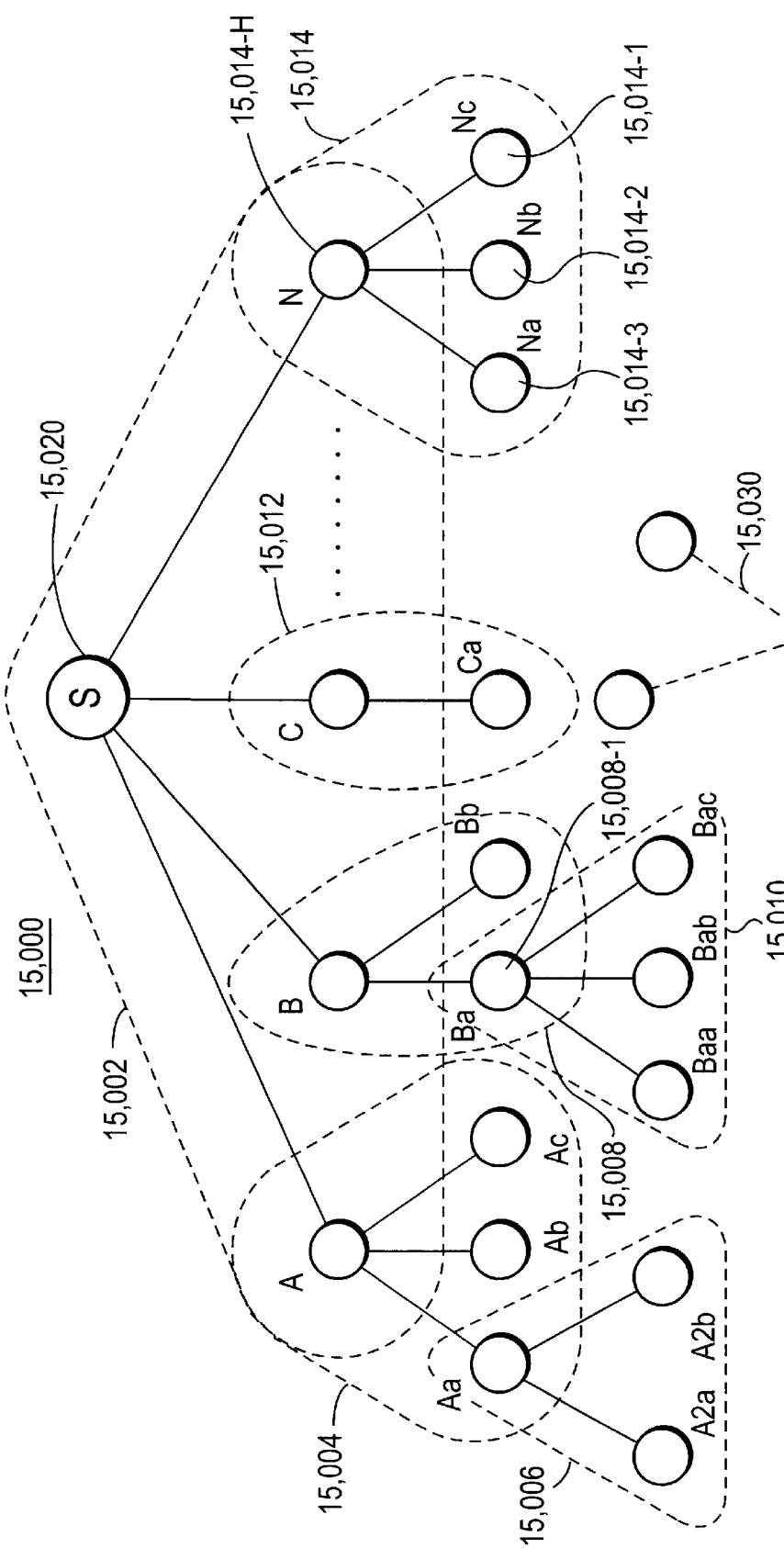
FIG. 15 is a block diagram of a multicast tree showing receiver group relationships.

Turning now to FIG. 15, a block diagram 15,000 showing RxGroup relationships is shown. For each multicast data stream, TRAM dynamically organizes the tuned receiver community into multi-level hierarchical groups 15,002; 15,004; 15,006; 15,008; 15,010; 15,012; 15,014 named RxGroups. Every RxGroup comprises of a group head known as RxGroup-head and a configurable number of group members known as RxGroup-members. For example, for RxGroup 15,014, the group head 15,014-H, and members 15,014-1; 15,104-2; 15,014-3 are shown. The transport supporting the sender 15,020 application is by default a RxGroup-head. A RxGroup in which the transport supporting the sender operates as the group head is known as a Primary-RxGroup, and all the rest as Secondary-RxGroups. A RxGroup-Member of one RxGroup can in turn play the role of a group head to its lower level RxGroup, as member 15,008-1 of group 15,008 is a group head for group 15,010.

A RxGroup-head is primarily responsible for caching the sent/received multicast data to participate in local repair/retransmission operations. Multicast messages received by the RxGroup-members are acknowledged with the aid of unicast ACK messages. The ACK messages are sent to the respective RxGroup-heads to distribute and overcome the ACK implosion problem. The ACK reporting is done using a window mechanism.

A receiver node not part of any RxGroup or is in the process of affiliating to a RxGroup is known as a RxNode, as illustrated by RxNode 15,030.

The details of RxGroup formation and the selection of the RxGroup-head and RxGroup-members are discussed in the RxGroup Management section hereinbelow.

Sender-beacon

A sender-beacon is a lightweight multicast message generated by the TRAM supporting the sender at various stages in a multicast session. The sender-beacon uses the same multicast address destined to be used by the sender. The sender TRAM utilizes the sender-beacon as a means to communicate with the receiver community.

The Sender-beacon Serves Different Purpose Under Different Conditions

At the beginning of a multicast session (i.e., before the multicast data transmission), the sender-beacon signals the receiver community to start the RxGroup formation process. The sender-beacon is periodic (T_BEACON) and has session-scope TTL. In the middle of a multicast session (i.e., when the multicast data transmission is in progress), the sender-beacons are generated only under the following conditions and have a session-scope TTL 1. When the application at the sender is not producing the data packets at the specified (configured) rate of data transmission. The sender-beacon rate in this case does not match the specified rate of data transmission but is frequent enough to indicate to the receiver community that the multicast session is active.

2. Under congestion when the multicast data transmission is temporarily suspended. The sender-beacon is periodic (T_BEACON_FILLER) for the suspended interval of time and serves to enable the receiver community to consider the muiticast session to be active.

The TRAMs on the receiver side discard the sender-beacon message after processing and updating the sender status information.

At the end of the multicast session, the sender-beacon is used to signal the end of the multicast session and gather some statistics. The sender-beacon in this case is periodic (T_BEACON_FILLER) for a configured period of time. This is currently considered to be optional.

RxGroup Management

The RxGroup management mechanism enables the dynamic formation of receiver community into RxGroup(s). The RxOroup, formation uses a mechanism similar to expanding ring search (ERS).

RxGroup formation occurs at the start of a multicast session. The TRAM at the sender triggers the RxGroup formation process by generating the sender-beacon messages. The sender-beacons are stopped when the sender starts transmitting the multicast data. In order to accommodate late joins, the group formation continues even after the sender-beacon stops. Regrouping of RxGroup can occur at anytime during the multicast session and are primarily done to achieve optimizations such as load balance etc.; or due to the loss of a RxGroup-head.

Before the reception of a sender-beacon or multicast data message, all tuned receiver TRAMs remain idle and do not participate in any RxGroup formation process.

RxGroup management requires TRAMs to maintain the following state for every supported multicast session:

1. Member role (MRole).
2. Head state (HState).
3. Group level (RxLevel).
4. Direct member count (Dmem_Count).
5. Indirect member count (IndMem_Count).
6. Direct head count (Dhead_Count).
7. Indirect head count (IndHead_Count).
8. Direct advertising head count (DAdverthead_Count).
9. Indirect advertising head count (IndAdvertHead_Count).
10. Reserved head slots available (Reserved_Head_Slots).
11. Member slots available (Avail_Member_Slots).

Items 2, 4, 5, 6, 7, 8, 9, 10 and 11 are applicable only if the TRAM is performing the role of a RxGroup-head.

The MRole information is advertised by the TRAMs, as part of the RxGroup Management process, to indicate its current or preferred role in the RxGroup Management. The different MRoles in RxGroup Management are:

Member_Only.

Member_EagerHead,

Member_ReluctantHead.

Member_Only role indicates the inability of TRAM to perform the role of a RxGroup-head. This is typically reported by RxNodes with resource limitations or explicitly administered to perform the role.

Member_EagerHead role indicates that the TRAM is either (1) performing the role of a RxGroup-head or (2) is attempting to become a RxGroup-member and is willing to perform the role of a RxGroup-head when required.

Member_ReluctantHead role indicates that the TRAM is either (1) performing the role of a RxGroup-head or (2) is attempting to become a RxGroup-member and can perform the role of RxGroup-head when commanded or when it is absolutely necessary.

The HState information is maintained and advertised by TRAMs that are currently performing the role of a RxGroup-head. This information is included in the RxGroup Management messages that are multicast with a local scope. The RxGroup-members use the HState information to decipher the current state of a RxGroup-head in the neighborhood. The different HState states are:

Accepting_Members.

Not Accepting_Members.

Resigning.

Figure 16:
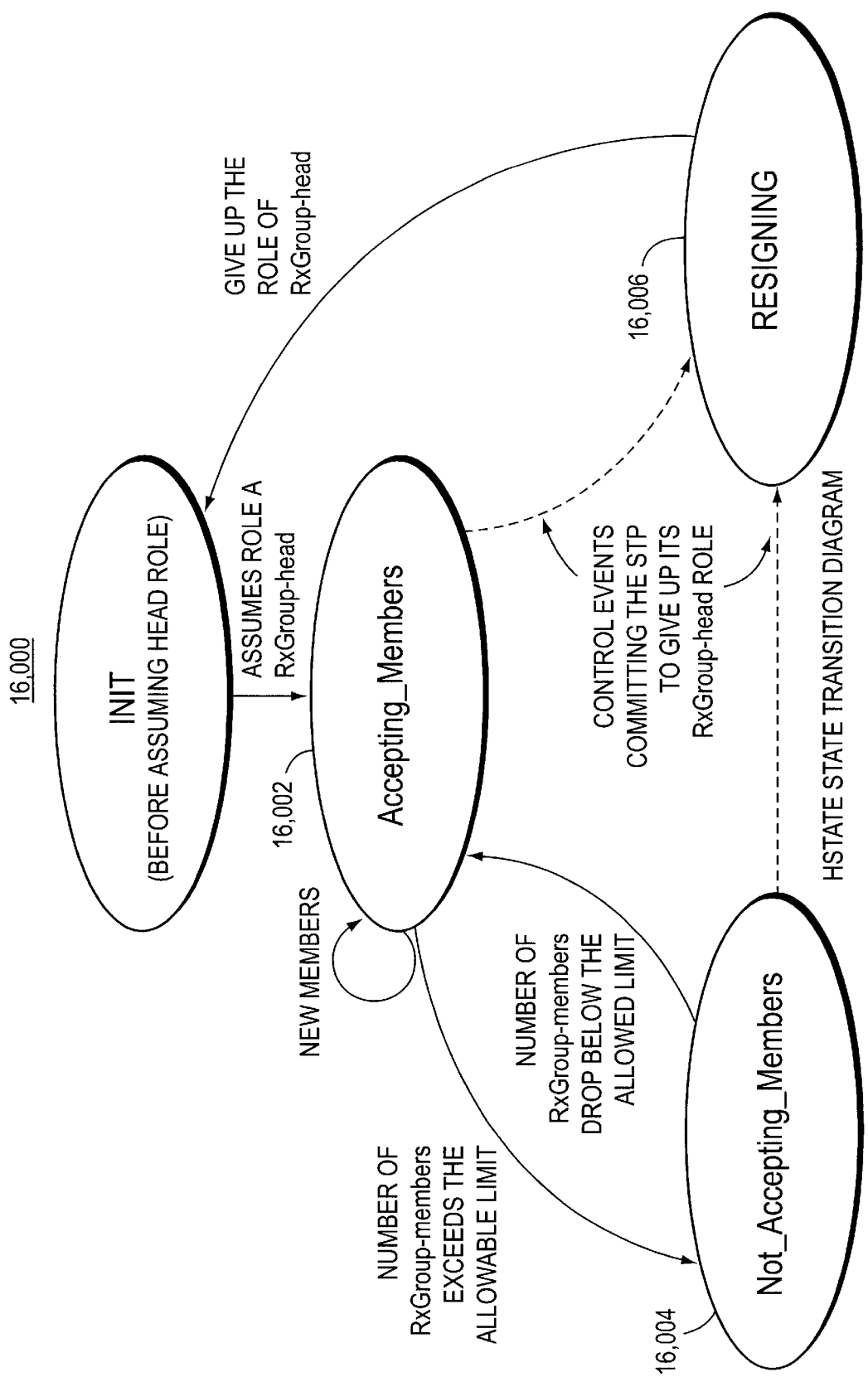
FIG. 16 is a block diagram of a HState transition diagram.

Turning now to FIG. 16, there is shown an HState transition diagram 16,000. The Accepting_Members state 16,002 indicates that the RxGroup-head has the potential of accepting new RxGroup-members, and Not_Accepting_Members 16,004 state means the opposite. Resigning state 16,006 means that the RxGroup-head is in the process of giving up the RxGroup-head role and is indicating to its dependent RxGroup-members to re-affiliate to a different RxGroup-head.

The RxLevel indicates the operating level of a RxGroup-member from the sender. In other words, the RxLevel provides the RxGroup hop distance from the sender.

The Dmem_Count refers to a count of RxGroup-members that a RxGroup-head is directly responsible for. The IndMem_Count of a RxGroup-head refers to the sum total of all RxGroup-members (direct as well as indirect) that the direct RxGroup-members are responsible for.

The Dhead_Count refers to a count of RxGroup-members that are heads that a RxGroup-head is directly responsible for. The IndHead_Count of a RxGroup-head refers to the sum total of all RxGroup-members (direct as well as indirect) that are heads that the direct RxGroup-members are responsible for.

The DAdverthead_Count refers to a count of RxGroup-members that are advertising heads that a RxGroup-head is directly responsible for. The IndAdvertHead_Count of a RxGroup-head refers to the sum total of all RxGroup-members (direct as well as indirect) that are advertising heads that the direct RxGroup-members are responsible for.

Reserved_Head Slots refers to the number of slots the head is reserving for affiliation of other heads. Avail_Member_Slots refers to the number of slots available at the head for members regardless of MRole.

RxGroup Membership Process

The sender TRAM initiates the RxGroup membership process by generating session-scope sender-beacons. In HA, the sender-beacon and data messages include the Head Advertisement Interval (HAI) to be used by all heads. Only RxNodes that receive the sender-beacon or data messages are eligible to join the tree. Once the sender is ready to start forming the tree, it starts head advertisement.

Head Advertisement

Any head that is affiliated with the tree (including the sender) that still has room for more members sends multicast Head-Advertisement (HA) messages. HAs are sent with increasing TTL, at the interval specified by the HAI sent by the sender in the sender beacon (plus randomization). Affiliated nodes with MRole of Member_ReluctantHead send HAs at half of this rate (plus randomization).

Each time an HA is sent, the TTL is increased by the HA TTL increment parameter if no additional members made a successful bind to the head during the last two head advertisement intervals.

The HAI is determined by the sender and may be changed as the tree grows and an increasing number of heads advertise. HAI starts off at ½ second, then adjusts according to the following formula:

$$HAI=\max(\text{½ second}, ((\text{AdvertisingHeadCount}*HASize)/\text{MaxHABW}), (\text{AdvertisingHeadCount}/\text{MaxPacketRate}))$$

where:

AdvertisingHeadCount is the number of heads in the tree currently sending HAs.

HASize is the size of an HA message in bits (approximately 320 bits).

MaxHABW is the maximum bandwidth allocated For HAs:
  MaxHABWTreeFormation before data transfer
  MaxHABWDataTransfer during data transfer.

MaxPacketRate is assumed to be 30 packets per second in an exemplary embodiment of the invention.

Applications control the amount of bandwidth used by HAs with the MaxHABWTreeForm and MaxHABW-DataTransfer parameters. The default value for MaxHAB-WTreeForm is Max_Data_Rate. The default value for MaxHABWDataTansfer is 0, indicating that Head Advertisement is not used for late joins and reaffiliation.

HAs include:
  The MRole information.
  Original TTL value.
  TTL to sender (if known).
  RTT to sender (if known).
  The address of the multicast data source.
  Unicast port to use to respond.
  Flags.
  RxLevel.
  Dmem_Count and IndMem_Count.
  Reserved Head Slots
  Avail_Member_Slots RxNodes wishing to join the repair tree listen for HA messages for a period determined by the following minimization factor after the receipt of either a sender-beacon or a data packet from the data source. The minimization factor is given by:

$$HA \text{ listen Time}=\text{MIN}( (3*HAInterval \text{ specified by Data source}), 60 \text{ seconds})$$

At the expiration of this period, the receiver chooses the head that it prefers and binds to it. If the RxNode fails to receive any HA advertisements at the end of the period, the listen period is reloaded. HAI is recalculated every time the sender sends a sender-beacon. Head advertisements stop once a head sees data from the sender. Members wishing to join the tree after data transmission begins must use the "late join" procedure, described below.

Choosing a Head

A member chooses a head after listening to HA messages for three head advertisement intervals. The member selects a head based on the following criteria:
  1. Available slot type (members with MRole Member_Only cannot bind with a head with only head slots available).
  2. MRole (pick empty reluctant heads only if no other heads are available).
  3. TTL to the head.
  4. Tree level (eliminate all but those with the lowest level).
  5. Member count (choose heads that are close to being fully populated).

Member Bind

Once the optimal head is selected, the RxNode attempts to bind with the head by sending it a unicast Head-Bind (HB) message. While waiting for a response, the RxNode continues to monitor HA messages, just in case this bind fails. If the head responds with a unicast Accept-Member (AM) message, the RxNode is bound. If the head responds with a unicast Reject-Member (RM) message (for instance if the head is already full, or only has reserved head slots available and the RxNode's MRole is Member_Only), the RxNode tries to affiliate with the next-best head. If no answer is heard after N_HB_RETXM retransmissions at T_HB intervals, the RxNode gives up on the chosen head and tries the next best one.

Once an RxNode with an MRole of Member_EagerHead or Member_ReluctantHead is bound to the tree, it starts to send HAs in the same manner as the other heads.

If the RxNode starts to receive multicast data messages before becoming a RxGroup-member, then the RxNode uses the MTHA late join procedure. HB messages include:
  MRole.
  TTL to sender (if known).
  RTT to sender (if known).
  Original TTL.
  Former RxLevel (used during reaffiliation).
  Unicast port to use to respond.
  Flags.
  Dmem_Count and IndMem_Count (used during reaffiliation). RxGroup-head and RxGroup-member Interaction (RRI)

RRI plays a crucial role in TRAM and aids in the following operations:
  Detecting unresponsiveness of a dependent RxGroup-member or a dependent
  RxGroup-head.
  Propagation of congestion information to the sender.
  Round trip time (RTT) computations.
  Propagation of RxGroup level, direct and indirect membership counts.
  Informing the RxGroup-members of other RxGroup-heads in the neighborhood.

The different RRI messages are:
  1. Hello message.
  2. Hello-Uni message.
  3. ACK message.

The Hello message is a multicast message which is generated by a RxGroup-head on a periodic (T_Hello) basis. Since the RxGroup-heads (non sender) do perform regular data transmissions other than retransmissions, the Hello message acts like a heart beat message to the dependent members. In the case of the sender, the data message itself acts as a heart beat message and as a result the sender generates a Hello message only if the situation requires. The Hello message includes the following details:
  HState.
  CState.
  Current TTL Scope for handling retransmissions.
  RxLevel.

Multicast data source address.

Unicast port in use.

Flags.

Checksum.

In addition to the above details, the Hello message supports option fields. In an exemplary embodiment of the invention, two options are defined but only one of them can be used at a time. When options are used, the relevant bits in the flags space are set. Except for the ease when using option two (described below), the Hello message does not require a response.

The first option is an informatory message to the dependent members. Currently, one such informatory message is to inform the members of the unavailability of one or mere data messages in its cache. This message is rare and is generated in response to retransmission request of an unavailable message from one of the dependent members. This option adds the following details to the Hello message:

Valid bitmask length.

Start sequence number of the window of messages being reported missing.

Bitmask to report the message status.

The second option is used by the RxGroup heads to cause some of the members to respond to the Hello message. This is typically done to perform RTT computations. (Note the RTT computed is that of multicast path from the head to the member, and a unicast path from the member to the head). In this case the list of members required to respond to the Hello message is included in the option field. The timestamp included in the Hello message is bounced back to the head with the aid of an unicast ACK message by the members listed in the Hello message. This option adds the following details to the Hello message.

Number of members whose addresses are listed.

A timestamp that needs to be bounced back.

List of Addresses of members that need to respond to the Hello message.

Further, since the Hello message is a multicast message, the Hello message can serve as a means to inform other RxGroup-heads and RxGroup-members in the neighborhood of its existence. This can be used to detect and optimize the number of heads in the neighborhood and can also serve to provide backup head information to other members in the neighborhood. The TTL scope in use field in the Hello message can be maintained by the non dependent members as a backup TTL, and can quickly re-affiliate upon losing its dependent RxGroup-head.

Hello-Uni is a unicast Hello message that is generated occasionally by a RxGroup-head to one of its RxGroup-members. The Hello-Uni message is generally used for unicast communication with a RxGroup-member. The Hello-Uni message can be used to inform a member of its data latency from the sender or can be used to specifically determine if a member is unresponsive. The Hello-Uni message includes the following details:

HState

CState.

Flags.

Multicast Address.

Multicast data source address.

RxLevel.

Receiving member's latency (in ms) from the data source as computed by the RxGroup-head.

The Hello-Uni message requires a member to respond with an ACK message. Every RxGroup member maintains a watchdog timer to keep track of its RxGroup-head. Receiving a Hello/Hello-Uni message or even a retransmission message can cause the timer to be reloaded. If a RxGroup-member misses N_HELLO_MISSES successive Hello/Hello-Uni messages, a re-affiliation/regrouping process begins.

Every RxGroup-head computes the round trip time between itself and a RxGroup-member, adds its latency from the data source (learnt via its RxGroup-head) and relays the information to the RxGroup-member via the Hello-Uni message. Note that member latency reported in the Hello-Uni message refers to the previously computed latency. Until the RTT is computed, the Hello-Uni message, if generated, will have the receiver's member latency set to zero (0).

The ACK message is a unicast message that is generated by RxGroup-members. Typically ACK message is used to acknowledge the receipt of multicast data messages that are sent by the sender TRAM, but NACK and various other management information such as RTT, member count etc., are piggy backed in the same message. The details included in the ACK message are:

MRole.

CState.

Multicast address and the multicast data source address.

Start Sequence number (SSQ) of the window of messages being acknowledged.

Valid bitmask length (N) or the window length of messages being reported.

Bitmask to indicate the receive Status of individual messages in the window length.

Flags.

Checksum.

Timestamp received in the Hello message (when applicable).

Dmem_Count (if any).

IndMem_Count (if any).

DAdverhead_Count (if any).

IndAdvertHead_Count (if any).

The maximum number of receive message status that can be included in one ACK message is configurable. The details of the ACK mechanism is discussed in a later section.

The ACK message serves as a heartbeat message for the RxGroup-heads to keep track of its member community.

The Hello messages are generated only after a member assumes the role of a head. That is, after receiving an AM message from a RxNode. The Hello messages are initially generated based on the TTL computed from the HB message. If the multicast path from the member to a head is not the same as from head to a member, then TTL may not be appropriate, and as a result the member may not be able to receive the Hello messages. Since the head multicasts the retransmissions with a limited scope, it is important that the head use a TTL value that is large enough to reach all the dependent members. The member can detect this condition when the Hellos are not being heard. The member under this condition will inform the head of this condition via the flag field in the ACK message. To ascertain that the head has not gone offline, the member can optionally request the head to send a Hello-Uni message. The head upon receiving the ACK message will increase its TTL and if required, a Hello-Uni message is sent to the member. This process continues until the member indicates the receipt Hellos.

Late Join Procedure

Many applications allow users to join the session after some data has been transmitted. These are known as late joins. New members can detect whether or not data transfer has begun by listening for a given time on the multicast address. If no packets are received, the receiver is either outside of the scope of the session, or the session has not yet begun. If a sender-beacon with sequence number zero is received, the member knows the tree is still forming and should soon receive an HA. If a data packet or a sender-beacon with non-zero sequence number is received, the member uses the late join procedure.

Late joins use either Head Advertisement as described above, or Member-Triggered Head Advertisement (MTHA). Continuing Head Advertisement during data transfer may result in enough extra multicast traffic to disrupt the application. MTHA is available as an alternative for these applications. Late joiners can determine which method is being used by observing the HAI in the sender-beacons and data messages: if the HAI is 0, MTHA is in use.

MTHA can be a better choice for late joins because it eliminates the need for continuous multicast HAs with session TTL. Receivers that want to join the repair tree send multicast (Member-Solicitation (MS) messages every T_MS seconds to find a head. Any heads (eager or reluctant) that receive this message and are willing to be a head for this node (and are already affiliated with the TRAM tree) send multicast Head-Advertisement (HA) messages using the original TTL from the MS message. A member increases the TTL of its MS message by the MS_TTL increment parameter if no HAs are received during the T_MS period. After an interval of 3*T_MS (plus randomization) seconds from receipt of the first HA, the receiver chooses a head as in HA (described above).

In order to avoid storms of MS messages, late joins first Listen for MSs for 2*T_MS (plus randomization) seconds before sending. If a local (TTL=original TTL) MS with an identical MRole is heard, it suppresses its own MS and listens for HAs for another 2*T_MS for MS (plus randomization) seconds. If no MSs or HAs are heard during this interval, it send its own MS.

In order to avoid storms of HA messages in response to MSs, heads that are willing to accept members should listen for MS messages. If they receive one, they can set a timer for one T_MS (plus randomization). When the timer expires, they should look at all MS messages received during that inter interval, then send their HA with the greatest original TTL of any of these incoming MSs. MS messages include:

MRole.
TTL to sender (if known).
RTT to sender (if known)
original TTL.
Former RxLevel (used during reaffiliation).
Flags.
Dmem_Count and IndMem_Count (used during reaffiliation).

Re-affiliation of RxGroups

Re-affiliation is triggered when a group member decides that it wants to affiliate with a different head. This may occur because its old head is resigning or not responding, or because the member has discovered a better head (in terms of closeness). A functioning head can typically resign when the user is attempting to exit out of the multicast group, or when the functioning head has determined itself to be redundant in the region. Detection of a better head and redundant heads in a region are made possible by reception and processing of various multicast control messages generated by the heads and members in a region. The various steps involved in the re-affiliation process are listed below:

1. A member decides to re-affiliate. It finds a head that it wants to re-affiliate to (by checking Hellos, HAs, or using MTHA).
2. The member uses the normal TRAM affiliation mechanisms to affiliate with the new head (sending a Head Bind and receiving an Accept Member or Reject Member). If this affiliation fails, it goes back to step 1 (finding a head).
3. Once the member has affiliated to the new head, it maintains its affiliation to its old head until it successfully receives all missing packets that are earlier than the starting sequence number of the packets that is guaranteed to be cached by the new head. The new head reports the starting sequence number of the packets that will be cached via the AM message. During this interval, the member sends ACKs to both the old and the new heads (unless the old head is dead). If the new head becomes unresponsive during this interval, the member goes back to step 1 (finding a head). This interval is known as the Transition Interval.
4. Once the Transition Interval has been completed, the member sends an ACK with the Terminate Membership bit set to its old head. At this point, reaffiliation is complete and the member and the old head forget about each other.

During re-affiliation, if the member is itself a head, it continues to function as a head and is not allowed to accept new members.

The whole re-affiliation process is straightforward and simple when the re-affiliating member is not performing the role of a head. When the re-affiliating member is performing the role of a head, certain additional checks have to be performed while selecting the new head so as to avoid forming malformed repair tree or loops.

Figure 17:
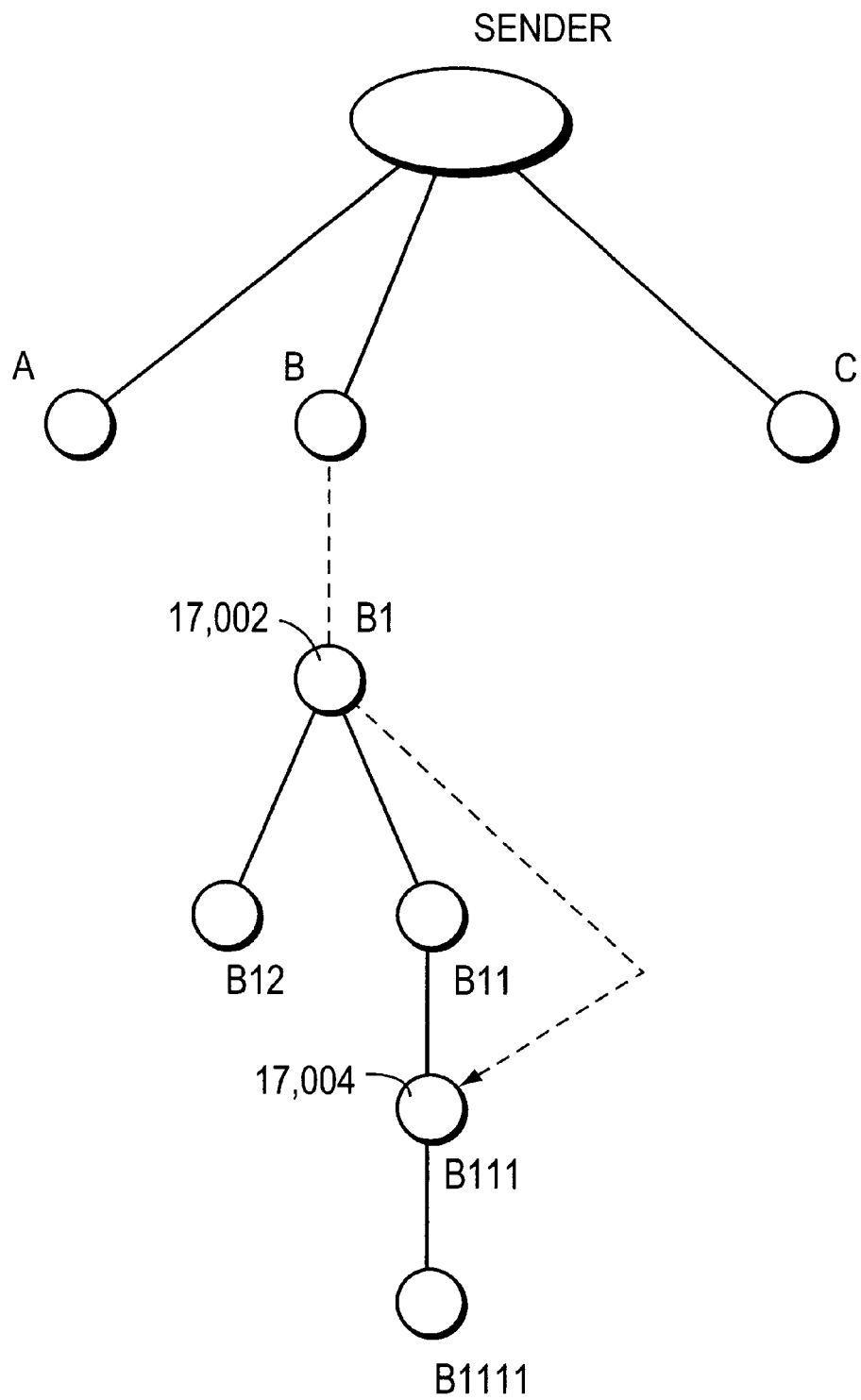
FIG. 17 is a block diagram of a multicast repair tree showing improper loop formation during re-affiliation.

Turning now to FIG. 17, a re-affiliation by a head attempting to form an undesirable loop is shown. Typically a loop can be formed when a head higher up in the tree hierarchy re-affiliates with a head that is a descendent of itself. For example as shown in FIG. 17, head B1 17,002 may re-affiliate with head B111 17,004 to form a malformed repair tree.

TRAM avoids the loop formation shown in FIG. 17 by propagating a tree level information called RxLevel as part of the tree management information. The sender is said to be at RxLevel 1, the heads that are members of the sender's RxGroup are said to be at RxLevel 2 and so on. Loops are avoided by adopting the policy that a member performing the role of a head will not re-affiliate with any head whose RxLevel is equal or greater that its own RxLevel. Further, a head upon losing its heads is unable to find a suitable head for more than 5 minutes is forced to resign. This is important, since members of an unaffiliated head are disconnected from the sender. They may not receive repairs and cannot provide congestion feedback.

Maximizing Reaffiliated Members

By adding the former DMEM_COUNT and IndMem_Count to the MS and HB packets, existing heads with limited slots for reaffiliations can choose heads with the most members.

Standby Heads

During data transfer, members can have a hot-standby head to use for a quick re-affiliation instead of having to start at the beginning of the HA or MTHA process.

Standby Heads for HA

Members of trees that use HA for late joins simply continue to listen to HAs during data transfer, keeping track of the next best head available.

If the watchdog timer tracking the RxGroup-head expires N_HELLO_MISSES times, the RxGroup-member starts the re-affiliation process by sending a HB message to the selected head. If the member cannot bind with the selected head, reaffiliation falls back on the default HA method.

Standby Heads for MTHA

Members of trees that use MTHA for late joins still have a possible way to determine standby heads. Every RxGroup-member, while successfully affiliated to a RxGroup-head, processes the nearby RxGroup-head's multicast Hello messages and maintains a maximum backup TTL value that it may have to use reach one of these neighboring RxGroup-heads. The TTL values from Hello messages that indicate that the HSTATE as Not_Accepting_Members are ignored.

If the watchdog timer tracking the RxGroup-head expires N_HELLO_MISSES times, the RxGroup-member starts the re-affiliation process by sending a MS message with TTL scope of the message set to the backup head TTL scope maintained (if any, otherwise with expanding scope as in a late join). If the MS sent to the computed TTL scope does not yield HA messages, ERS mechanism will be pursued.

Specifying the Tree Formation Method

TRAM's default mode of operation is to use the HA method for tree formation before the sender starts data transmission, and MTHA after. This is intentionally done to form the tree quickly using a higher-bandwidth method (HA), then use a slower, less bandwidth-intensive method once data starts.

However, some groups or applications may prefer to use only HA or only MTHA throughout the entire session. For that reason, the tree formation method may be specified in the transport profile. The default value, TREE_FORMATION_HAMTHA specifies the default behavior. TREE_FORMATION_HA specifies that HA be used throughout the session. TREE_FORMATION_MTHA specifies that MTHA be used throughout the session.

Optimizing Tree Formation in Local Area Networks

If several members of a group are located on a local area network (LAN), neither HA nor MTHA will form an optimal tree. In this case, all members of the LAN are likely to affiliate to heads that are off of the LAN. This can result in extra traffic between the members on the LAN and the off-LAN heads in the event of packet loss.

A more optimal tree is formed in this case by electing a single head on the LAN, and having only that head affiliate off of the LAN. If necessary, extra heads on the LAN can form a subtree under the LAN head.

LAN trees are formed using a slight variation on the existing tree formation methods. The changes allow LAN tree formation to finish before the timeouts controlling off-LAN tree formation expire. Whether using HA or MTHA, LAN members send HA packets to the LAN only (using a TTL of 1), and elect a LAN head just as in the usual HA method. Once this head has been elected, the tree formation method continues as usual. Since it is the closest head to any member on the LAN, the elected LAN head will always be selected for affiliation by members on the LAN. If the elected LAN head cannot handle any more members, additional heads are elected from those already affiliated with the LAN head.

LAN tree formation is not enabled by default because it does result in more multicast traffic, and only helps groups with multiple members on a LAN. It can be enabled using the setLanTreeFormation method in the transport profile.

Data Transmission

The sender in a TRAM application transmits data packets to every receiver in the multicast group. TRAM sends the packets at a specified rate. Each packet is given a unique sequence number starting with one (1). Receivers use these numbers to detect out of order and missing packets.

Data Retransmissions

When the sender receives a request for retransmitting a packet, it queues the requested packet up immediately. Retransmissions take priority over new data packets. Retransmitted packets are sent at the same rate as regular data packets from the sender. Repair heads compute the average data rate of all packets it receives and sends retransmissions at this rate.

The sender in a TRAM application multicasts data packets to all of the receivers in the multicast group. The application calls the putPacket method (or write method for the stream interface) to queue up packets for transmission. The output dispatcher sends the packets at the specified rate. Each packet is given a unique sequence number. Receivers use these numbers to detect out of order and missing packets.

Duplicate Retransmission Avoidance

When several members request retransmission of the same packet, TRAM sends the packet immediately for the first request. Subsequent requests are ignored if they are received within a set time, for example one second, of the first request.

Occasionally many packets are queued up waiting for retransmission. If a new request for a packet is received and that packet is already on the transmit queue, the request is ignored.

Acknowledgments

Reliable transmission in TRAM is achieved with acknowledgments. Members use an ACK window to trigger sending an acknowledgment message to their repair head. The ACK window expires when a packet with a sequence number greater than or equal to the end of the next window arrives.

Members acknowledge one ACK window of packets at a time to their repair head. The ACK window size is configurable; the default is 32. For example, in the default case, members send ACKs every 32 packets.

To avoid multiple members sending ACK messages at the same time, and to possibly expedite repairs, ACK messages are distributed over the window. Each member selects a random packet between 1 and the ACK window size to start sending ACK messages. For example, one member may send ACKs at packets 32, 64, 96; etc., while another sends ACKs at packets 10, 42, 74, etc.

Acknowledgments are also sent if a timer equal to 1.5 times the estimated ACK interval expires. The estimated ACK interval is computed at each receiver when an ACK is sent. It estimates the amount of time it takes to receive an ACK window's worth of packets. The formula is:

$ACK$ interval=$ACK$ window*(Time since last $ACK$/Packets since last $ACK$)

This timer is canceled if an ACK is sent using the triggering mechanism described above. If this timer expires, it indicates that the sender has paused and allows members to report and recover any lost packets without having to wait for the sender to start sending new data.

Each ACK message contains a start sequence number and a bit map length. If no packets were missing, the bit map length is "0" and the sequence number indicates that all packets prior to and including this packet were successfully received. The repair head saves this information and uses it to remove packets from its cache.

If there are one or more missing packets, the start sequence number indicates the first missing packet. A bit map must follow. Each bit in the map represents a packet sequence number starting with the start sequence number. If the bit is set, that packet is missing and must be retransmitted. A bit map length indicates how many valid bits are present.

When the repair head receives an ACK message with a "missing packets" bit map, the sequence number specified minus 1 is saved for this member. This indicates that all packets prior to and including this sequence number have been received successfully. The repair head then scans the bit map looking for missing packets. It immediately places these packets onto the transmit queue unless they have recently been retransmitted is or are already on the queue from another request.

Flow Control

In TRAM the sender maintains a data rate between a minimum and maximum specified rate. The rate is increased every two (2) ACK windows and decreased for each new congestion report. If the senders data cache fills up, the sender stops sending new data until it can reduce its cache below the high water mark.

The actual rate scheduler is implemented as follows. When the application places a packet on the transmit queue, the output dispatcher sends the packet on the multicast socket. It then computes the amount of time to delay in order to achieve the desired data rate. The delay is computed with the formula:

packet size/desired rate

The overhead in processing the packet is subtracted from this delay. The output dispatcher then sleeps for the calculated period and the cycle continues.

Slow Start

The initial data rate starts at 10% of the maximum or the minimum rate if that is greater. Every two (2) ACK windows this rate is increased another 10% of the maximum data rate. This process continues until the maximum rate is reached or congestion causes the rate to decrease.

Congestion Reports

Congestion reports from the receivers, in an exemplary embodiment of the invention, cause the data rate to drop 25%. After congestion the rate increments are more conservative in an attempt to alleviate the congestion. The new rate increment is computed from the previous rate increment value as follows:

new rate=current rate+((last increment rate−current rate)/4)

This algorithm allows the data rate to increment quickly back to the point where congestion was reported.

Congestion Control

Congestion is detected at the receivers and repair nodes. Receivers detect and report congestion based on missing packets. Repair heads detect and report congestion based on their cache content.

Rate Based Congestion Detection

Receivers detect and report congestion when the number of outstanding missing packets between two ACK windows increases. For example:

If a receiver detects five (5) missing packets during the last interval and has ten (10) packets missing in the next interval, a congestion message is sent to its repair head. The congestion message contains the highest sequence number received. When the repair head receives the congestion message, it determines whether this is a new congestion report and if so, forwards it immediately up to its repair head. Each head will forward one congestion packet from its members for each ACK window. The head computes the ACK window from the sequence number specified in the congestion message with the formula:

sequence number/ACK window

The repair head will send one congestion message up the tree for each ACK window. Once a congestion message has been forwarded up the tree, congestion reports for previous ACK windows will be ignored. The sender will also ignore any congestion messages for the same or earlier windows.

Cache Based Congestion Detection

Repair heads also generate congestion messages when their data cache begins to fill up. Each head maintains a low and high water mark on their cache. When the number of packets in the cache reaches the high water mark, an attempt is made to purge the cache back to the low water mark. If it can't purge the cache below the high water mark because a member has not acknowledged these packets, a congestion message is forward up the repair tree. In this situation the repair head increases its high water mark to the current value plus the number of packets in an ACK window. The repair head performs the same test when this new threshold is reached.

The sequence number in repair cache generated congestion message is the highest sequence number the head has received.

Late Joins

If a receiver joins the multicast group after data transmission has started, it has two options in TRAM.

Recover as much previously sent data as possible. This option allows the receiver to ask for retransmissions of all the previously sent data that its repair head has cached. A repair head typically has at least the last 50 packets sent in its cache.

Do not recover anything sent before the receiver joined. This option doesn't attempt to recover any previously sent packets. The first data packet received after the new member joins the repair tree is handed up to the application. All previously sent packets are ignored.

Both of the above options require that the receiver join the multicast repair tree before any data is given to the application. The method setLateJoinPreference is used to select one of the options listed above. Valid arguments to this call are:

LATE_JOIN_WITH_LIMITED_RECOVERY

LATE_JOIN_WITH_NO_RECOVERY

End of Transmission

When the sender application closes the socket, end of transmission is signaled throughout the multicast group. The sender notifies all members of this with a beacon packet that has the TXDONE flag set. This packet also includes the last data packet sequence number sent. The sender transmits this packet periodically until all of its immediate members acknowledge the receipt of all packets sent. The sender can then close its session.

When a member receives the Beacon packet with the TXDONE flag set, it immediately sends an ACK message to its head indicating whether it has received all the packets transmitted or requires more retransmissions. The receiver returns a SessionDone Exception to the application when the application has received all the packets.

When the repair head receives the Beacon packet with the TXDONE flag set, it communicates with its head just as a receiver does. The head must wait for all for all of its members to respond with their final ACKs before it can close the session. If a member requires retransmission, the head must retransmit all the packets required of its members prior to closing itself. If the Beacon from the sender with the TXDONE flag set is received but one or more members do not respond with their final ACK message, a Hello message is sent to these members with the same information contained in the Beacon packet. Members receiving this Hello message must respond in the same way they would had they received the Beacon. If the head still doesn't hear from its members after sending the Hello, it retries several times. After a period of time it gives up on the member and removes it from the member list.

When all members have either sent their final ACK message to the head or have been removed from the member list because they were not responsive, the head can close its session.

TRAM Operation

TRAM operation is best described by considering the TRAM protocol at the sender and at the receiver separately.

TRAM at the Sender

The sender application opens the TRAM session by specifying the transport profile. The transport profile includes details such as the multicast address, port, minimum and maximum rates of transmissions, Transport mode, and various other protocol related parameters. The sender TRAM, after validating the transport profile, joins the multicast group. As the Transport mode in this case is SEND_ONLY, the transport assumes the role of Group-head and starts generating the sender-beacon to initiate the RxGroup formation process. TRAM relies upon the application to decide when it is appropriate to start the multicast data transmission. TRAM maintains information such as the size of the tuned receiver community at anytime which can be polled by the application to make this decision.

As the application provides the multicast data to be transmitted, the messages are put on DataQ and are scheduled for transmission at the rate controlled by the slow start mechanism. The slow start mechanism involves starting the data transmission at a minimum rate and gradually increasing the data rate in steps until a suitable maximum rate is achieved. Under congestion, the sender TRAM opts to transmit at the minimum rate so as to alleviate and allow repair operations to take place. Sender TRAM provides no data rate guarantees other than attempting to hand over multicast data to the underlying network layer with in the transmission framework specified by the application. The rate at which the data messages are handed over to the lower layer is with reference to the messages on the DataQ (or messages that are being transmitted for the first time) and do not take into account the messages that are being retransmitted.

The data message is encapsulated in a TRAM header message and is sent to the multicast group. The TRAM header among other things, include a sequence number which enable the receiver TRAMs to order (if required) and detect packet loss. After transmission, the message is moved to the Retrans-Q. The RxGroup-members use a window mechanism to acknowledge the receipt of the multicast messages. The message on the RetransQ undergoes the state transition (described earlier) before being freed. If data cache usage is found to be above the high water mark, then the congestion control and analysis operation on the RetransQ is initiated to isolate and recover from the condition.

The RxGroup-members upon detecting data loss, requests retransmission from the RxGroup-head. The sender performs the retransmissions using the local TTL scope. If a retransmission request is made for a message that has been released from the data cache (typically as a result of re-affiliation), the sender informs the unavailability of the message via a Hello message. This is one of the rare occasions when the sender TRAM generates a Hello message.

The DATA_END sub message type in the data message indicates the end of data transmission. Further, to enable the receivers to identify that the data transmission has ended, the sender continues to send a few sender-beacons with data transmission complete bit set in the flag space. The sender-beacon also includes the sequence number of the last message. This will enable the receivers that may have missed the last message request retransmissions from their heads. When all the data messages have been successfully received, the members can terminate their RxGroup membership. The RxGroup-heads have to stay on until every member acknowledges every message on the RetransQ. Optionally the sender TRAM can be configured to remain active for a specified interval of time to gather certain statistics related to the multicast data transmission. The sender-beacon is used under this condition to maintain the RxGroup relationship.

TRAM at the Receiver

The receiver application starts the TRAM session by specifying the transport profile. The receiver TRAM, after validating the transport profile, joins the multicast group and stays idle until the sender-beacon is received. Upon receiving the sender-beacon or the multicast data message or a HA message from another node, the receiver TRAM starts participating in the RxGroup-formation process.

A RxGroup-member intending to be a RxGroup-head can optionally cache the multicast data before actually assuming the role. RxNode(s) can receive and store the multicast messages on their RetransQ but are not allowed to seek retransmissions until they are affiliated to a RxGroup-head. The receiver TRAMs acknowledge the received multicast messages with the help of the ACK messages.

RxGroup-members willing to perform the role of the head can send HA messages. The RxGroup-member starts performing the role of a head upon receiving the first AM from a RxNode. The Hello messages are initially generated using the extracted TTL from HB messages. If the multicast path to the member is not symmetric, then the TTL may not be appropriate. The member will inform the head if the Hellos are not being received. In this case the head will have to go through a correction phase until the member indicates that the Hellos are being received.

Retransmissions are multicast by the head (s) with a TTL scope that is just enough to reach its farthest RxGroup-member. The TTL, value is maintained and updated by the RxGroup-head every time a new member is accepted.

The TRAM at the receiver can be configured to continue or abort when late join or irrecoverable data loss is detected. If data loss is accepted, TRAM signals the event to the application.

FIG. 18 is a chart showing various messages and sub-messages used in TRAM. Multicast management, or MCAST_MANAGEMENT messages have Sub-Message types as follows: BEACON; HELLO; HA Head Advertisement; and, MS Member Solicitation. Multicast data, or MCAST_DATA messages have the Sub-Message types: DATA as a TRAM data message; and, DATA_RETXM for data re-transmission messages. Unicast messages, or UCAST_MANAGMENT messages have the Sub-Message types: AM Accept Membership Message; RM Reject Membership message; HELLO_Uni a hello message with an ACK request; ACK an acknowledge message;

CONGESTION, a rate based congestion message; and, HB the TRAM head bind message.

FIG. 19 is a table showing the timers used by TRAM. The T_BEACON timer is the inter beacon message interval timer, and in an exemplary embodiment of the invention is set to 1,000 milliseconds (ms). The T_BEACON_FILLER timer is the inter beacon filer interval timer, and in an exemplary embodiment of the invention is set to 30 seconds (sec). The T_ACK_INTERVAL is computed at run time based on the current rate of data transmission and the size of the configured acknowledgment window. The T_HELLO timer is the inter Hello interval timer, and in an exemplary embodiment of the invention is set to one (1) per ACK interval. The T_MS timer is the inter MS interval timer, and in an exemplary embodiment of the invention is set to 500 milliseconds (ms).

FIG. 20 is a table showing counters used by TRAM. N_ACK_MISSES is the number of ACK messages that can be missed before a head declares the member as non-responsive, and in an exemplary embodiment of the invention is set to a value of four (4). N_HELLO_MISSES is the number of HELLO messages that a member has missed for the member to declare the head as non-responsive, and in an exemplary embodiment of the invention is set to a value of five (5). N_HB_RETXM HB head bind message can be sent before the member tries another head, and in an exemplary embodiment of the invention is set to a value of three (3). N_MS_RETXM is the number of times a MS member solicitation message needs to be sent before a head increases its TTL.

FIG. 21 through FIG. 30 give the fields of the different messages used in TRAM. The figures conventionally show 32 bits (bits 0–31) horizontally as a word. Successive 32 bit words are shown vertically. Each word is divided into 8 bit bytes, although some fields occupy two 8 bit bytes, or sixteen bits; and some occupy all 32 bits of a word. All of the messages have the first word having the four byte fields: Ver # giving the version number of the software; MType giving the message type; Sub-Type giving the message sub-type; and FLAGS giving eight 1 bit flags, to be described hereinbelow. Also, all messages have the "Length of the message in bytes" in the first two bytes of the second word. The other fields of each message are selected for the particular message, as shown is in FIG. 21–FIG. 30. The fields marked "Reserved" have not been assigned to a function.

FIG. 21 is a block diagram showing a multicast packet format for a sender Beacon Message. FIG. 22 is a block diagram showing a multicast packet format for a Data Message. FIG. 23 is a block diagram showing a multicast packet format for a HA Message. FIG. 24 is a block diagram showing a multicast packet form at for a MS Message. FIG. 25 is a block diagram showing a multicast packet format for a Hello Message. FIG. 26 is a block diagram of a unicast packet format for a ACK Message. FIG. 27 is a block diagram of a unicast packet format for a Hello Uni Message. FIG. 28 is a block diagram of a unicast packet format for a Head Bind Message. FIG. 29 is a block diagram of a unicast packet format for a Accept Membership Message. FIG. 30 is a block diagram of a unicast packet format for a Reject Membership Message.

FIG. 31 through FIG. 36 give the FLAG field for the indicated messages. The eight (8) bits of the flag field are shown as bit 7 through bit 0. Each bit is shown separately. Arrows lead to an explanation of the purpose of the bit. The bits which are not labeled have not been assigned a function, and so are reserved.

Figure 31:
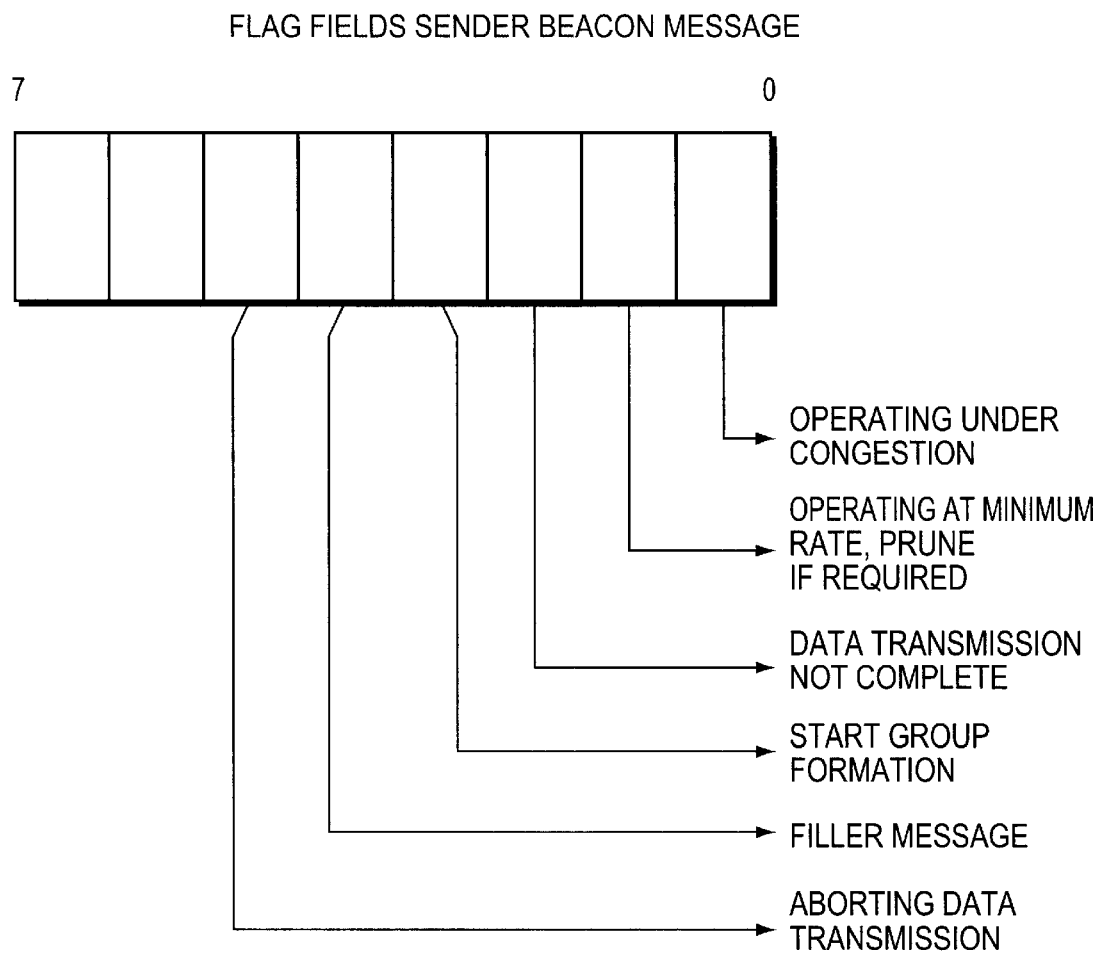
FIG. 31 is a block diagram of flag fields for a Sender Beacon Message.
Figure 32:
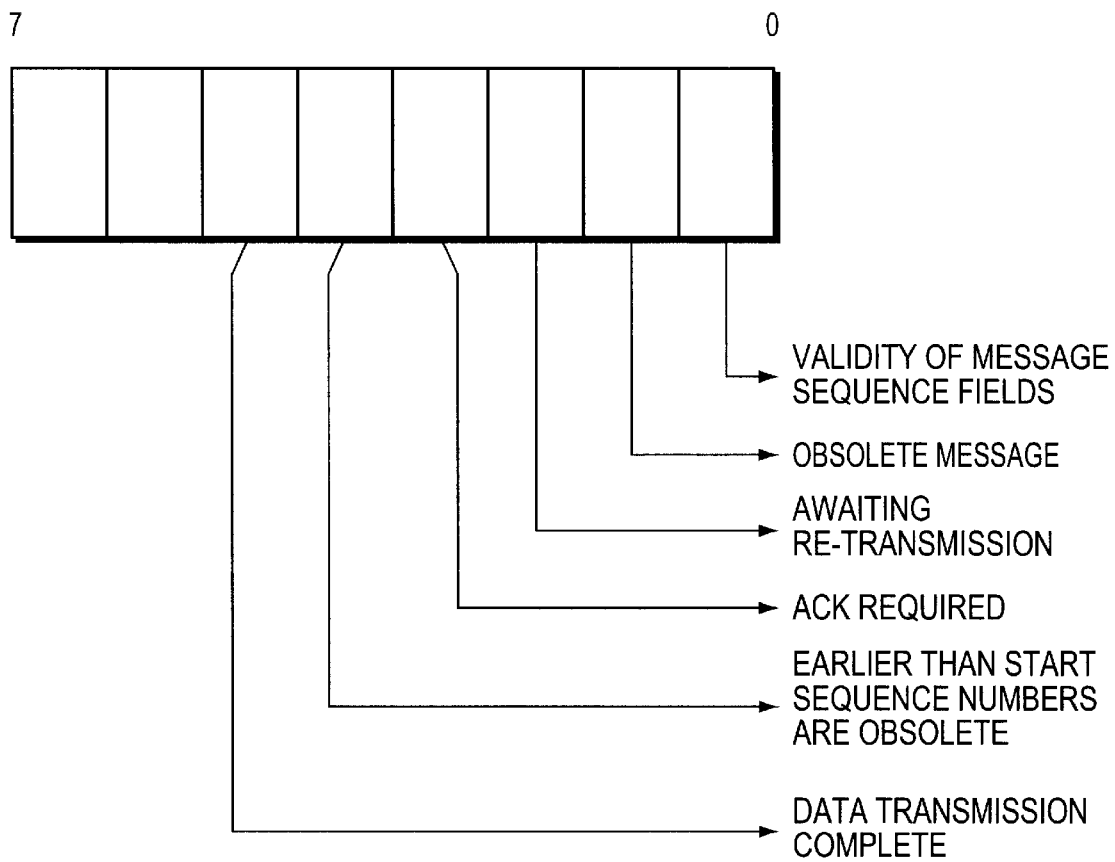
FIG. 32 is a block diagram of flag fields for a Hello Message.
Figure 33:
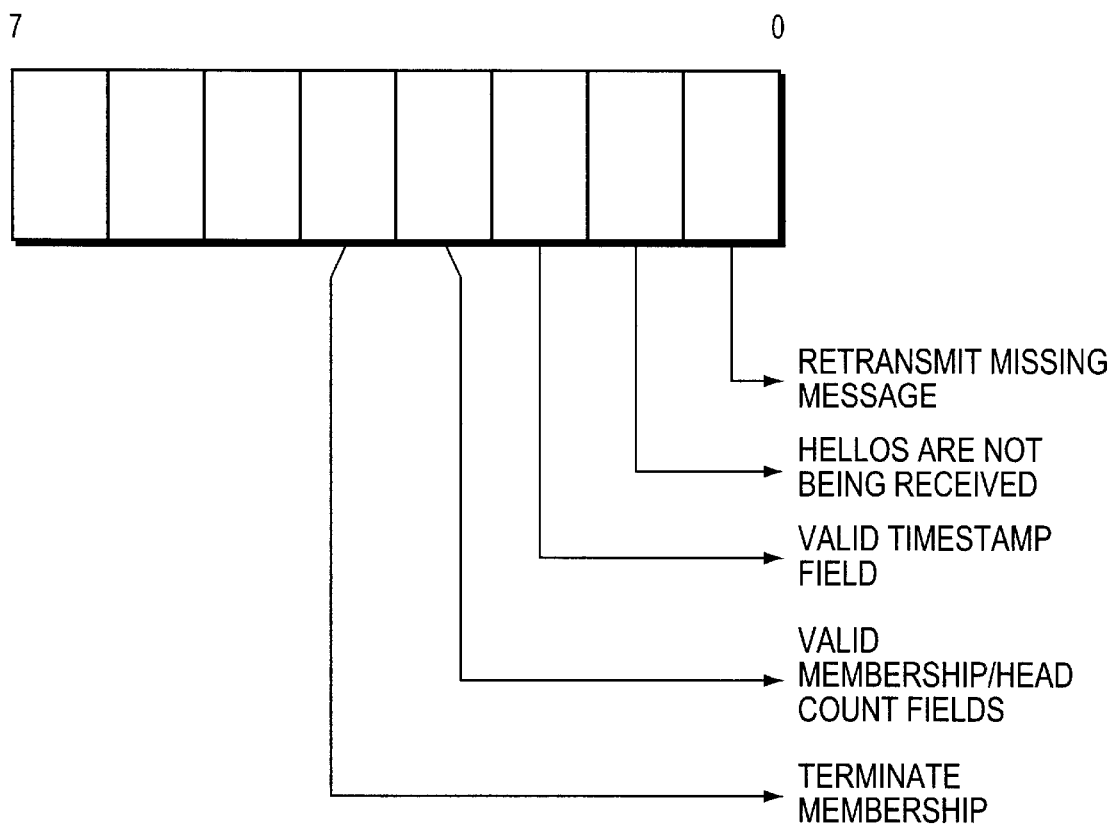
FIG. 33 is a block diagram of flag fields for a ACK Message.
Figure 34:
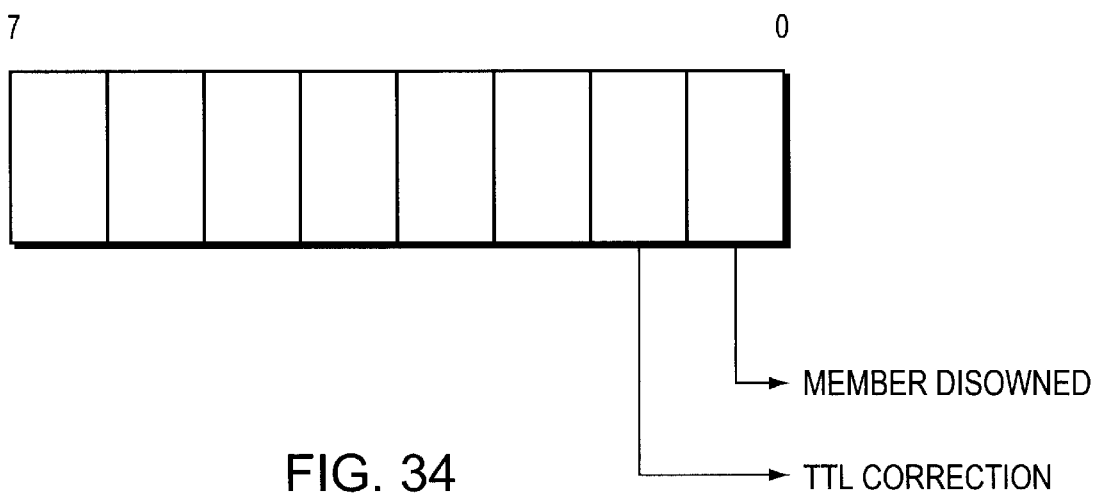
FIG. 34 is a block diagram of flag fields for a Hello-Uni Message.
Figure 35:
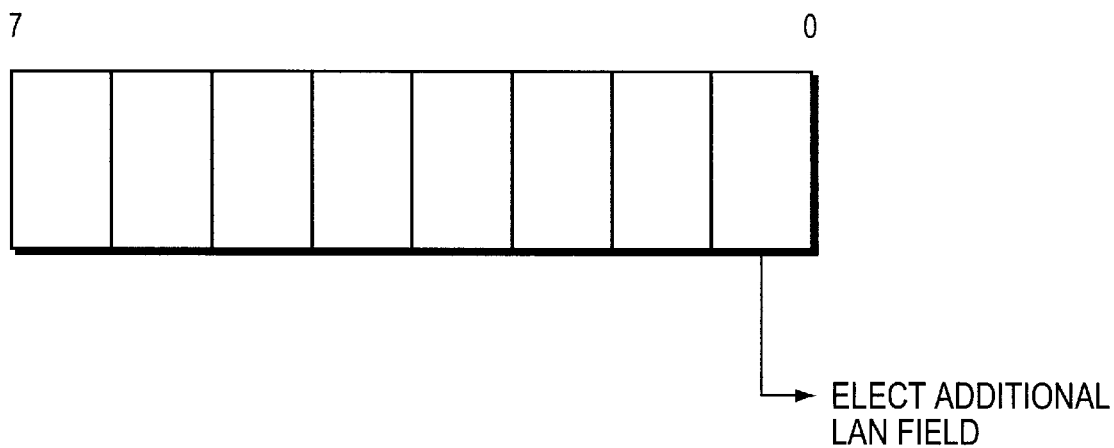
FIG. 35 is a block diagram of flag fields for a HA Message.
Figure 36:
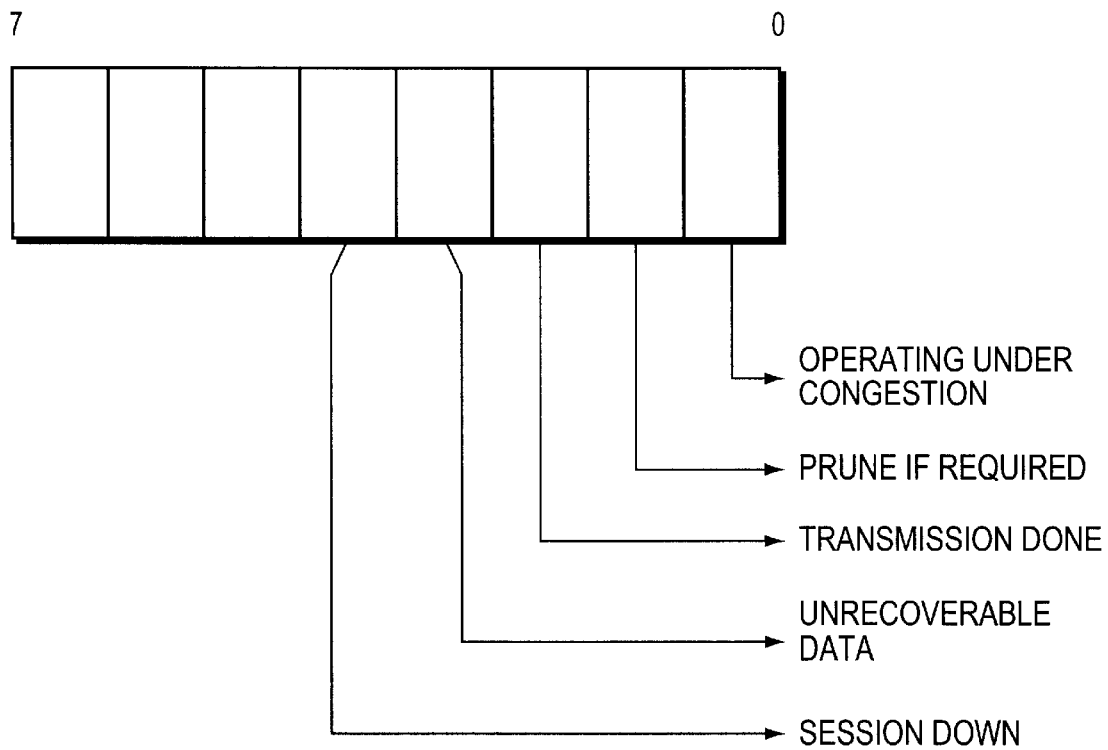
FIG. 36 is a block diagram of flag fields for a Data Message.

FIG. 31 is a block diagram of flag fields for a Sender Beacon Message. FIG. 32 is a block diagram of flag fields for a Hello Message. FIG. 33 is a block diagram of flag fields for a ACK Message. FIG. 34 is a block diagram of flag fields for a Hello Uni Message. FIG. 35 is a block diagram of flag fields for a HA Message. FIG. 36 is a block diagram of flag fields for a Bind Message.

Receiver stations located close together in a computer network dynamically form a multicast repair tree by a plurality of receiver stations choosing a repair head station from among the closely located receiver stations.

A receiver station calculates its distance from a repair head station by subtracting the decremented TTL value read from the IP header from the initial value of the TTL parameter carried in field TTL SCOPE of HELLO messages of FIG. 25, transmitted by repair head stations.

Using a criteria that a closer repair head station is a more optimum repair head station, receiver stations listen to each received HELLO message, calculate the distance to the repair head station, and reaffiliate with the closest repair head station.

Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed. It is to be understood that the above described embodiments are simply illustrative of the principles of the invention. Various other modifications and changes may be made by those skilled in the art which embody the principles of the invention and fall within the spirit and scope thereof.

What is claimed is:

1. A method of optimizing a repair tree in multicast communications, comprising:

detecting a first distance to a first repair head station;

detecting a second distance to a second repair head station;

reaffiliating by receiver stations to said first repair head station in response to a comparison between said first distance and said second distance.

2. The method as in claim 1 wherein said reaffiliating step further comprises:

selecting a closer repair head station for a receiver station to reaffiliate to.

3. The method as in claim 1 further comprising:

initiating said reaffiliation by a receiver head station.

4. The method as in claim 1 further comprising:

initiating said reaffiliation by a repair head station.

5. The method as in claim 1 further comprising:

receiving a message from a repair head station;

reading a value of a first TTL parameter from said message;

reading a value of a second TTL parameter decremented by each router through which said message was routed, said second TTL parameter having had said first TTL parameter as an initial value;

detecting a distance to said repair head station in response to said first TTL parameter and said second TTL parameter.

6. The method as in claim 5 further comprising;

determining said distance to said repair head station by subtracting said second TTL parameter from said first TTL parameter.

7. The method as in claim 5 further comprising;

writing by said repair head station said first TTL parameter into a first field of said message, said first field not changed by a router as said message is routed by a router;

writing by said repair head station a value of said first TTL parameter into a second field of a message, said second field being in a header of said message said second field being changed by each router which routes said message so that upon receipt of said message by said receiver station said second field contains said second TTL parameter.

8. The method of claim 7 further comprising;

selecting as said second field a TTL field of an IP protocol header so that a router following IP protocol decrements a value found in second field before routing said message.

9. The method of claim 1 further comprising:

making a distance comparison by a receiver station between a current repair head station and another repair head station upon receipt by said receiver station of a message from said another repair head station, said message containing sufficient information to make said comparison.

\* \* \* \* \*